(12) United States Patent
Delisle et al.

(10) Patent No.: US 11,027,788 B2
(45) Date of Patent: Jun. 8, 2021

(54) ENDLESS TRACK FOR PROPELLING A VEHICLE, WITH LUG REPLACEMENT CAPABILITY

(71) Applicant: CAMSO INC., Magog (CA)

(72) Inventors: Marc Delisle, Magog (CA); Francois Leblanc, Magog (CA); Patrice Boily, St-Catherine-de-Hatley (CA); Martin Lunkenbein, Sherbrooke (CA); Greg Thody, Halstad, MN (US); Dewaine Kautsch, Jefferson City, MO (US); Jeff Staab, Emporia, KS (US); Martin Denis, Magog (CA); Jake Dalphond, Magog (CA)

(73) Assignee: CAMSO INC., Magog (CA)

( * ) Notice: Subject to any disclaimer, the term of this patent is extended or adjusted under 35 U.S.C. 154(b) by 409 days.

(21) Appl. No.: 16/173,697

(22) Filed: Oct. 29, 2018

(65) Prior Publication Data
US 2019/0061845 A1   Feb. 28, 2019

Related U.S. Application Data

(63) Continuation of application No. 14/685,177, filed on Apr. 13, 2015, now abandoned, which is a continuation of application No. 13/112,840, filed on May 20, 2011, now Pat. No. 9,004,618.

(60) Provisional application No. 61/422,919, filed on Dec. 14, 2010, provisional application No. 61/346,784, filed on May 20, 2010.

(51) Int. Cl.
*B62D 55/24* (2006.01)
*B62D 55/26* (2006.01)
*B62D 55/32* (2006.01)

(52) U.S. Cl.
CPC ............ *B62D 55/244* (2013.01); *B62D 55/26* (2013.01); *B62D 55/32* (2013.01); *B62D 55/24* (2013.01)

(58) Field of Classification Search
CPC ...... B62D 55/24; B62D 55/244; B62D 55/26; B62D 55/28; B62D 55/32
See application file for complete search history.

(56) References Cited

U.S. PATENT DOCUMENTS

| 3,944,006 A | 3/1976 | Lassanske |
| 4,059,313 A | 11/1977 | Beyers et al. |

(Continued)

FOREIGN PATENT DOCUMENTS

| EP | 1398252 | 10/2008 |
| GB | 2322838 | 7/2000 |

OTHER PUBLICATIONS

Office Action dated Jul. 14, 2014 in connection with U.S. Appl. No. 13/112,840, 18 pages.
Notice of Allowance dated Dec. 9, 2014 in connection with U.S. Appl. No. 13/112,840, 11 pages.
Non-Final OA dated Aug. 3, 2016 in connection with U.S. Appl. No. 13/112,840, 23 pages.

(Continued)

*Primary Examiner* — Kip T Kotter

(57) ABSTRACT

An endless track for a track assembly providing traction to a work vehicle (e.g., an agricultural vehicle, a construction vehicle, etc.). The endless track comprises an elastomeric carcass having an inner side for facing wheels of the work vehicle and a ground-engaging outer side for engaging the ground. The endless track has a lug replacement capability to facilitate replacement of one or more drive/guide lugs on the inner side and/or one or more traction lugs on the ground-engaging outer side or portions of these lugs.

40 Claims, 42 Drawing Sheets

(56) References Cited

U.S. PATENT DOCUMENTS

| | | | |
|---|---|---|---|
| 4,218,101 | A | 8/1980 | Thompson |
| 5,368,376 | A | 11/1994 | Edwards et al. |
| 5,707,123 | A | 1/1998 | Grob |
| 6,030,057 | A | 2/2000 | Fikse |
| 6,120,405 | A | 9/2000 | Oertley et al. |
| 6,241,327 | B1 | 6/2001 | Gleasman et al. |
| 6,315,070 | B1 | 11/2001 | Carroll |
| 7,625,050 | B2 | 12/2009 | Bair |
| 7,784,884 | B2 | 8/2010 | Soucy et al. |
| 7,914,088 | B2 | 3/2011 | Bair |
| 7,914,089 | B2 | 3/2011 | Bair |
| 8,122,581 | B1 | 2/2012 | Hurst et al. |
| 2001/0009336 | A1* | 7/2001 | Hori ............... B62D 55/26 305/189 |
| 2007/0046100 | A1 | 3/2007 | McGilvrey |
| 2007/0126286 | A1 | 6/2007 | Feldmann |
| 2011/0068620 | A1 | 3/2011 | Delisle et al. |

OTHER PUBLICATIONS

Final Office-Action dated Jun. 5, 2017 in connection with U.S. Appl. No. 14/685,177—18 pages.
Advisory Office-Action dated Sep. 29, 2017 in connection with U.S. Appl. No. 14/685,177—18 pages.
Non Final Office-Action dated Nov. 30, 2017 in connection with U.S. Appl. No. 14/685,177—17 pages.
Final Office-Action dated Jun. 28, 2018 in connection with U.S. Appl. No. 14/685,177—19 pages.
Advisory Office-Action dated Aug. 10, 2018 in connection with U.S. Appl. No. 14/685,177—3 pages.
Red Roo Solutions—World Class Solutions for the Earth Moving Industry, webpage, 5 pages.
Larry Lugs Patented Bolt-On Replacement Drive Lugs, webpage, 2 pages.

\* cited by examiner

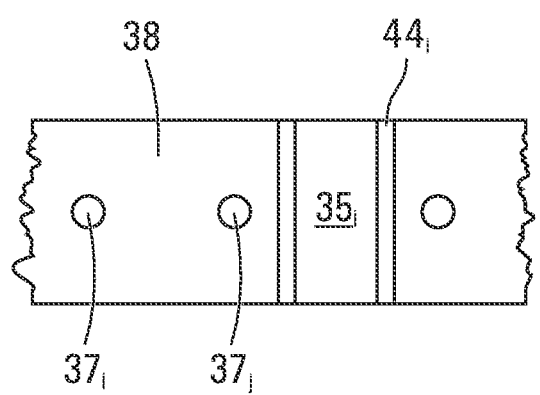
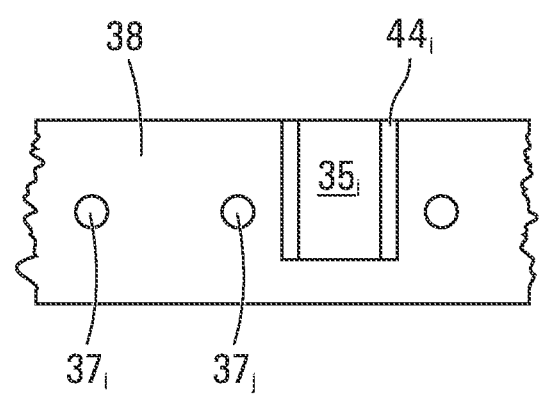
FIG. 13A
FIG. 13B

ENDLESS TRACK FOR PROPELLING A VEHICLE, WITH LUG REPLACEMENT CAPABILITY

CROSS-REFERENCE TO RELATED APPLICATIONS

This application is a continuation of U.S. patent application Ser. No. 14/685,117 filed on Apr. 13, 2015, which is a continuation of U.S. patent application Ser. No. 13/112,840 filed on May 20, 2011 and issued as U.S. Pat. No. 9,004,618, which claims priority under 35 USC 119(e) from U.S. Provisional Patent Application No. 61/346,784 filed on May 20, 2010 and U.S. Provisional Patent Application No. 61/422,919 filed on Dec. 14, 2010, all of which are hereby incorporated by reference herein.

FIELD OF THE INVENTION

The invention relates to endless tracks for propelling vehicles operable off-road and to components of such tracks.

BACKGROUND

Certain work vehicles, such as agricultural vehicles (e.g., harvesters, combines, tractors, etc.), industrial vehicles such as construction vehicles (e.g., loaders, bulldozers, excavators, etc.) and forestry vehicles (e.g., feller-bunchers, tree chippers, knuckleboom loaders, etc.), and military vehicles (e.g., combat engineering vehicles (CEVs), etc.) to name a few, can be equipped with elastomeric endless tracks that enhance their traction and floatation on soft, slippery and/or uneven grounds (e.g., soil, mud, sand, ice, snow, etc.) on which they operate.

One type of elastomeric endless track comprises an inner side including a plurality of drive/guide projections, commonly referred to as "drive/guide lugs", which are spaced apart along its longitudinal direction and used for driving and/or guiding the track around wheels of a vehicle to which the track provides traction.

Very often, a main factor reducing the track's useful life is wear or other deterioration (e.g., deformation) of the drive/guide lugs. For example, as they move relative to the wheels of the vehicle, the drive/guide lugs come into contact with (e.g., impact and/or rub or otherwise frictionally contact) one or more of these wheels and this contact can wear or otherwise deteriorate their elastomeric material (e.g., rubber). Over time, such contact deteriorates the drive/guide lugs, possibly to a point where the drive/guide lugs are so deteriorated that the track can no longer be used efficiently and has to be repaired or replaced. In some cases, such deterioration of the drive/guide lugs can occur although a carcass of the track remains in acceptable condition. In other words, the drive/guide lugs can deteriorate at a significantly greater rate than the carcass of the track.

This type of elastomeric endless track also comprises a ground-engaging outer side including a plurality of traction projections, sometimes referred to as "traction lugs", which are spaced apart along its longitudinal direction to enhance traction on the ground. Wear or other deterioration of the traction lugs may become significant enough to force replacement of the track even though the track's carcass is still in acceptable condition.

For these and other reasons, there is a need to improve elastomeric endless tracks for traction of vehicles.

SUMMARY OF THE INVENTION

According to an aspect of the invention, there is provided an endless track for a track assembly providing traction to a work vehicle. The track assembly comprises a plurality of wheels around which the endless track is mountable, the plurality of wheels including a drive wheel for driving the endless track. The endless track comprises an elastomeric carcass having an inner side for facing the wheels and a ground-engaging outer side for engaging the ground. The inner side is configured to have a plurality of drive/guide lugs which are spaced apart in a longitudinal direction of the endless track and which are positioned to contact at least one of the wheels. The endless track also comprises a plurality of lug-fastening parts provisioned during original manufacturing of the endless track to facilitate fastening of one or more of the drive/guide lugs to the elastomeric carcass. Each lug-fastening part of the plurality of lug-fastening parts defines a predetermined position of a fastener to fasten a given one of drive/guide lugs to the elastomeric carcass.

According to another aspect of the invention, there is provided an endless track for a track assembly providing traction to a work vehicle. The track assembly comprises a plurality of wheels around which the endless track is mountable, the plurality of wheels including a drive wheel for driving the endless track. The endless track comprises an elastomeric carcass having an inner side for facing the wheels and a ground-engaging outer side for engaging the ground. The endless track also comprises a plurality of elastomeric drive/guide lugs molded on the inner side and spaced apart in a longitudinal direction of the endless track, the elastomeric drive/guide lugs being positioned to contact at least one of the wheels. The endless track also comprises a plurality of lug-fastening parts provisioned during original manufacturing of the endless track to facilitate fastening of one or more replacement drive/guide lugs to the elastomeric carcass when replacing one or more of the elastomeric drive/guide lugs. Each lug-fastening part of the plurality of lug-fastening parts defines a predetermined position of a fastener to fasten a replacement drive/guide lug to the elastomeric carcass when replacing a given one of the elastomeric drive/guide lugs.

According to another aspect of the invention, there is provided a replacement drive/guide lug for replacing an elastomeric drive/guide lug of an endless track of a track assembly providing traction to a work vehicle. The track assembly comprises a plurality of wheels around which the endless track is mountable, the plurality of wheels including a drive wheel for driving the endless track. The endless track comprises an elastomeric carcass having an inner side for facing the wheels and a ground-engaging outer side for engaging the ground. The elastomeric drive/guide lug to be replaced is molded on the inner side and is one of a plurality of drive/guide lugs on the inner side. The drive/guide lugs are spaced apart in a longitudinal direction of the endless track and positioned to contact at least one of the wheels. The endless track also comprises a lug-fastening part provisioned during original manufacturing of the endless track to facilitate fastening of the replacement drive/guide lug when replacing the elastomeric drive/guide lug to be replaced. The lug-fastening part defines a predetermined position of a fastener to fasten the replacement drive/guide lug to the elastomeric carcass. The replacement drive/guide lug comprises a lug body for engaging the inner side. The replacement drive/guide lug also comprises a lug-fastening part for fastening the replacement drive/guide lug to the elastomeric carcass with the fastener at the predetermined position.

According to another aspect of the invention, there is provided a method of replacing an elastomeric drive/guide lug of an endless track of a track assembly providing traction to a work vehicle. The track assembly comprises a plurality of wheels around which the endless track is mountable, the plurality of wheels including a drive wheel for driving the endless track. The endless track comprises an elastomeric carcass having an inner side for facing the wheels and a ground-engaging outer side for engaging the ground. The elastomeric drive/guide lug to be replaced is molded on the inner side and is one of a plurality of drive/guide lugs on the inner side. The drive/guide lugs are spaced apart in a longitudinal direction of the endless track and positioned to contact at least one of the wheels. The endless track also comprises a lug-fastening part provisioned during original manufacturing of the endless track to facilitate fastening of a replacement drive/guide lug replacing the elastomeric drive/guide lug to be replaced. The lug-fastening part defines a predetermined position of a fastener to fasten the replacement drive/guide lug to the elastomeric carcass. The method comprises: providing the replacement drive/guide lug; and installing the replacement drive/guide lug on the elastomeric carcass in place of the elastomeric drive/guide lug to be replaced. The installing comprises fastening the replacement drive/guide lug to the elastomeric carcass with the fastener at the predetermined position.

According to another aspect of the invention, there is provided a method of replacing a drive/guide lug of an endless track of a track assembly providing traction to a work vehicle. The track assembly comprises a plurality of wheels around which the endless track is mountable, the plurality of wheels including a drive wheel for driving the endless track. The endless track comprises an elastomeric carcass having an inner side for facing the wheels and a ground-engaging outer side for engaging the ground. The drive/guide lug to be replaced is one of a plurality of drive/guide lugs on the inner side. The drive/guide lugs are spaced apart in a longitudinal direction of the endless track and positioned to contact at least one of the wheels. The endless track also comprises a plurality of reinforcing cables extending in the longitudinal direction of the endless track and distributed in a widthwise direction of the endless track. The method comprises: providing a replacement drive/guide lug; and installing the replacement drive/guide lug on the elastomeric carcass in place of the drive/guide lug to be replaced. The installing comprises fastening the replacement drive/guide lug to the elastomeric carcass with a fastener extending in the elastomeric carcass without intersecting any reinforcing cable.

According to another aspect of the invention, there is provided a drive/guide lug for an endless track of a track assembly providing traction to a work vehicle. The track assembly comprises a plurality of wheels around which the endless track is disposed, the plurality of wheels including a drive wheel for driving the endless track. The endless track comprises an elastomeric carcass having an inner side for facing the wheels and a ground-engaging outer side for engaging the ground. The drive/guide lug is mountable on the inner side as one of a plurality of drive/guide lugs which are spaced apart in a longitudinal direction of the endless track and which are positioned to contact at least one of the wheels. The drive/guide lug comprises a lug body for engaging the inner side. The lug body includes a hole for receiving a fastener to fasten the drive/guide lug to the elastomeric carcass. The drive/guide lug also comprises a load-distributing member for distributing on the lug body a load exerted by the fastener to fasten the drive/guide lug to the elastomeric carcass. The load-distributing member includes a bearing surface which bears against a bearing surface of the lug body when the load-distributing member is placed against the lug body and the drive/guide lug is fastened to the elastomeric carcass by the fastener.

According to another aspect of the invention, there is provided an endless track for a track assembly providing traction to a work vehicle. The track assembly comprises a plurality of wheels around which the endless track is mountable, the plurality of wheels including a drive wheel for driving the endless track. The endless track comprises an elastomeric carcass having an inner side for facing the wheels and a ground-engaging outer side for engaging the ground. The endless track also comprises a plurality of drive/guide lugs on the inner side. The drive/guide lugs are spaced apart in a longitudinal direction of the endless track and positioned to contact at least one of the wheels. A given one of the drive/guide lugs includes a replaceable portion.

According to another aspect of the invention, there is provided an endless track for a track assembly providing traction to a work vehicle. The track assembly comprises a plurality of wheels around which the endless track is mountable, the plurality of wheels including a drive wheel for driving the endless track. The endless track comprises an elastomeric carcass having an inner side for facing the wheels and a ground-engaging outer side for engaging the ground. The endless track also comprises a plurality of drive/guide lugs on the inner side. The drive/guide lugs are spaced apart in a longitudinal direction of the endless track and positioned to contact at least one of the wheels. A subset of the drive/guide lugs are linked together as a replaceable set of drive/guide lugs. The replaceable set of drive/guide lugs is fastened as a unit to and removable as a unit from the elastomeric carcass.

According to another aspect of the invention, there is provided a replacement drive/guide lug for replacing an elastomeric drive/guide lug of an endless track of a track assembly providing traction to a work vehicle. The track assembly comprises a plurality of wheels around which the endless track is mountable, the plurality of wheels including a drive wheel for driving the endless track. The endless track comprises an elastomeric carcass having an inner side for facing the wheels and a ground-engaging outer side for engaging the ground. The elastomeric drive/guide lug to be replaced is molded on the inner side and is one of a plurality of drive/guide lugs on the inner side. The drive/guide lugs are spaced apart in a longitudinal direction of the endless track and positioned to contact at least one of the wheels. The replacement drive/guide lug comprises a lug body for engaging the inner side. The replacement drive/guide lug also comprises a lug-fastening part for fastening the replacement drive/guide lug to the elastomeric carcass with a fastener. The replacement drive/guide lug is smaller than the drive/guide lug to be replaced.

According to another aspect of the invention, there is provided an endless track for a track assembly providing traction to a work vehicle. The track assembly comprises a plurality of wheels around which the endless track is mountable, the plurality of wheels including a drive wheel for driving the endless track. The endless track comprises an elastomeric carcass having an inner side for facing the wheels and a ground-engaging outer side for engaging the ground. The ground-engaging outer side is configured to have a plurality of traction lugs which are spaced apart in a longitudinal direction of the endless track to enhance traction on the ground. The endless track also comprises a plurality of lug-fastening parts provisioned during original manufacturing of the endless track to facilitate fastening of one or more of the traction lugs to the elastomeric carcass. Each lug-fastening part of the plurality of lug-fastening parts defines a predetermined position of a fastener to fasten a given one of traction lugs to the elastomeric carcass.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIGS. 7A to 30B show various examples of embodiments in which a drive/guide lug is connectable to a carcass of the endless track with one or more fasteners;

Figure 1:
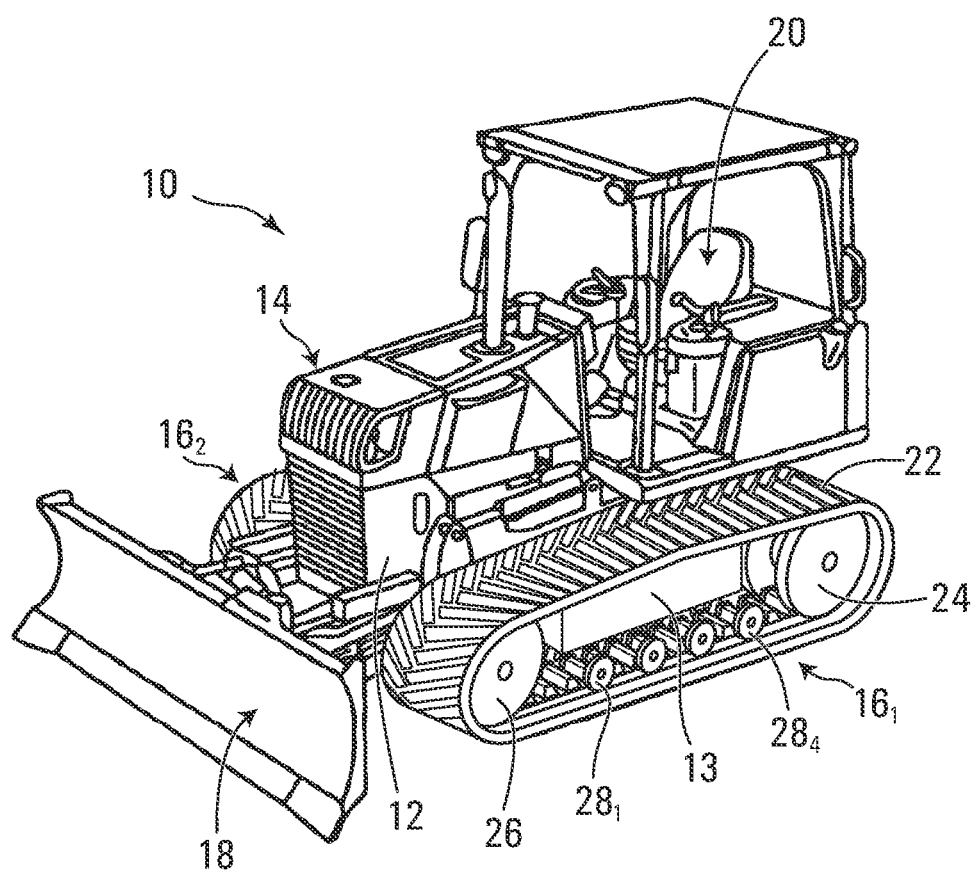
FIG. 1 shows a tracked work vehicle equipped with a pair of endless tracks in accordance with an embodiment of the invention.
Figure 3:
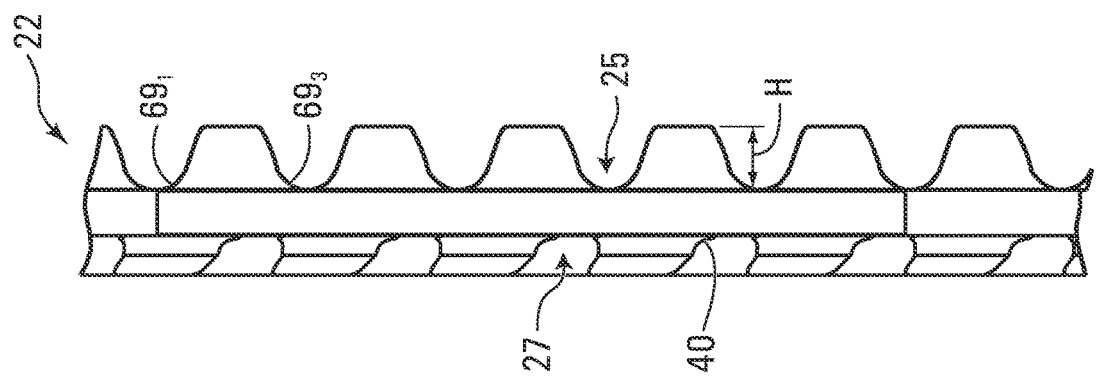
FIGS. 2 to 5 respectively show an outer side plan view, a side view, an inner side plan view, and a transversal cross-sectional view of an endless track of the vehicle.
Figure 2:
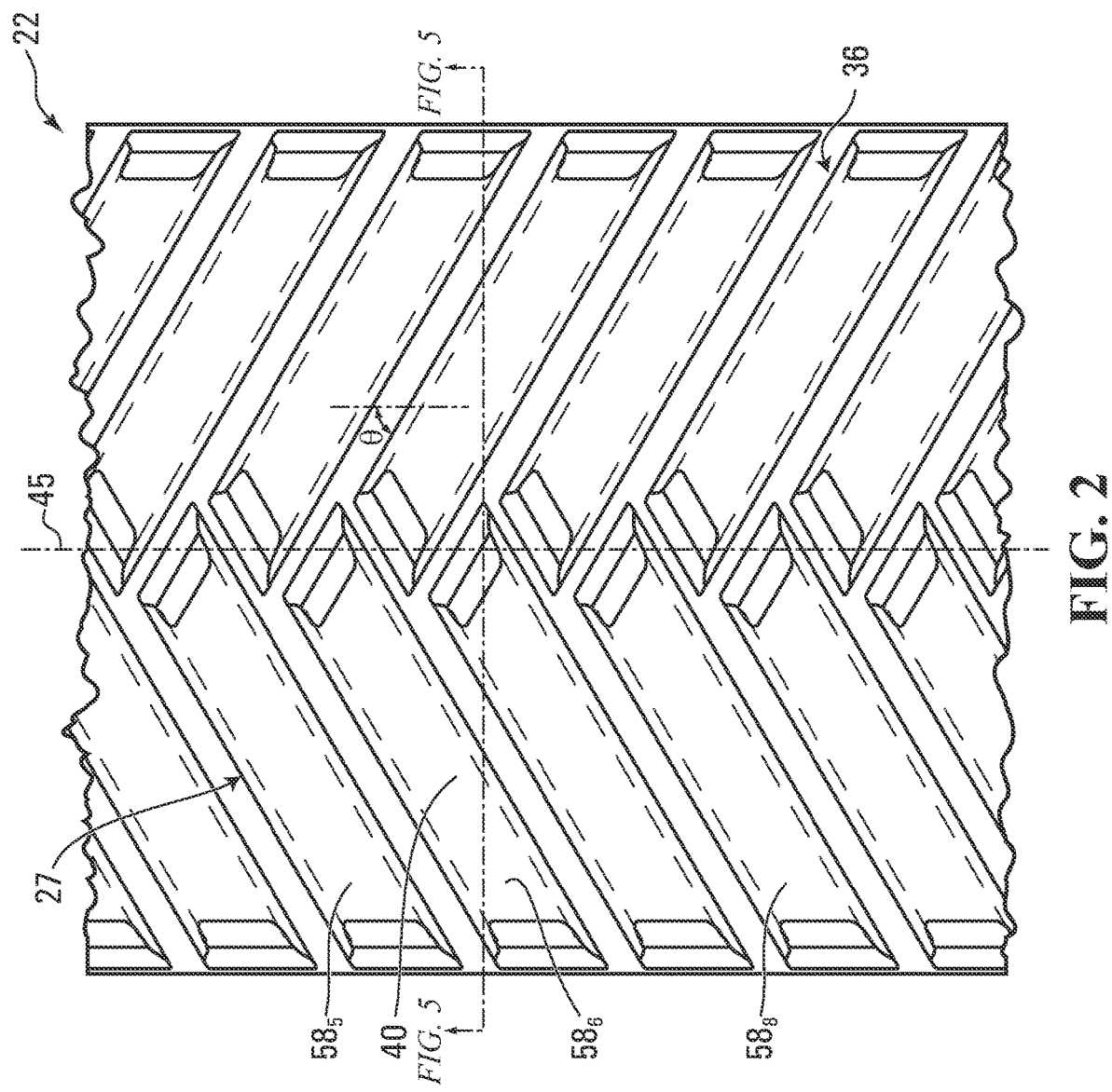
Figure 4:
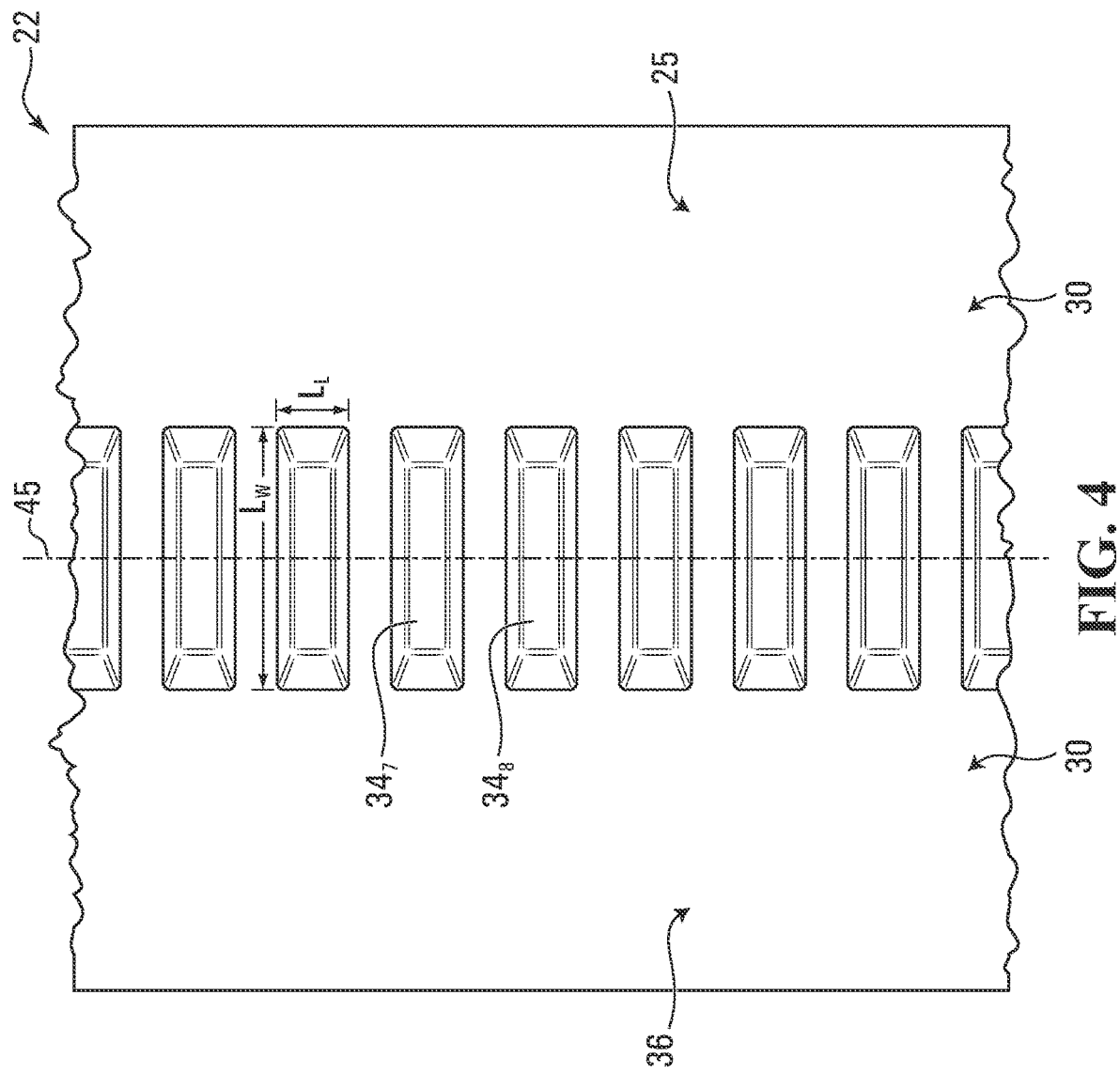
Figure 5:
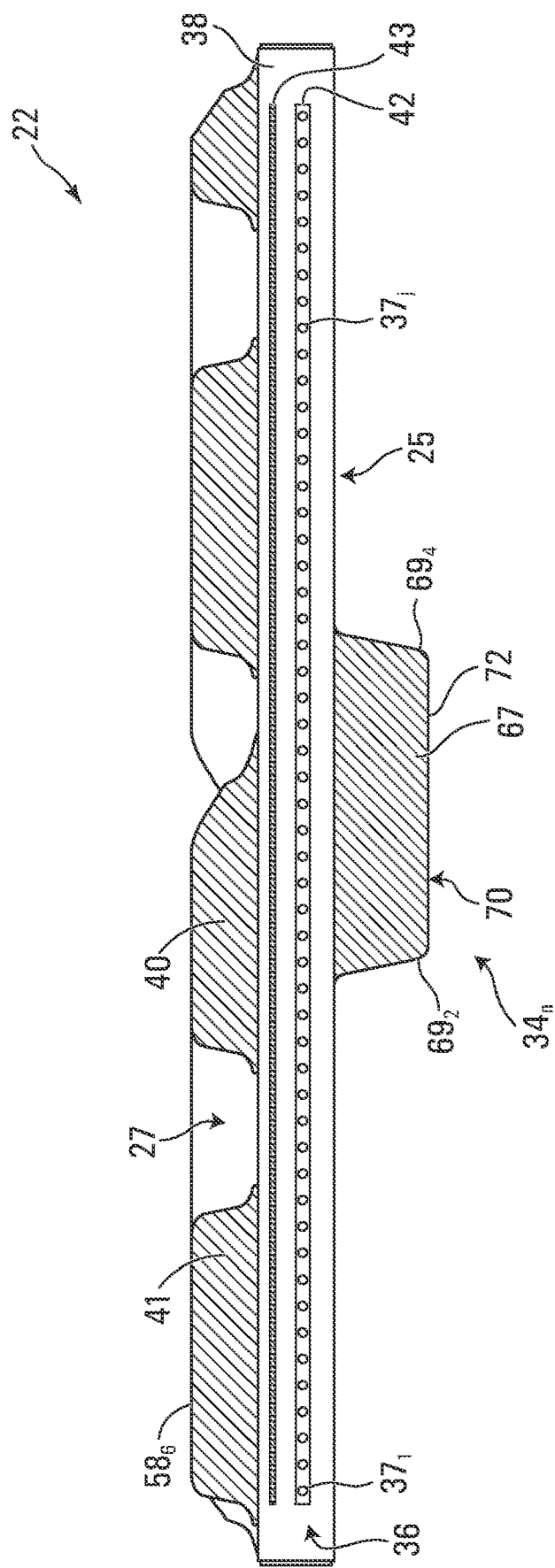

In the drawings, embodiments of the invention are illustrated by way of example. It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS OF THE INVENTION

FIG. 1 shows a tracked work vehicle 10 in accordance with an embodiment of the invention. In this embodiment, the vehicle 10 is an industrial vehicle for performing industrial work. More particularly, in this embodiment, the vehicle 10 is a construction vehicle for performing construction work. In this example, the construction vehicle 10 is a bulldozer. In other examples, the construction vehicle 10 may be a backhoe loader, a skid steer loader, an excavator, an asphalt paver, or any other type of construction vehicle.

The construction vehicle 10 comprises a frame 12 supporting a prime mover 14, a pair of track assemblies $16_1$, $16_2$ (which can be referred to as "undercarriages"), and an operator cabin 20, in which an operator can move the construction vehicle 10 on the ground to perform construction work using a work implement 18.

The prime mover 14 provides motive power to move the construction vehicle 10. For example, the prime mover 14 may comprise an internal combustion engine and/or one or more other types of motors (e.g., electric motors, etc.) for generating motive power to move the construction vehicle 10. The prime mover 14 is in a driving relationship with each of the track assemblies $16_1$, $16_2$. That is, power derived from the primer mover 14 is transmitted to each of the track assemblies $16_1$, $16_2$ via a powertrain of the construction vehicle 10.

The work implement 18 is used to perform construction work. In this example, the working implement 18 is a dozer blade that can be used to push objects and shove soil, debris or other material. In other examples, the work implement 18 may take on various other forms, such as a bucket, a backhoe, a fork, a grapple, a scraper pan, an auger, a saw, a ripper, a material handling arm, or any other type of construction work implement.

The operator cabin 20 is where the operator sits and controls the construction vehicle 10. More particularly, the operator cabin 20 comprises a set of controls that allow the operator to steer the construction vehicle 10 on the ground and in some cases operate the working implement 18.

The track assemblies $16_1$, $16_2$ propel the construction vehicle 10 on the ground. More particularly, in this embodiment, each track assembly $16_i$ comprises an endless track 22 disposed around a plurality of wheels, including a drive wheel 24 and a plurality of idler wheels, which includes a front idler wheel 26 and a plurality of roller wheels $28_1$-$28_8$. The track assembly $16_i$ also comprises a frame 13 which supports various components of the track assembly $16_i$, including the roller wheels $28_1$-$28_8$. The track assembly $16_i$ has a first longitudinal end 29 and a second longitudinal end 31 that define a length of the track assembly $16_i$. A width of the track assembly $16_i$ is defined by a width of the endless track 22. The track assembly $16_i$ has a longitudinal direction, a widthwise direction, and a height direction.

The endless track 22 engages the ground to provide traction to the construction vehicle 10. With additional reference to FIGS. 2 to 5, the endless track 22 comprises an inner side 25 and a ground-engaging outer side 27. The inner side 25 faces the wheels 24, 26, $28_1$-$28_8$ and defines an inner area in which these wheels rotate. The ground-engaging outer side 27 engages the ground for traction of the construction vehicle 10. The track 22 has a top run 65 which extends between the longitudinal ends 29, 31 of the track assembly $16_i$ and over the wheels 24, 26, $28_1$-$28_8$, and a bottom run 66 which extends between the longitudinal ends 29, 31 of the track assembly $16_i$ and under the wheels 24, 26, $28_1$-$28_8$. The endless track 22 has a longitudinal axis 45 which defines a longitudinal direction of the track 22 (i.e., a direction generally parallel to the longitudinal axis 45) and transversal directions of the track (i.e., directions transverse to the longitudinal axis 45), including a widthwise direction of the track (i.e., a lateral direction generally perpendicular to the longitudinal axis 45).

The endless track 22 comprises an elastomeric endless body 36 underlying its inner side 25 and its ground-engaging outer side 27. In view of its underlying nature, the endless body 36 will be referred to as a "carcass". The carcass 36 is elastomeric in that it comprises elastomeric material 38 which allows the carcass 36 to elastically change in shape as the endless track 22 is in motion around the wheels 24, 26, $28_1$-$28_8$. The elastomeric material 38 can be any polymeric material with suitable elasticity. In this embodiment, the elastomeric material 38 includes rubber. Various rubber compounds may be used and, in some cases, different rubber compounds may be present in different areas of the carcass 36.

In other embodiments, the elastomeric material 38 may include another elastomer in addition to or instead of rubber (e.g., polyurethane elastomer).

In this embodiment, the carcass 36 comprises a plurality of reinforcements 42, 43 embedded in its elastomeric material 38. The reinforcements 42, 43 can take on various forms. For example, in this embodiment, the reinforcement 42 comprises a plurality of reinforcing cables $37_1$-$37_M$ adjacent to one another. The reinforcing cables $37_1$-$37_M$ extend generally in the longitudinal direction of the endless track 22 to enhance strength in tension of the track 22 along its longitudinal direction. In this case, each of the reinforcing cables $37_1$-$37_M$ is a cord or wire rope including a plurality of strands or wires. In other cases, each of the reinforcing cables $37_1$-$37_M$ may be another type of cable and may be made of any material suitably flexible longitudinally (e.g., fibers or wires of metal, plastic or composite material). The reinforcement 43 may comprise a layer of reinforcing fabric. Reinforcing fabric comprises pliable material made usually by weaving, felting, or knitting natural or synthetic fibers. For instance, the layer of reinforcing fabric may comprise a ply of reinforcing woven fibers (e.g., nylon fibers or other synthetic fibers). Various other types of reinforcements may be provided in the carcass 36 in other embodiments. Alternatively, the reinforcement 43 may comprises a layer of reinforcing cables oriented transversally to the reinforcing cables $37_1$-$37_M$.

The carcass 36 may be molded into shape in a molding process during which the rubber 38 is cured. For example, in this embodiment, a mold may be used to consolidate layers of rubber providing the rubber 38 of the carcass 36, the reinforcing cables $37_1$-$37_M$ and the layer of reinforcing fabric 43.

The ground-engaging outer side 27 comprises a tread pattern 40 to enhance traction on the ground. The tread pattern 40 comprises a plurality of traction projections $58_1$-$58_T$ distributed on the ground-engaging outer side 27 for enhancing traction on the ground. The traction projections $58_1$-$58_T$ will be referred to as "traction lugs". In this embodiment, each of the traction lugs $58_1$-$58_T$ has an elongated shape and is angled (i.e., defines an acute angle θ) relative to the longitudinal direction of the endless track 22. The traction lugs $58_1$-$58_T$ may have various other shapes in other examples (e.g., curved shapes, shapes with straight parts and curved parts, etc.).

In this embodiment, each of the traction lugs $58_1$-$58_T$ is an elastomeric traction lug in that it comprises elastomeric material 41. The elastomeric material 41 can be any polymeric material with suitable elasticity. More particularly, in this embodiment, the elastomeric material 41 includes rubber. Various rubber compounds may be used and, in some cases, different rubber compounds may be present in different areas of each of the traction lugs $58_1$-$58_T$. In other embodiments, the elastomeric material 41 may include another elastomer in addition to or instead of rubber (e.g., polyurethane elastomer).

The traction lugs $58_1$-$58_T$ may be provided on the ground-engaging outer side 27 in various ways. For example, in this embodiment, the traction lugs $58_1$-$58_T$ are provided on the ground-engaging outer side 27 by being molded with the carcass 36. In other embodiments, examples of which will be discussed later on, the traction lugs $58_1$-$58_T$ may be provided on the ground-engaging outer side 27 by being secured to the carcass 36 with fasteners (e.g., bolts).

The inner side 25 of the endless track 22 comprises a plurality of inner wheel-contacting projections $34_1$-$34_N$ that are positioned to contact at least some of the wheels 24, 26, $28_1$-$28_8$ to do at least one of driving (i.e., imparting motion to) the track 22 and guiding the track 22. The wheel-contacting projections $34_1$-$34_N$ can be referred to as "wheel-contacting lugs". Furthermore, since each of them is used to do at least one of driving the track 22 and guiding the track 22, the wheel-contacting lugs $34_1$-$34_N$ can be referred to as "drive/guide projections" or "drive/guide lugs". In some examples of implementation, a drive/guide lug $48_i$ may interact with the drive wheel 24 to drive the track 22, in which case the drive/guide lug $48_i$ is a drive lug. In other examples of implementation, a drive/guide lug $48_i$ may interact with the idler wheel 26 and/or the roller wheels $28_1$-$28_8$ to guide the track 22 to maintain proper track alignment and prevent de-tracking without being used to drive the track 22, in which case the drive/guide lug $48_i$ is a guide lug. In yet other examples of implementation, a drive/guide lug $48_i$ may both (i) interact with the drive wheel 24 to drive the track and (ii) interact with the idler wheel 26 and/or the roller wheels $28_1$-$28_8$ to guide the track 22 to maintain proper track alignment and prevent de-tracking, in which case the drive/guide lug $48_i$ is both a drive lug and a guide lug.

The drive/guide lugs $34_1$-$34_N$ are spaced apart along the longitudinal direction of the endless track 22. In this case, the drive/guide lugs $34_1$-$34_N$ are arranged in a single row. The drive/guide lugs $34_1$-$34_N$ may be arranged in other manners in other embodiments (e.g., in a plurality of rows that are spaced apart along the widthwise direction of the track 22).

Figure 6:
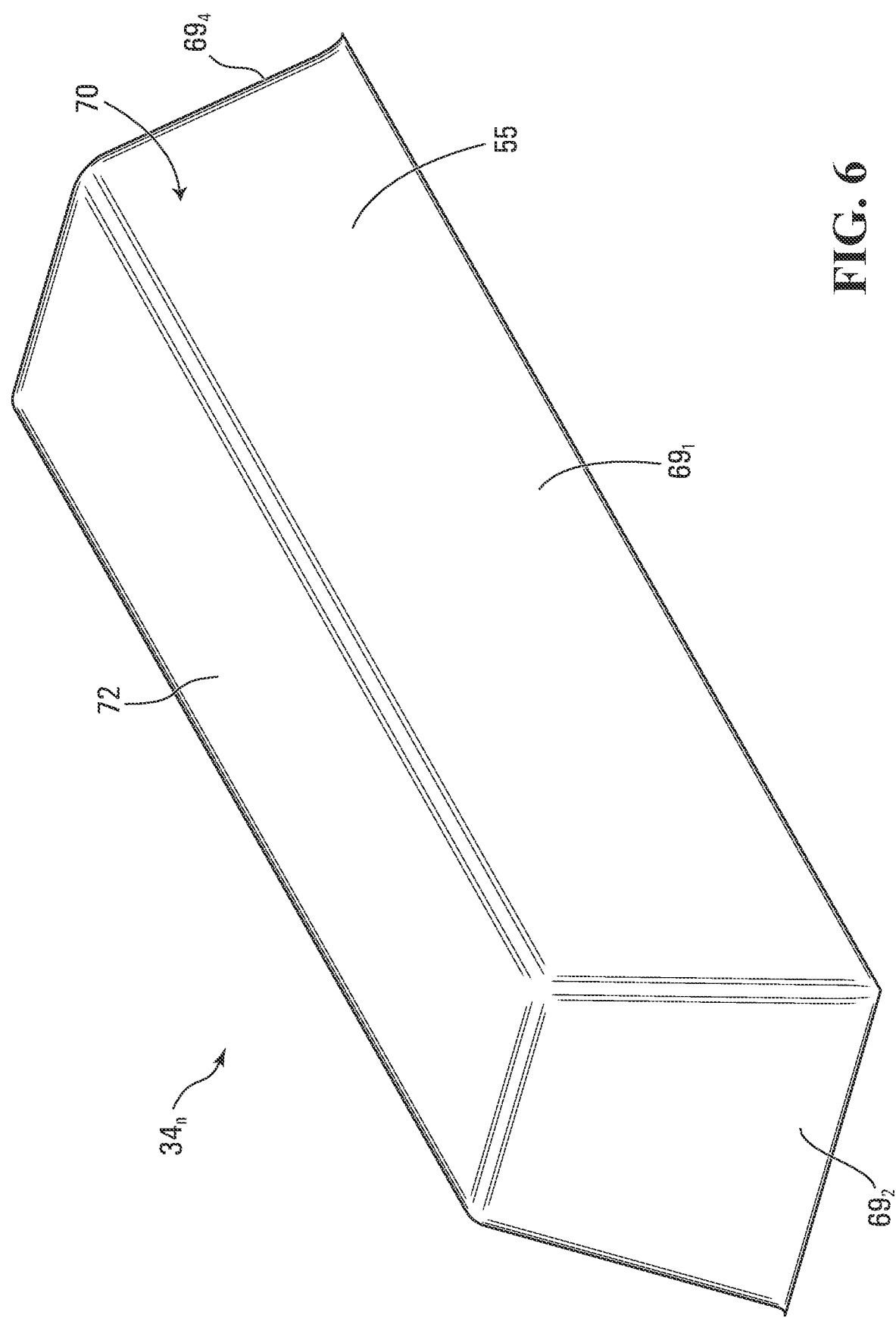
FIG. 6 shows a perspective view of a drive/guide lug of an inner side of the endless track.

The drive/guide lugs $34_1$-$34_N$ may have any suitable shape. With additional reference to FIG. 6, each drive/guide lug $34_n$ has a lug body 55 with a periphery 70 which, in this embodiment, includes a top surface 72, a front surface $69_1$, a rear surface $69_3$, and two side surfaces $69_2$, $69_4$. The front surface $69_1$ and the rear surface $69_3$ are opposed to one another along the longitudinal direction of the track 22 and, in embodiments where the lug $34_n$ is used to drive the track 22, can be contacted by a drive member of the drive wheel 24 that pushes against it to impart motion to the track 22. The two side faces $69_2$, $69_4$ are laterally opposed and may contact the roller wheels $28_1$-$28_8$, the drive wheel 24 and/or the idler wheel 26 such as to prevent excessive lateral movement of the track 22 relative the wheels and to thus prevent de-tracking. The drive/guide lug $34_n$ may have various other shapes in other embodiments.

Each drive/guide lug $34_n$ has a front-to-rear dimension $L_L$ in the longitudinal direction of the endless track 22 and a side-to-side dimension $L_W$ in the widthwise direction of the endless track 22. In some cases, the front-to-rear dimension $L_L$ may be a width of the drive/guide lug $34_n$ while the side-to-side dimension $L_W$ may be a length of the drive/guide lug $34_n$. In other cases, the front-to-rear dimension $L_L$ may be a length of the drive/guide lug $34_n$ while the side-to-side dimension $L_W$ may be a width of the drive/guide lug $34_n$. In yet other cases, the front-to-rear dimension $L_L$ and the side-to-side dimension $L_W$ may be substantially the same. The drive/guide lug $34_n$ also has a height H.

In this embodiment, each drive/guide lug $34_n$ is an elastomeric drive/guide lug in that its body 55 comprises elastomeric material 67. The elastomeric material 67 can be any polymeric material with suitable elasticity. More particularly, in this embodiment, the elastomeric material 67 includes rubber. Various rubber compounds may be used and, in some cases, different rubber compounds may be present in different areas of the body 55 of the drive/guide lug $34_n$. In other embodiments, the elastomeric material 67 may include another elastomer in addition to or instead of rubber (e.g., polyurethane elastomer).

The drive/guide lugs $34_1$-$34_N$ may be provided on the inner side 25 in various ways. For example, in this embodiment, the drive/guide lugs $34_1$-$34_N$ are provided on the inner side 25 by being molded with the carcass 36. In other embodiments, examples of which will be discussed later on, the drive/guide lugs $34_1$-$34_N$ may be provided on the inner side 25 by being secured to the carcass 36 with fasteners (e.g., bolts).

The endless track 22 may be constructed in various other manners in other embodiments. For example, in some embodiments, the track 22 may comprise a plurality of sections (e.g., rubber sections) interconnected to one another to form an endless body, the track 22 may have recesses or holes that interact with the drive wheel 24 in order to cause the track 22 to be driven (e.g., in which case the drive/guide lugs $34_1$-$34_N$ may be used only to guide the track 22 without being used to drive the track 22, i.e., they may be "guide lugs" only), and/or the tread pattern 40 of the ground-engaging outer side 27 may have various other configurations.

The drive wheel 24 is rotatable by power derived from the prime mover 14 to drive the track 22. That is, power generated by the prime mover 14 and delivered over the powertrain of the construction vehicle 10 can rotate a driven axle, which causes rotation of the drive wheel 24, which in turn imparts motion of the track 22.

Figure 46:
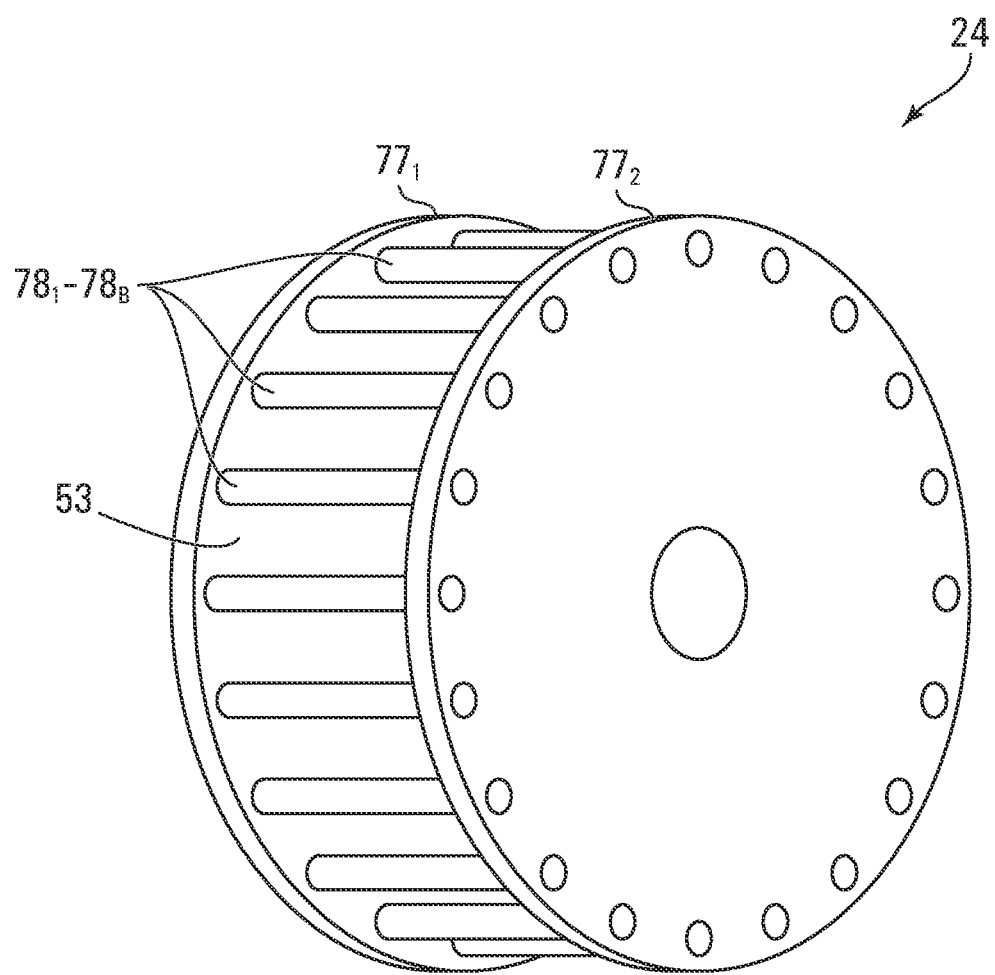
FIG. 46 shows an example of an embodiment of a drive sprocket for driving the endless track.

For example, in some embodiments, the drive wheel 24 may comprise a drive sprocket engaging the drive/guide lugs $34_1$-$34_N$ of the inner side 25 of the track 22 in order to drive the track 22. The drive wheel 24 and the track 22 may thus implement a "positive drive" system. For instance, FIG. 46 shows an embodiment of the drive wheel 24 in which the drive wheel 24 defines a sprocket that includes two discs $77_1$, $77_2$ co-centric and turning about a common axis. Extending between the discs are a plurality of drive members $78_1$-$78_B$, in this case sprocket bars, which are regularly spaced along a circular path near respective peripheries of the discs $77_1$, $77_2$. The drive wheel 24 and the track 22 have respective dimensions allowing interlocking of the sprocket bars $78_1$-$78_B$ of the drive wheel 24 and the drive/guide lugs $34_1$-$34_N$ of the track 22. Adjacent ones of the sprocket bars $78_1$-$78_B$ define an interior space 53 between them to receive one of the drive/guide lugs $34_1$-$34_N$. Adjacent ones of the drive/guide lugs $34_1$-$34_N$ define an inter-lug space 49 between them to receive one of the sprocket bars $78_1$-$78_B$. The drive/guide lugs $34_1$-$34_N$ and the sprocket bars $78_1$-$78_B$ have a regular spacing that allows interlocking of the drive/guide lugs $34_1$-$34_N$ and the sprocket bars $78_1$-$78_B$ over a certain length of the drive wheel 24's periphery.

The drive wheel 24 may be configured in various other ways in other embodiments. For example, in some embodiments, the drive sprocket 24 may not have any side discs such as discs $77_1$, $77_2$ and, instead of being bars, the drive members $78_1$-$78_B$ may be teeth that are distributed circumferentially along the drive sprocket 24. As another example, in embodiments where the track 22 comprises recesses or holes, the drive wheel 24 may have teeth that enter these recesses or holes in order to drive the track 22. As yet another example, in some embodiments, the drive wheel 24 may frictionally engage the inner side 25 of the track 22 in order to frictionally drive the track 22 (i.e., the drive wheel 24 and the track 22 may implement a "friction drive" system).

The front idler wheel 26 and the roller wheels $28_1$-$28_8$ are not driven by power supplied by the prime mover 14, but are rather used to do at least one of supporting part of the weight of the construction vehicle 10 on the ground via the track 22, guiding the track 22 as it is driven by the drive wheel 24, and tensioning the track 22. More particularly, in this embodiment, the front idler wheel 26 is a leading idler wheel which maintains the track 22 in tension and helps to support part of the weight of the construction vehicle 10 on the ground via the track 22. The roller wheels $28_1$-$28_8$ roll on a rolling path 33 of the inner side 25 of the track 22 along the bottom run 66 of the track 22 to apply the bottom run 66 on the ground. In this case, as they are located between frontmost and rearmost ones of the wheels of the track assembly $16_i$, the roller wheels $28_1$-$28_8$ can sometimes be referred to as "mid-rollers".

The endless track 22 has a lug replacement capability which enables replacement of the drive/guide lugs $34_1$-$34_N$ or portions of the drive/guide lugs $34_1$-$34_N$. Accordingly, at least part of each of the drive/guide lugs $34_1$-$34_N$ is replaceable, i.e., each of the drive/guide lugs $34_1$-$34_N$ is entirely replaceable or comprises one or more replaceable portions. This lug replacement capability can be used for various purposes. For example, in some embodiments, the lug replacement capability of the endless track 22 may be used to replace one or more of the drive/guide lugs $34_1$-$34_N$ that have been worn or otherwise deteriorated, notably due to their motion relative to the wheels 24, 26, $28_1$-$28_8$. This may be particularly useful, for instance, in embodiments where the drive/guide lugs $34_1$-$34_N$ are molded with the carcass 36 and the wear or other deterioration of the drive/guide lugs $34_1$-$34_N$ occurs although the carcass 36 remains in acceptable condition in order to allow continued use of the carcass 36. As another example, in some embodiments, the lug replacement capability of the endless track 22 may be used during original manufacturing of the endless track 22 to secure the drive/guide lugs $34_1$-$34_N$ to the carcass 36 after the carcass 36 has been molded. This may facilitate later removal of one or more of the drive/guide lugs $34_1$-$34_N$ when they need to be replaced after the track 22 has been in use. This may also allow installation of different types of drive/guide lugs (e.g., drive/guide lugs having different shapes and/or made of different materials) on the carcass 36 during original manufacturing of the endless track 22 to basically create different track models with a single carcass design.

The lug replacement capability of the endless track 22 can be implemented in various ways in various embodiments, examples of which will now be discussed.

1. Designated Lug-Fastening Parts

In some embodiments, the endless track 22 may comprise a plurality of designated lug-fastening parts $17_1$-$17_F$ provisioned during original manufacturing of the endless track 22 to facilitate fastening of one or more of the drive/guide lugs $34_1$-$34_N$ to the carcass 36 when installing the one or more of the drive/guide lugs $34_1$-$34_N$ on the carcass 36.

Each designated lug-fastening part $17_i$ defines a predetermined position of a fastener to fasten a drive/guide lug $34_i$ to the carcass 36. The predetermined position of the fastener defined by the designated lug-fastening part $17_i$ is "predetermined" in that it is determined by a manufacturer of the endless track 22 during original manufacturing of the endless track 22. When installing the drive/guide lug $34_i$ to the carcass 36, the position of the fastener to fasten the drive/guide lug $34_i$ to the carcass 36 has thus already been determined at the time of original manufacturing of the endless track 22 so that an individual installing the drive/guide lug $34_i$ can use the fastener at that position.

A fastener used to fasten a drive/guide lug $34_i$ to the carcass 36 can comprise any device or group of devices capable of fastening the drive/guide lug $34_i$ to the carcass 36. For example, in various embodiments, a fastener may comprise a threaded fastener (e.g., a bolt or stud with a nut, a screw, etc.), a non-threaded fastener (e.g., a clip, a pin, a snapping member, etc.), or any other hardware capable of fastening the drive/guide lug $34_i$ to the carcass 36.

As they are provisioned during original manufacturing of the endless track 22, the designated lug-fastening parts $17_1$-$17_F$ are present in the endless track 22 before the endless track 22 is first used to provide traction to the construction vehicle 10 on the ground: they are not created in the endless track 22 as a result of a refurbishing or other repair process performed on the track 22 after the track 22 has worn out due to a prolonged period of use on the construction vehicle 10.

The designated lug-fastening parts $17_1$-$17_F$ can be implemented in various manners in various embodiments, examples of which are discussed below.

1.1 Lug-Fastening Hole

In some embodiments, a designated lug-fastening part $17_i$ may include a hole for receiving a fastener fastening a drive/guide lug $34_i$ to the carcass 36.

Figure 7A:
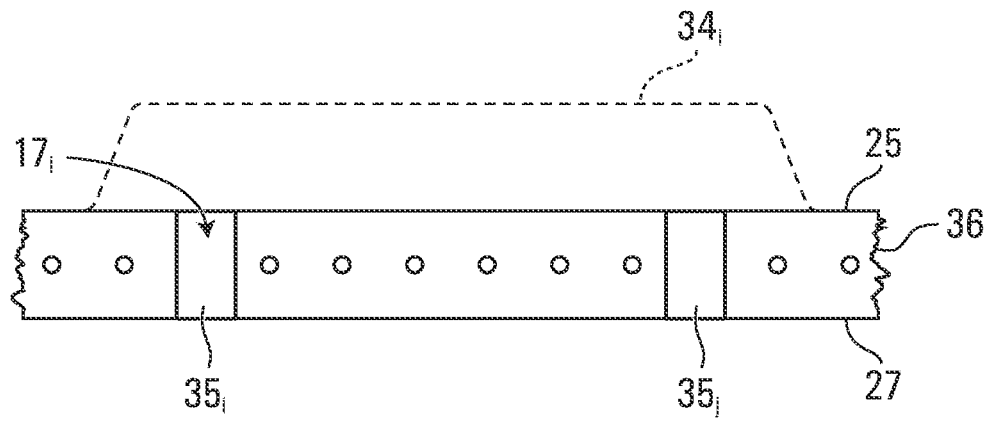
Figure 7B:
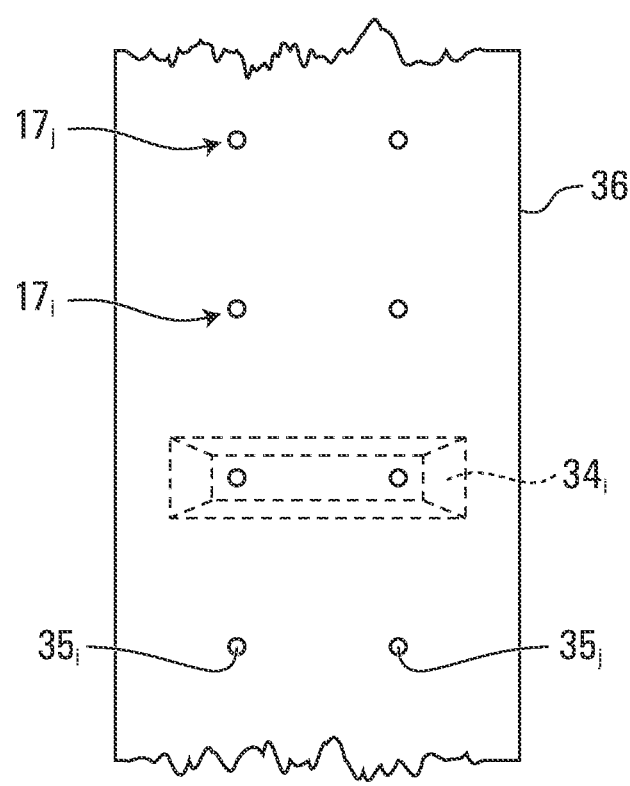

For example, FIGS. 7A and 7B shows an embodiment in which the designated lug-fastening parts $17_1$-$17_F$ include a plurality of holes $35_1$-$35_H$ to receive a plurality of fasteners $39_1$-$39_H$ for fastening the drive/guide lugs $34_1$-$34_N$ to the carcass 36. The holes $35_1$-$35_H$ are provided in the carcass 36 when the endless track 22 is originally manufactured by being molded or otherwise formed (e.g., drilled) in the carcass 36, i.e., they are premolded or otherwise preformed holes.

In this embodiment, the holes $35_1$-$35_H$ are through holes that extend through the rubber 38 of the carcass 36 from the inner side 25 to the ground-engaging outer side 27. The fasteners $39_1$-$39_H$ are inserted through the holes $35_1$-$35_H$ to attach the drive/guide lugs $34_1$-$34_N$. In other embodiments, the holes $35_1$-$35_H$ may be blind holes that extend in the carcass 36 from one of the inner side 25 and the ground-engaging outer side 27 without reaching the other of the inner side 25 and the ground-engaging outer side 27.

Figure 8:
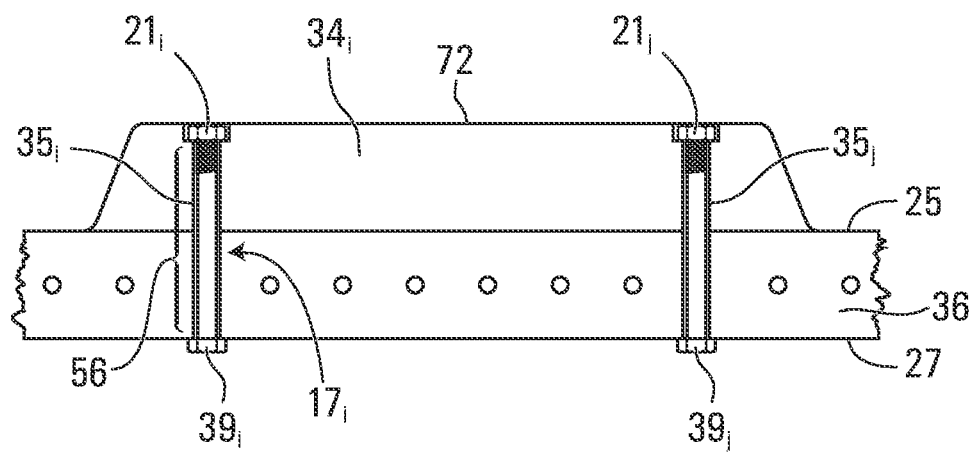
Figure 9:
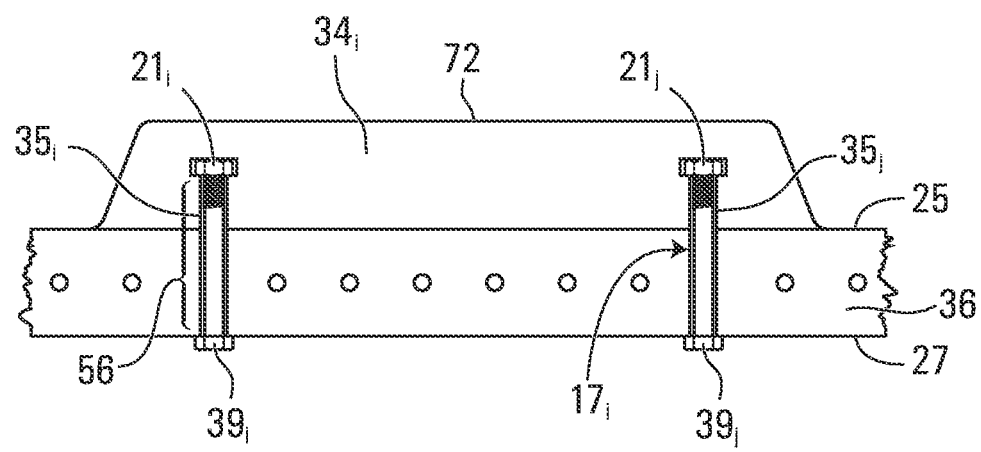

In some cases, as shown in FIGS. 8 and 9, a fastener $39_i$ may comprise a bolt inserted through an hole $35_i$ such that its head engages the ground-engaging outer side 27 of the endless track 22 and its threaded shank engages an internally threaded element 21 (e.g., a nut) inside or on the periphery 70 (e.g., on the top surface 72) of a drive/guide lug $34_i$ on the inner side 25 of the endless track 22.

Figure 10:
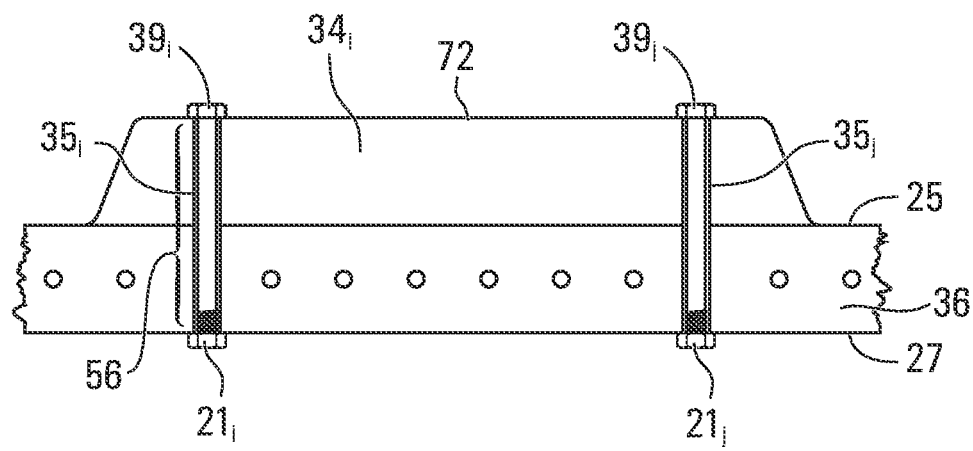

In other cases, as shown in FIG. 10, a fastener $39_i$ may comprise a bolt inserted through an hole $35_i$ such that its head engages the periphery 70 (e.g., the top surface 72) of a drive/guide lug $34_i$ on the inner side 25 of the endless track 22 and its threaded shank engages an internally threaded element 11 (e.g., a nut) on the ground-engaging outer side 27 of the endless track 22.

The fasteners $39_1$-$39_H$ inserted through the holes $35_1$-$35_H$ may attach the drive/guide lugs $34_1$-$34_N$ to the carcass 36 in various other ways in other cases.

The carcass 36 and/or the drive/guide lugs $34_1$-$34_N$ may be provided with recesses on their periphery in which fit enlarged parts of the fasteners $39_1$-$39_H$. For example, in cases in which the fasteners $39_1$-$39_H$ comprise bolts, the carcass 36 and/or the drive/guide lugs $34_1$-$34_N$ may be provided with recesses on their periphery in which fit heads of the bolts.

Figure 11:
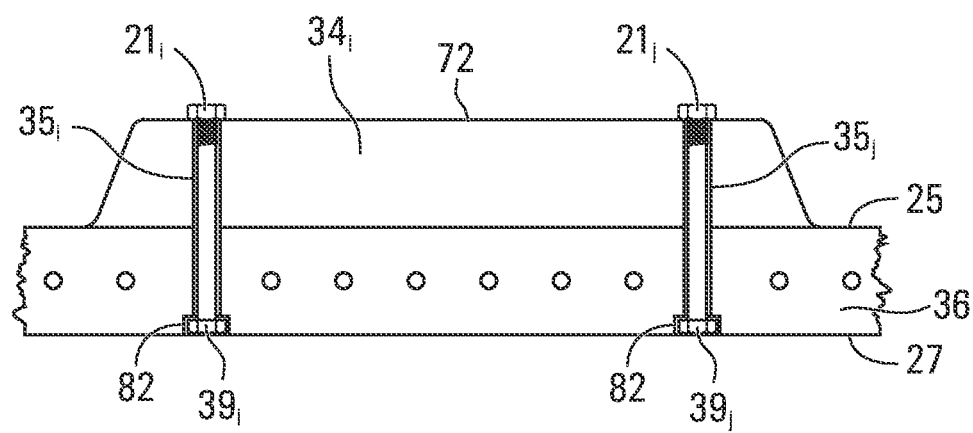

For instance, FIG. 11 illustrates an embodiment in which the carcass 36 is provided with a recess 82 on the ground-engaging side 27 to receive and accommodate the head of a fastener $39_i$ that attaches the drive/guide lug $34_i$ to the carcass 36. The recess 82 may be dimensioned such that the head of the fastener $39_i$ is generally flush with the main surface of the ground-engaging side 27 of the track 22. The recess 82 may also be dimensioned such that the head of the fasteners $39_i$ may be received without exposing any of the reinforcing cables $37_1$-$37_M$ enclosed within the carcass 36, as a certain amount of rubber 38 remains between the inner surface of the recess 82 and the cables $37_1$-$37_M$.

While in this embodiment the recess 82 is described above as being designed to receive and accommodate the head of a fastener $39_i$ (e.g., a bolt head), in other embodiments the recess 82 may instead receive and accommodate a threaded element (e.g., a nut) of the fastener $39_i$ in a similar fashion.

In some cases, a recess similar to the recess 82 may be provided in each of the drive/guide lugs $34_1$-$34_N$, such as along its top surface 72. Such a recess may be designed to receive and accommodate the head or the threaded element of a fastener such that it becomes generally flush with the top surface 72 of the drive/guide lug. This may reduce the potential for the fastener to hit the driving wheel 24.

In addition, in some cases, it may be possible that both the carcass 36 and each of the drive/guide lugs $34_1$-$34_N$, are provided with recesses that are capable of receiving and accommodating a specific one of the extremities of each of the fasteners $39_1$-$39_H$ (e.g., either the bolt head or the threaded nut element). In such cases, each portion of the fastener that is received and accommodated by its respective recess may be made to become flush with the surface in which it is accommodated, namely the main surface of the ground-engaging side 27 and the top surface 72 of the drive/guide lug. This arrangement may protect the ends of each of the fasteners $39_1$-$39_H$ from coming into direct contact with either the ground (in the case of the extremity of the fastener that is more proximate to the ground-engaging side 27) or with one or more of the wheels 24, 26, $28_1$-$28_R$ (in the case of the extremity of the fastener that is more proximate to the drive/guide lug).

The holes $35_1$-$35_H$ receiving the fasteners $39_1$-$39_H$ may be disposed such that the fasteners $39_1$-$39_H$ do not disrupt structural integrity or interrupt continuity of one or more of the reinforcements 42, 43 embedded in the rubber 38 of the carcass 36.

For example, in the embodiments discussed above, each hole $35_i$ is located such that a fastener $39_i$ received therein extends in the carcass 36 where there is no reinforcing cable, i.e., the fastener $39_i$ extends in the carcass 36 without intersecting any reinforcing cable. The carcass 36 is thus free of any reinforcing cable at the predetermined position of the fastener $39_i$ indicated by the hole $35_i$. In this way, each of the holes $35_1$-$35_H$ is located such that a fastener $39_i$ received therein does not break continuity of any of the reinforcing cables $37_1$-$37_M$.

More particularly, in the embodiments discussed above, each of the holes $35_1$-$35_H$ is located between adjacent ones of the reinforcing cables $37_1$-$37_M$.

Figure 7C:
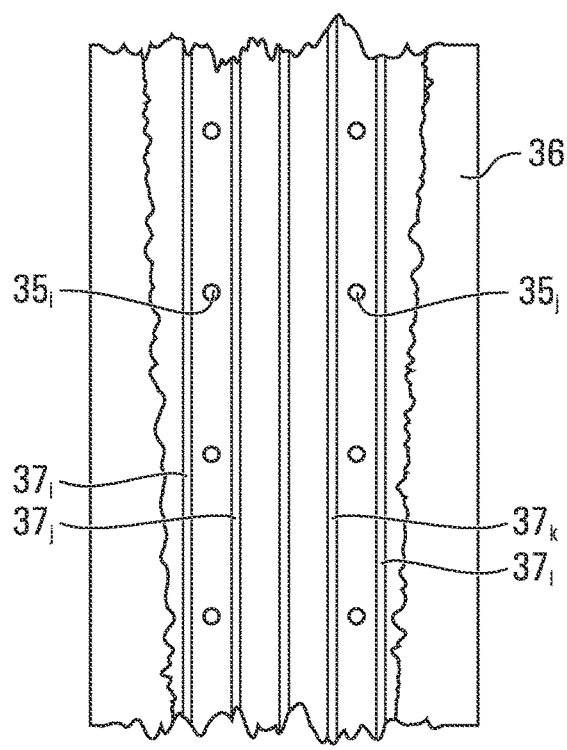

In some embodiments, as shown in FIG. 7C, the reinforcing cables $37_1$-$37_M$ may be arranged in a generally parallel fashion in which case there is a certain distance between each cable and its closest neighbor(s) that makes it possible to locate the holes $35_1$-$35_H$ between adjacent ones these cables.

Figure 7D:
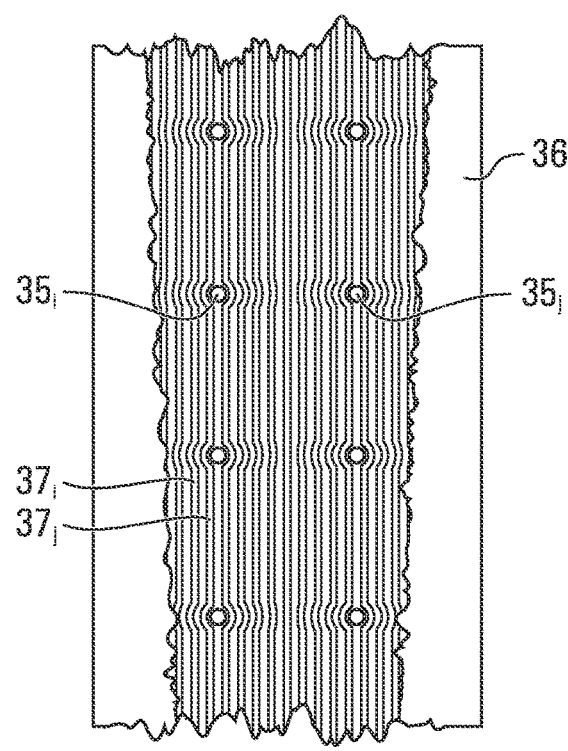

In other embodiments, the reinforcing cables $37_1$-$37_M$ may be arranged such that a spacing of adjacent ones of these cables changes as they approach the location of each of the holes $35_1$-$35_H$. For instance, FIG. 7D illustrates an embodiment in which the spacing of adjacent reinforcing cables next to a hole $35_j$ progressively increases as they approach the location of the hole $35_i$ and then progressively decreases once this location has been passed.

Figure 7E:
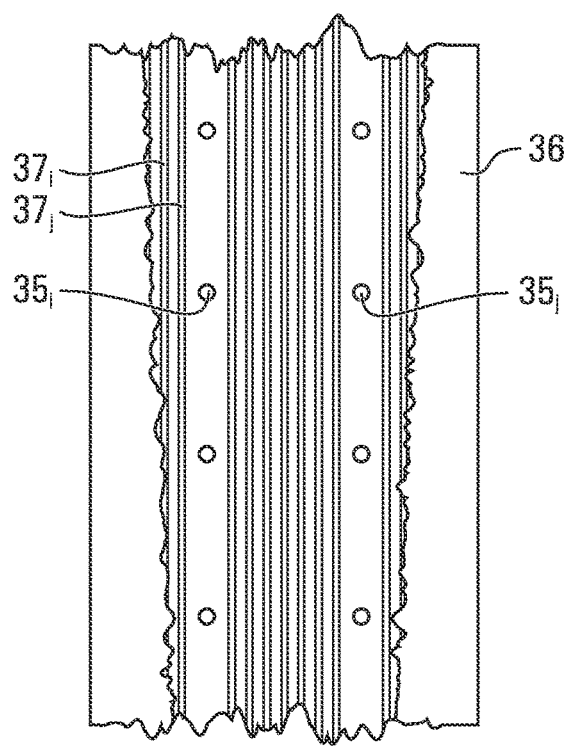

In yet other embodiments, the reinforcing cables $37_1$-$37_M$ may be arranged such that they have a varying pitch in the widthwise direction of the endless track 22. For instance, FIG. 7E shows an embodiment in which one or more reinforcing cables that would otherwise intersect the locations of the holes $35_1$-$35_H$ are omitted, i.e., "skipped".

In some cases, the holes $35_1$-$35_H$ receiving the fasteners $39_1$-$39_H$ may be formed directly in the rubber 38 of the carcass 36 such that the fasteners $39_1$-$39_H$ interface with the rubber 38 of the carcass 36.

Alternatively, in some cases, the holes $35_1$-$35_H$ receiving the fasteners $39_1$-$39_H$ may be defined by inserts embedded in the rubber 38 of the carcass 36 such that the fasteners $39_1$-$39_H$ interface with these inserts rather than directly with the rubber 38 of the carcass 36. These inserts may be retained in the carcass 36 in various ways, such as by the rubber 38 molded around them, by an adhesive, by being mechanically connected to at least one of the reinforcements 42, 43, and/or in any other suitable way.

Figure 12:
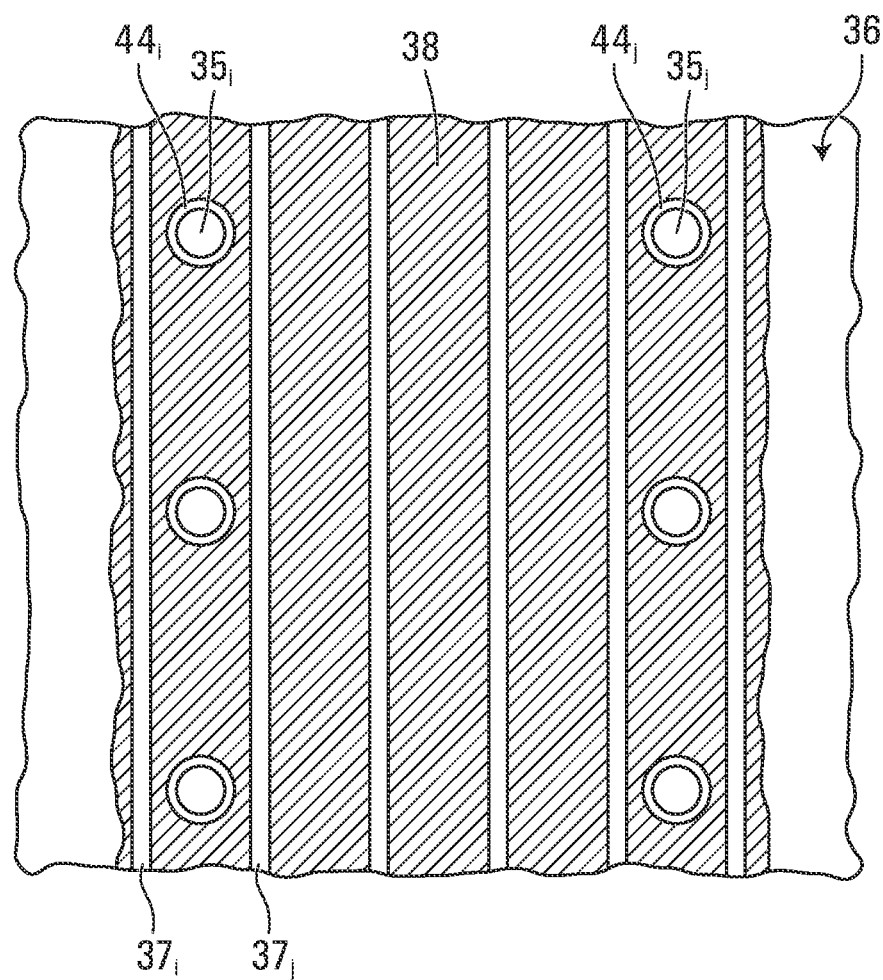

For example, FIG. 12 shows an embodiment in which the holes $35_1$-$35_H$ to accommodate the fasteners $39_1$-$39_H$ for mounting the drive/guide lugs $34_1$-$34_N$ to the carcass 36 are defined by a plurality of inserts $44_1$-$44_S$ embedded in the rubber 38 of the carcass 36. In this case, as they define openings, the inserts $44_1$-$44_S$ will be referred to as "sockets".

The sockets $44_1$-$44_S$ may be incorporated into the carcass 36 during molding of the rubber 38 of the carcass 36, such that they are an integral part of the carcass 36. In other cases, the sockets $44_1$-$44_S$ may be incorporated into the carcass 36 after molding of the rubber 38 of the carcass 36 (e.g., by being inserted into holes formed during or after molding of the carcass 36).

A socket $44_i$ may have any suitable shape, may comprise a single component or a plurality of interconnected components (e.g., components that are welded, fastened, or otherwise affixed to one another), and/or may be made of various materials (e.g., metals, plastics, ceramics and/or composites) in various embodiments.

In some embodiments, a socket $44_i$ may provide a simple passageway, i.e., a hole $35_i$, to accommodate a fastener $39_i$. The socket $44_i$ thus provides no retaining force to retain the fastener $39_i$: it simply allows the fastener $39_i$ to pass.

In other embodiments, a socket $44_i$ may mechanically engage a fastener $39_i$ accommodated therein to provide a main retention force on the fastener $39_i$. For example, in embodiments where the fastener $39_i$ is threaded, the socket $44_i$ may be an internally threaded fastening element to engage threads of the fastener $39_i$. Therefore, in some embodiments, a hole $35_i$ receiving a fastener $39_i$ may be threaded.

As shown in FIG. 13A, in some cases, a socket $44_i$ may extend through the carcass 36 from the inner side 25 to the ground-engaging outer side 27. In such cases, the hole $34_n$ defined by the socket $44_i$ may be a through hole that extends through the carcass 36 from the inner side 25 to the ground-engaging outer side 27.

As shown in FIG. 13B, in other cases, a socket $44_i$ may extend in the carcass 36 such that one of its extremities is closed off or otherwise inaccessible. For example, the socket $44_i$ may be integrated into the carcass such that its extremity closer to the ground-engaging side 27 is closed off by a layer of the rubber 38 of the carcass 36. In such cases, the hole $34_n$ defined by the socket $44_i$ is a blind hole that extends in the carcass 36 from one of the inner side 25 and the ground-engaging outer side 27 without reaching the other of the inner side 25 and the ground-engaging outer side 27.

A socket $44_i$ may be positioned in the carcass 36 such that it extends beyond the surface of the carcass 36. For example, the socket $44_i$ may be positioned vertically relative to the carcass 36 and/or the height of the socket $44_i$ may be selected to be greater than that of the carcass 36 so that a portion of the socket $44_i$ projects outside of the carcass 36.

Figure 14:
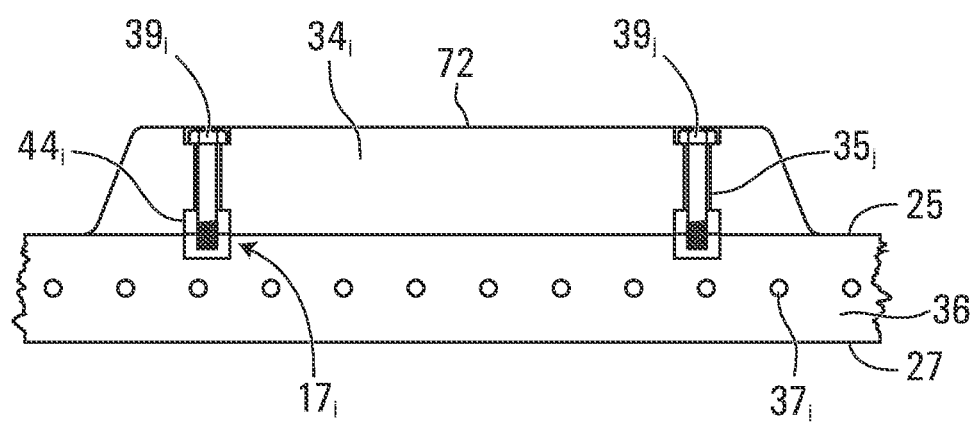

For example, FIG. 14 shows an embodiment in which a socket $44_i$ extends beyond the surface of the carcass 36. The portion of the socket $44_i$ projecting outside of the carcass 36 may facilitate the replacement of the drive/guide lugs $34_1$-$34_N$. For instance, the projecting portion of the socket $44_i$ may help a user visually line up a replacement drive/guide lug with the other lugs on the inner side 25 so that all the lugs on the track 22 are centered. Furthermore, if the design of each of the drive/guide lugs $34_1$-$34_N$ includes a recess on its lower surface that is dimensioned to accept the projection of the socket $44_i$, a user may use tactile feedback to align replacement lugs with the other drive/guide lugs $34_1$-$34_N$, since the projection of the socket $44_i$ outside of the carcass 36 would "click" into its corresponding recess on the bottom surface of the lug.

Although in the above embodiments, a socket $44_i$ is incorporated into the carcass 36 at an angle that is generally perpendicular to the plane of the endless track 22, in other embodiments, a socket $44_i$ may be incorporated into the carcass 36 at angles other than a right angle.

In the embodiments considered above, a socket $44_i$ defines a single one of the holes $35_1$-$35_H$ and thus accommodates a single one of the fasteners $39_1$-$39_H$. The socket $44_i$ comprises an interior portion in which is received a portion of a fastener $39_i$ and an exterior portion that allows it to be embedded within the rubber 38 of the carcass 36.

The shape of the interior portion of the socket $44_i$ is generally complimentary to the portion of the fastener $39_i$ that is received by it. For example, if the fastener $39_i$ comprises a round bolt, the interior portion of the socket $44_i$ may be a round void. The interior portion of the socket $44_i$ may also include certain features that allow the fastener $39_i$ to become attached to the socket $44_i$, such as matching threads or epoxy.

The exterior portion of the socket $44_i$ may be shaped to facilitate integration of the socket $44_i$ within the carcass 36. For example, in embodiments in which the socket $44_i$ is intended to be placed in contact with one or more of the reinforcing cables $37_1$-$37_M$, the exterior portion of the socket $44_i$ may be shaped so as to engage the reinforcing cable(s).

Also, in some embodiments, the exterior portion of the socket $44_i$ may include features that improve its integration with the rubber 38 of the carcass 36. For example, the exterior portion of the socket $44_i$ may include treatments (e.g., a treatment that roughens the surface) and/or coatings that provide for better adhesion between the socket $44_i$ and the rubber 38 in which it is embedded.

In addition, in some embodiments, a socket $44_i$ may be mechanically connected to at least one of the reinforcements 42, 43 of the carcass 36. For example, in some cases, a socket $44_i$ may be mechanically connected to one or more of the reinforcing cables $37_1$-$37_M$ by being welded to, interlocked with or otherwise mechanically affixed to one or more of the reinforcing cables $37_1$-$37_M$.

Figure 15A:
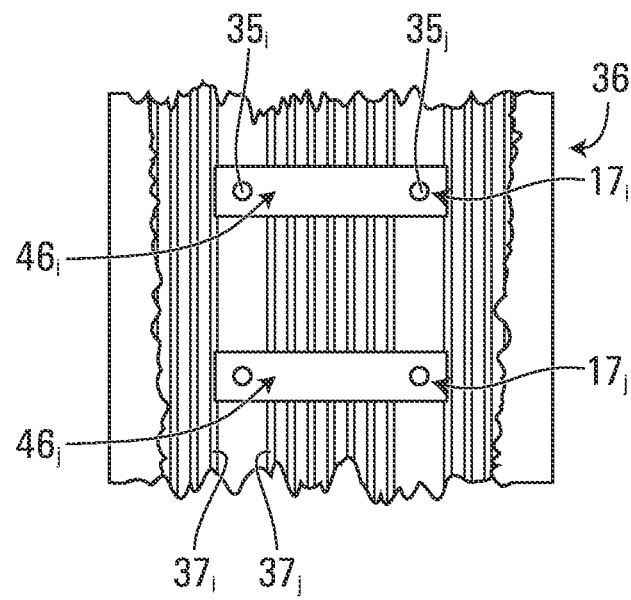
Figure 15B:
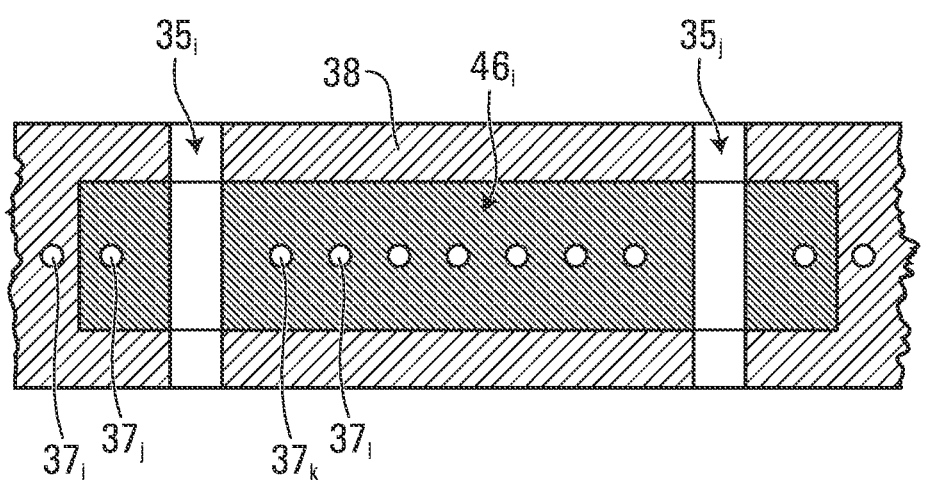

FIGS. 15A and 15B shows an embodiment in which the holes $35_1$-$35_H$ to accommodate the fasteners $39_1$-$39_H$ for mounting the drive/guide lugs $34_1$-$34_N$ to the carcass 36 are defined by a plurality of sockets $46_1$-$46_R$ embedded in the rubber 38 of the carcass 36. In this case, each socket $46_i$ defines plural ones of the holes $35_1$-$35_H$. Also, in this case, the sockets $46_1$-$46_R$ are mechanically connected to at least one of the reinforcements 42, 43 of the carcass 36. More specifically, in this example, the sockets $46_1$-$46_R$ are mechanically connected to the reinforcing cables $37_1$-$37_M$.

More particularly, in this embodiment, a socket $46_i$ comprises an elongate member 75 that includes multiple ones of the holes $35_1$-$35_H$. Specifically, in this case, the elongate member 75 includes two (2) holes $35_i$ and $35_j$. In other cases, the elongate member 75 may include three (3) or more of the holes $35_1$-$35_H$ The elongate member 75 is embedded within the rubber 38 of the carcass 36 and extends transversely in relation to the longitudinal axis 45 of the endless track 22. In this case, the elongate member 75 extends generally along the widthwise direction of the endless track 22.

The elongate member 75 may have any suitable shape, may comprise a single component or a plurality of interconnected components (e.g., components that are welded, fastened, or otherwise affixed to one another), and/or may be made of various materials (e.g., metals, plastics, ceramics and/or composites) in various embodiments.

The elongate member 75 is mechanically connected to some of the reinforcing cables $37_1$-$37_M$. For example, in this embodiment, the elongate member 75 comprises a plurality of holes $54_1$-$54_C$ in which are received some of the reinforcing cables $37_1$-$37_M$. The holes $54_1$-$54_C$ extend generally parallel to the longitudinal direction of the endless track 22, and thus extend transversally to the holes $35_i$ and $35_j$. Since some of the reinforcing cables $37_1$-$37_M$ pass through the elongate member 75, they effectively serve to anchor the elongate member 75 within the carcass 36.

The elongate member 75 may be configured to enhance the stability of the drive/guide lug $34_n$ on the endless track 22 by supporting the socket $46_i$ over a larger cable surface area. For example, the elongate member 75 may be made wider along the longitudinal direction of the endless track 22 such as to engage a greater length of the reinforcing cables $37_1$-$37_M$. Specifically, the elongate member 75 may have a width, measured along the longitudinal direction of the endless track 22, which can be characterized with relation to the front-to-rear dimension $L_L$ of a drive/guide lug $34_n$. For instance, in some embodiments, the width of the elongate member 75 may be at least 25%, in some cases at least 50%, in some cases at least 75%, or in some cases at least 100% of the front-to-rear dimension $L_L$ of the drive/guide lug $34_n$.

Figure 17:
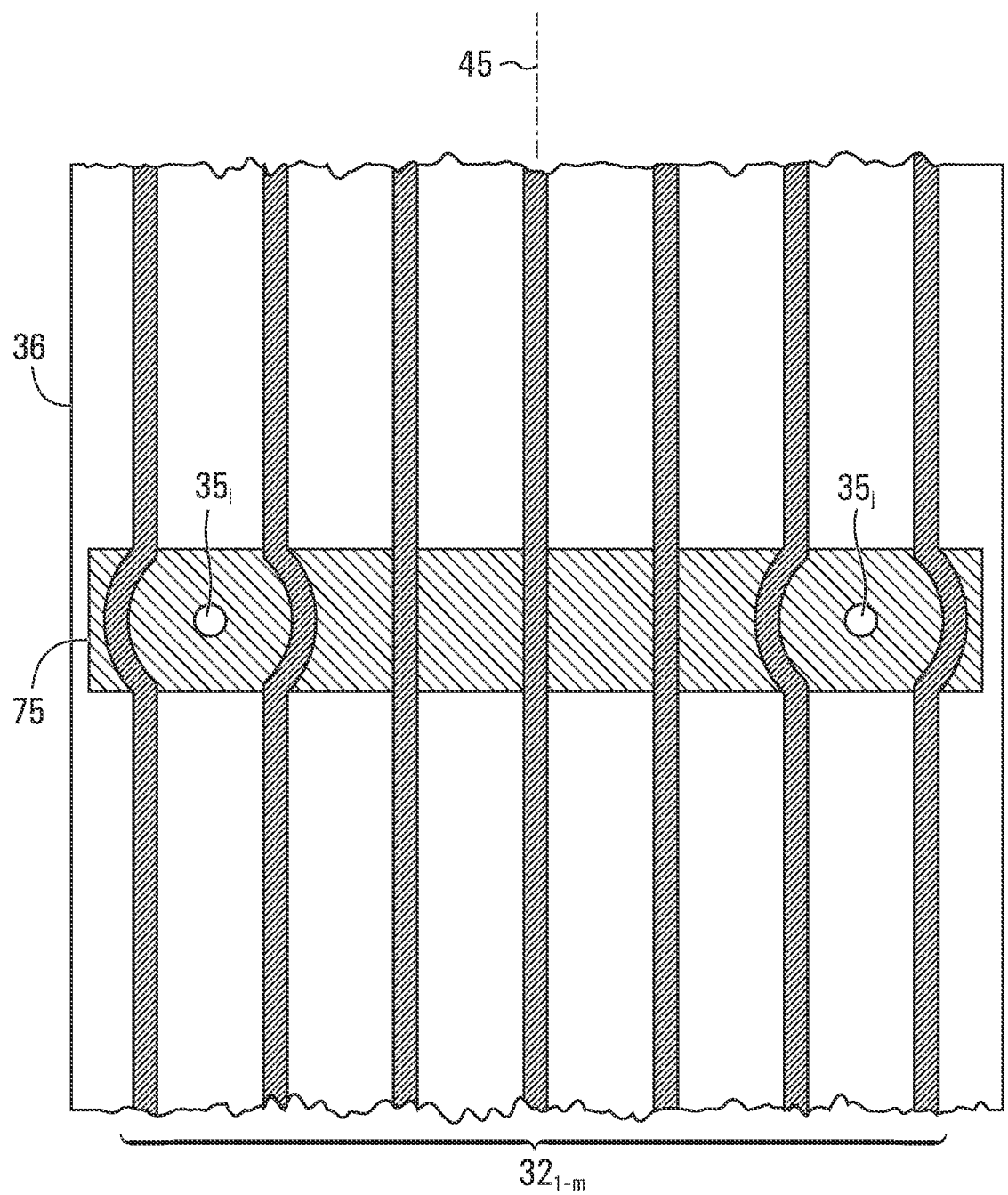

The holes $54_1$-$54_C$ of the elongate member 75 serve as channels to guide some of the reinforcing cables $37_1$-$37_M$. In some embodiments, these channels may be arranged such that the distance between adjacent ones of these cables changes as they approach the location of each of the holes $35_i$ and $35_j$ of the elongate member 75. For instance, FIG. 17 illustrates an embodiment in which the distance between adjacent reinforcing cables next to the hole $35_j$ progressively increases as they approach the location of the hole $35_i$ and may progressively decrease once this location has been passed.

Figure 16:
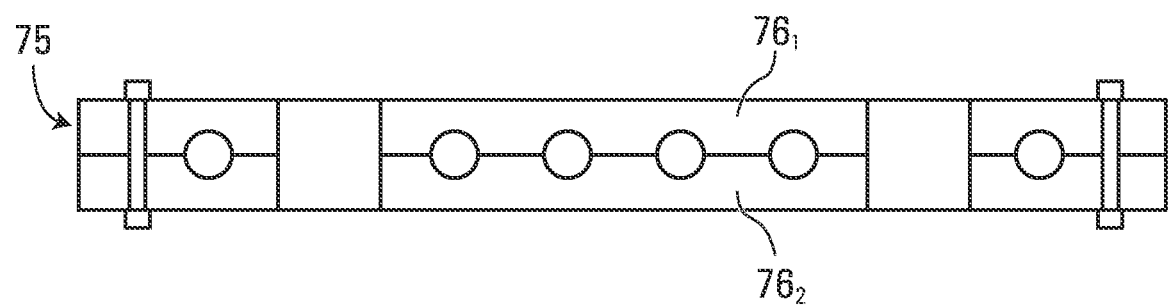

The elongate member 75 may be designed to facilitate placement of some of the reinforcing cables $37_1$-$37_M$ in the holes $54_1$-$54_C$. For instance, in some embodiments, as shown in FIG. 16, the elongate member 75 may comprise two (2) parts $76_1$, $76_2$ which are initially separated to allow placement of the reinforcing cables and which can then be secured together, in this case, by fasteners or, in other cases, by welding or any other way.

In some cases, certain ones of the reinforcing cables $37_1$-$37_M$ may be permanently affixed to a socket $46_i$. For example, a reinforcing cable may be welded at its entry to and/or exit from its corresponding hole $54_i$ within the elongate member 75 and/or may be crimped by the elongate member 75.

Figure 15C:
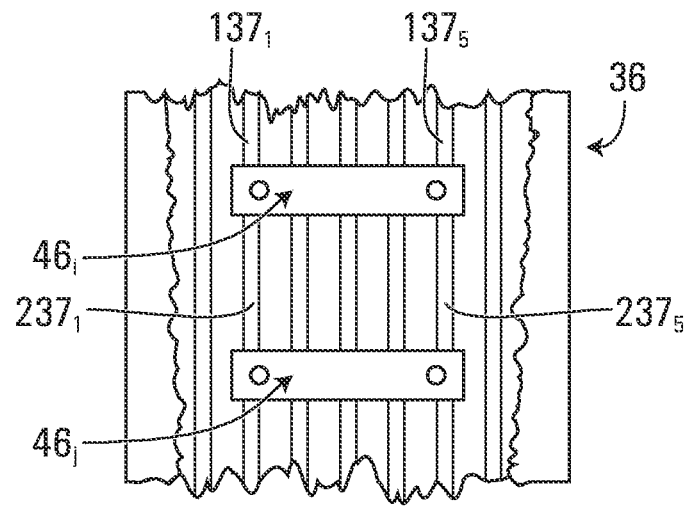

The elongate member 75 may be mechanically connected to some of the reinforcing cables $37_1$-$37_M$ in other ways in other embodiments. For example, in some embodiments, as shown in FIG. 15C, the elongate member 75 may be secured (e.g., welded) to a first set of segments of reinforcing cables $137_1$-$137_S$ and a second set of segments of reinforcing cables $237_1$-$237_S$ without any of these segments of reinforcing cables extending through the elongate member 75.

While the above embodiments presented some examples of sockets defining the holes $35_1$-$35_H$ to accommodate the fasteners $39_1$-$39_H$ for mounting the drive/guide lugs $34_1$-$34_N$ to the carcass 36, various other types of sockets may be used in other embodiments.

In some embodiments, the holes $35_1$-$35_H$ for receiving the fasteners $39_1$-$39_H$ may be left open after they are provided during original manufacturing of the endless track 22 until they receive these fasteners.

Figure 7F:
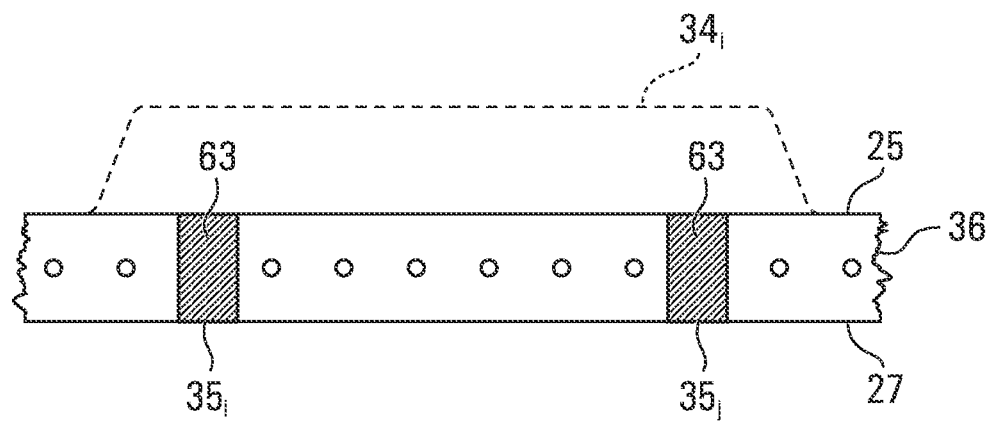
Figure 7G:
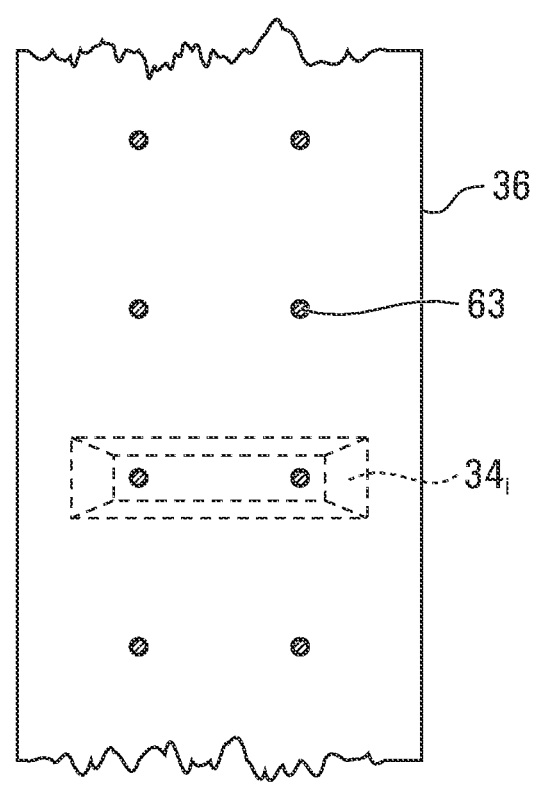

Alternatively, in some embodiments, as shown in FIGS. 7F and 7G, each hole $35_i$ may contain a filler 63 when it is provided during original manufacturing of the endless track 22. The filler 63 fills at least part, in this case all, of the hole $35_i$ and is removable from the hole $35_i$ to allow the hole $35_i$ to receive a fastener $39_i$. In embodiments in which the drive/guide lugs $34_1$-$34_N$ are molded with the carcass 36, the filler 63 can ensure that the hole $35_i$ remains intact.

For example, in some embodiments, the filler 63 may be a polymeric filler. In some cases, the polymeric filler 63 may be an elastomeric filler. The elastomeric filler 63 may contain an elastomer which does not consolidate with the rubber 38 of the carcass 36 during molding. For instance, in some examples, the elastomeric filler 63 may contain silicone rubber or polyurethane. In other cases, the polymeric filler 63 may be a rigid plastic plug. The filler 63 may be colored to distinguish it from the rubber 38 of the carcass 36.

1.2 Lug-Fastening Element Projecting from Carcass

In some embodiments, a designated lug-fastening part $17_i$ may include a fastening element of a fastener which is secured to and projects from the carcass 36 to fasten a drive/guide lug $34_i$ to the carcass 36.

Figure 18:
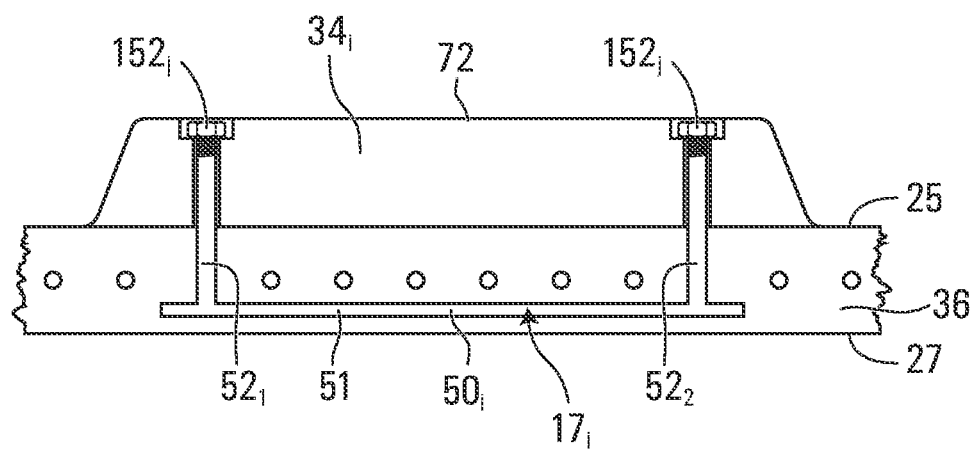

For example, FIG. 18 shows an embodiment in which the endless track 22 comprises a plurality of inserts $50_1$-$50_K$ each comprising an anchor 51 which is embedded in the rubber 38 of the carcass 36 and a pair of fastening elements $52_1$, $52_2$ which project from the carcass 36 and to which a drive/guide lug $34_i$ is fastened. The anchor 51 and the fastening elements $52_1$, $52_2$ of the insert $50_i$ may be integral with one another or may be distinct parts separable from one another.

More particularly, in this embodiment, the anchor 51 of the insert $50_i$ comprises a member (e.g., a bar or plate) that is embedded within the rubber 38 of the carcass 36 between the inner side 25 and the ground-engaging side 27 of the track 22. In this case, this member is elongated generally perpendicularly to the longitudinal axis 45 of the track 22. In other cases, this member may be elongated generally parallel to the longitudinal axis 45 of the track 22. Also, in this example, the anchor 51 is located between the reinforcing cables $37_1$-$37_M$ and the ground-engaging outer side 27 of the carcass 36, which may further enhance its anchoring function.

Each fastening element $52_i$ of the insert $50_i$ comprises a rod that is integrally formed with or otherwise attached to the anchor 51. In this case, the rod is externally threaded and designed to engage an internally threaded fastening element $152_i$ (e.g., a nut). The external threads may extend along the entire length (i.e., height) of the rod or just along a specific part of the rod, such as its top half.

In other embodiments, a fastening element secured to and projecting from the carcass 36 may be an internally threaded fastening element. For example, such an embodiment was discussed above in connection with FIG. 14 in which each socket $44_i$ defines an internally threaded fastening element which projects from the carcass 36.

Figure 22:
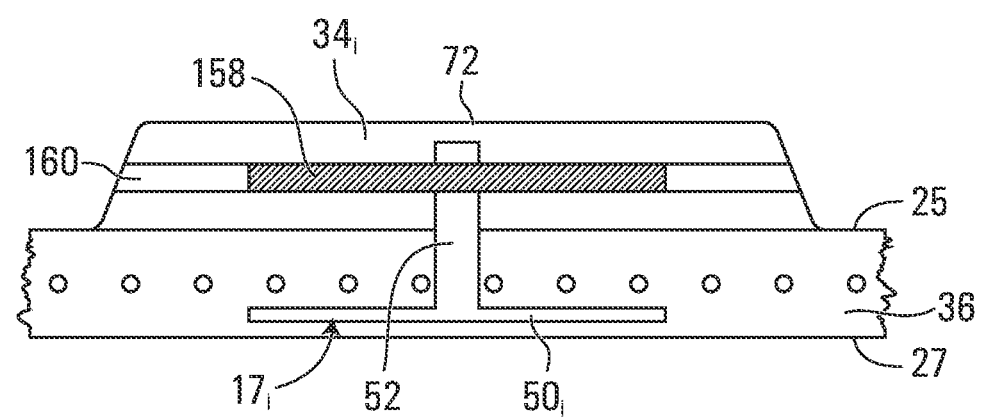

FIG. 22 shows an embodiment in which a fastening element 52 of the insert $50_i$ embedded in the carcass 36 includes a hole 148 for receiving a locking member 158 inserted via a hole 160 formed in the drive/guide lug $34_i$. The locking member 158 prevents rotation of the drive/guide lug $34_i$ relative to the carcass 36, even through there is a single fastening element 52. In some cases, the locking member 158 may be a non-threaded locking member (e.g., a locking pin) in which case the hole 148 may be non-threaded. In other cases, the locking member 158 may be threaded (e.g., a locking screw) in which case the hole 148 may be threaded.

In some embodiments, the inserts $50_1$-$50_K$ embedded in the rubber 38 of the carcass 36 may be mechanically secured to one or more of the reinforcements 42, 43 embedded in the rubber 38 of the carcass 36.

Figure 19:
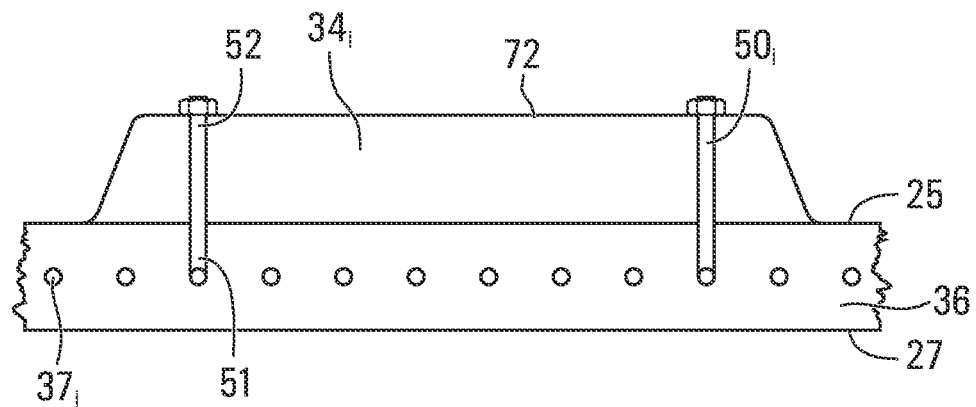

For example, FIG. 19 shows an embodiment in which the inserts $50_1$-$50_K$ are mechanically connected to the reinforcing cables $37_1$-$37_M$ of the carcass 36. More particularly, in this case, the inserts $50_1$-$50_K$ are attached to the reinforcing cables $37_1$-$37_M$.

More specifically, in this embodiment, the insert $50_i$ comprises a rod with the anchor 51 being attached (e.g., welded) to one of the reinforcing cables $37_1$-$37_M$ at one of its terminal ends and the fastening element 52 at its opposite terminal end. The fastening element 52 is externally threaded to allow engagement of an internally threaded fastening element (e.g., a nut) as described previously.

In this embodiment, the length of the insert $50_i$ is long enough such that the fastening element 52 extends to or above the top surface 72 of the drive/guide lug $34_i$. In this case, the drive/guide lug $34_i$ comprises an opening on its bottom surface (i.e., the surface of the periphery 70 that is opposite the top surface 72) that leads to a channel through the body of the lug, which terminates in a similar opening at the lug's top surface 72. Because the fastening element 52 of the insert $50_i$ extends to or above this surface, attachment of the internally threaded element would exert biasing pressure on the drive/guide lug $34_i$ towards the carcass 36. In this way, the fastening element 52 may be used to clamp the drive/guide lug $34_i$ to the carcass 36.

Figure 20:
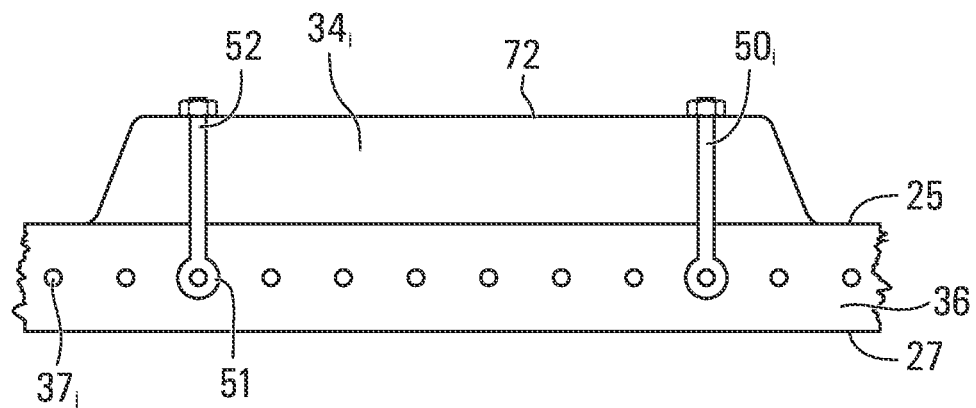

FIG. 20 shows another embodiment in which the inserts $50_1$-$50_K$ are mechanically connected to the reinforcing cables $37_1$-$37_M$ of the carcass 36. More particularly, in this case, the inserts $50_1$-$50_K$ are not welded to or integrally formed with the reinforcing cables $37_1$-$37_M$. Rather, in this embodiment, the anchor 51 comprises a hole 19 to receive and allow the passing through of one of the reinforcing cables $37_1$-$37_M$. The size of the hole 19 of the anchoring portion 51 may be large enough to allow the passing through of a respective one of the reinforcing cables $37_1$-$37_M$ but can also be made tight enough that the movement of the cable $37_i$ through the hole 19 requires some pressure to be exerted (and/or lubrication to be applied to overcome this pressure). In this way, the pressure between the cable $37_i$ and the hole 19 of the anchor 51 is enough to keep the insert $50_i$ in position.

In other embodiments, the anchor 51 of the insert $50_i$ may comprise a plurality of holes such as the hole 19 in which respective ones of the reinforcing cables $37_1$-$37_M$ may be received in order to connect the insert $50_i$ to these multiple cables. In this way, forces applied to the insert $50_i$ during use of the drive/guide lug $34_i$ may be distributed amongst multiple cables of the reinforcing cables $37_1$-$37_M$, which may enhance the overall stability of the lug $34_i$.

In other embodiments, the insert $50_i$ may be configured similarly to the socket $46_i$ discussed previously in connection with FIGS. 15A and 15B. Specifically, the insert $50_i$ may comprise an elongate member such as the elongate member 75 of the socket $46_i$ that includes multiple holes that receive multiple ones of the reinforcing cables $37_1$-$37_M$. In this case, instead of having holes such as the holes $35_i$, $35_j$ of the socket $46_i$, the insert $50_i$ may comprise two (2) or more fastening elements (such as the fastening elements $52_1$, $52_2$ discussed previously) which project outside of the carcass 36 and to which is connected the drive/guide lug $34_i$.

Instead of being integral with one another, in some embodiments, the anchor 51 and the fastening element 52 of an insert $50_i$ may be distinct parts that are separable from one another.

For example, in some embodiments, the fastening element 52 may comprise a threaded rod that is securable into an internally threaded opening of the anchor 51.

As another example, in some embodiments, the insert $50_i$ may comprise a rod where both the anchor 51 and the fastening element 52 are externally threaded for engagement with an internally threaded element. For instance, in some cases, the internally threaded element into which the rod may be inserted may be implemented by a socket $44_i$ or a socket $46_i$ as previously discussed in connection with FIGS. 12 to 15, which provides one or more of the holes $35_1$-$35_H$. In these cases, the anchor 51 of the insert $50_i$ may first be screwed into a hole $35_i$ of the socket $44_i$, $46_i$ so that the insert $50_i$ may be firmly secured to the carcass 36. Once this is complete, the fastening element 52 of the insert $50_i$ is inserted into the drive/guide lug $34_i$, which may comprise a channel extending through its body to its periphery 70 (e.g., its top surface 72), after which the lug may be clamped to the carcass 36 through the attachment of an internally threaded element (e.g., a nut) to the fastening portion 52.

Figure 21:
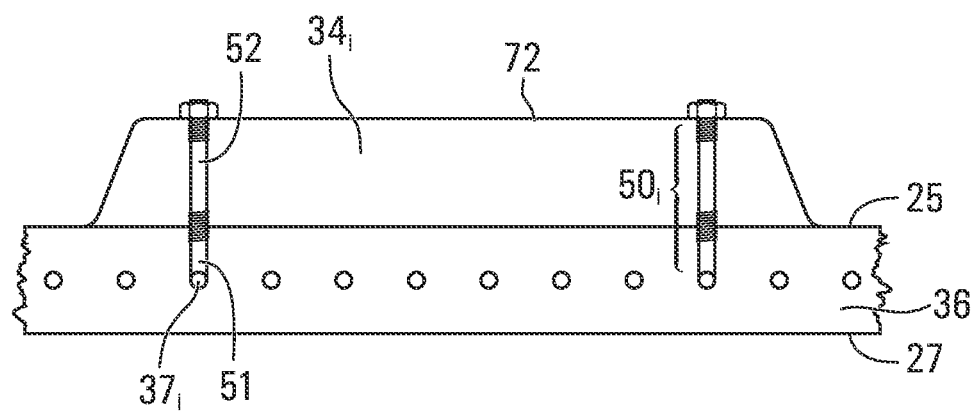

As yet another example, FIG. 21 shows an embodiment of the insert $50_i$ where the anchor 51 comprises a rod that is directly attached to one of the reinforcing cables $37_1$-$37_M$ at one terminal end (e.g., through welding) and has a threaded portion at its other terminal end. Depending on the length of the anchor 51, the threaded portion may be flush with the surface of the carcass 36 or may be located somewhat above or below this surface. The fastening element 52 also comprises a rod that has threaded portions at both of its terminal ends. One terminal end of this rod is designed to engage with the threaded portion of the anchor 51, and consequently is equipped with an opposite set of threads. For instance, if the anchor 51 is located flush with or below the surface of the carcass 36 and is internally threaded, the terminal portion of the fastening element 52 that is designed to be attached here will be externally threaded. The other terminal end of the fastening element 52 is also threaded to allow attachment of an internally threaded fastening element (e.g., a nut) in order to attach and clamp the drive/guide lug $34_i$ to the carcass 36.

1.3 Lug-Fastening Mark

In some embodiments, a lug-fastening part $17_i$ may include a mark marking the predetermined position of a fastener $39_i$ to fasten a drive/guide lug $34_i$ to the carcass 36.

Figure 39A:
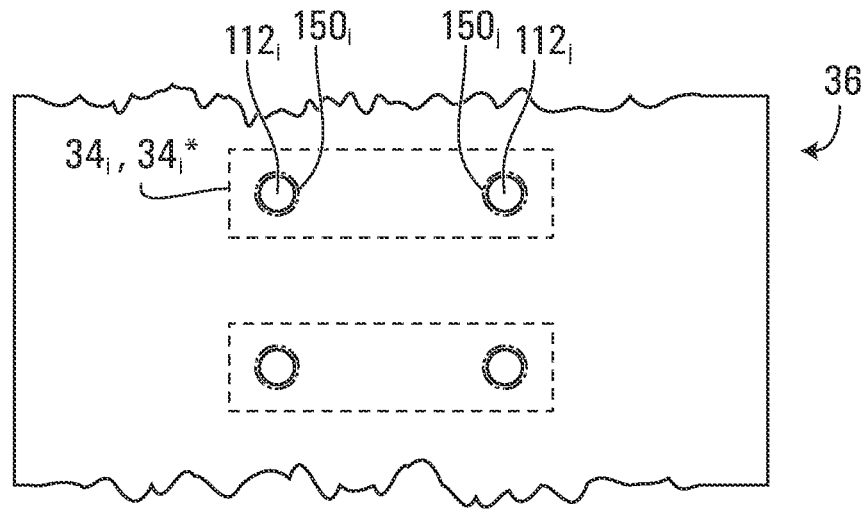
FIGS. 39 to 40C show various examples of embodiments in which the endless track has marks marking locations at which fasteners are to be placed to fasten drive/guide lugs to the carcass.
Figure 39B:
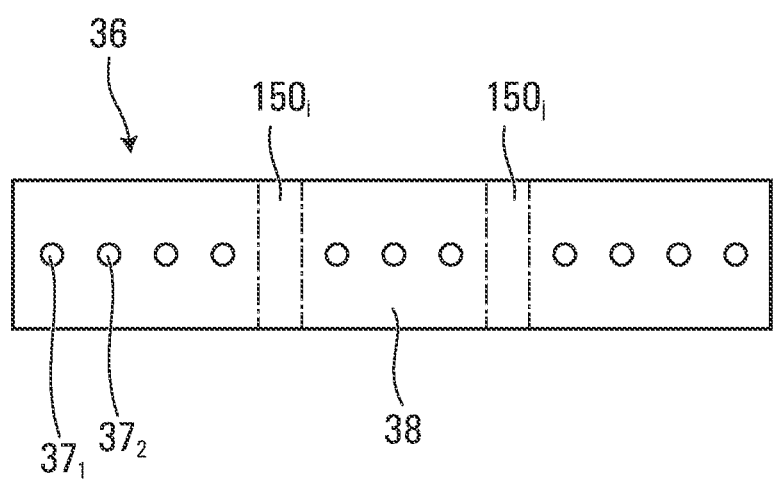

For example, FIGS. 39A and 39B show an embodiment in which the endless track 22 comprises a plurality of marks $112_1$-$112_H$ that identify the locations of a plurality of fastener-receiving areas $150_1$-$150_P$ which are located such that, after the drive/guide lugs $34_1$-$34_N$ have worn out and have been removed to be replaced with replacement drive/guide lugs $34_1$*-$34_N$*, a plurality of fasteners (e.g., such as the fasteners $39_1$-$39_H$) can be positioned in the fastener-receiving areas $150_1$-$150_H$ to fasten the replacement drive/guide lugs $34_1$*-$34_N$* to the carcass 36. The outlines of drive/guide lugs $34_1$-$34_N$ and the replacement drive/guide lugs $34_1$*-$34_N$* are represented by dotted lines whereas the fastener-receiving areas $150_1$-$150_H$ are represented by dash-dotted lines.

The fastener-receiving areas $150_1$-$150_H$ contain some of the rubber 38 of the carcass 36. Depending on the type and configuration of the fasteners that attach the replacement drive/guide lugs $34_1$*-$34_N$* to the carcass 36, the fastener-receiving areas $150_1$-$150_H$ may extend through the carcass 36 or extend only a certain depth into the carcass 36 without going through it. For example, as is shown in FIG. 39B, in embodiments where an end portion of a fastener has to travel through the carcass 36, such as in cases where that end portion of the fastener is to be located on the ground-engaging side 27 of the carcass 36 or on the periphery 70 of a replacement drive/guide lug $34_i$*, the fastener-receiving areas $150_1$-$150_H$ may extend through the carcass 36. As another example, in embodiments where an end portion of a fastener (e.g., a nut) is to be embedded in the rubber 38 of the carcass 36, the areas $150_1$-$150_H$ may extend only to the depth where that end portion of the fastener is to be located.

Figure 40A:
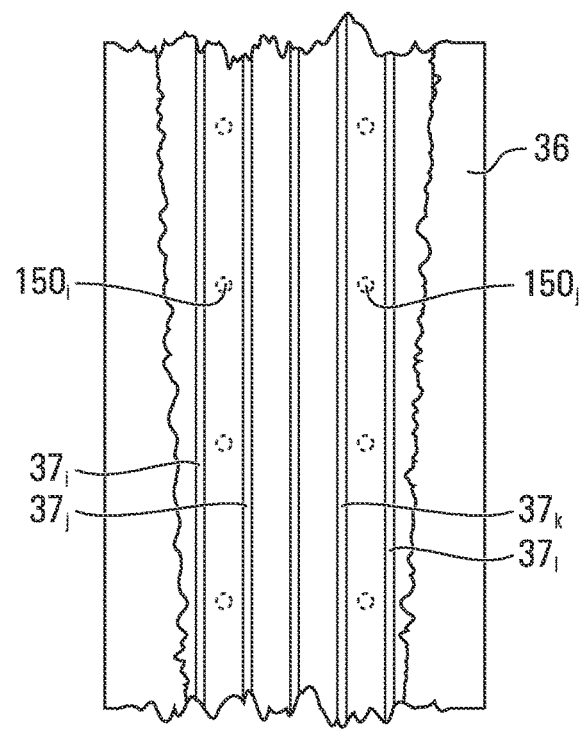
Figure 40B:
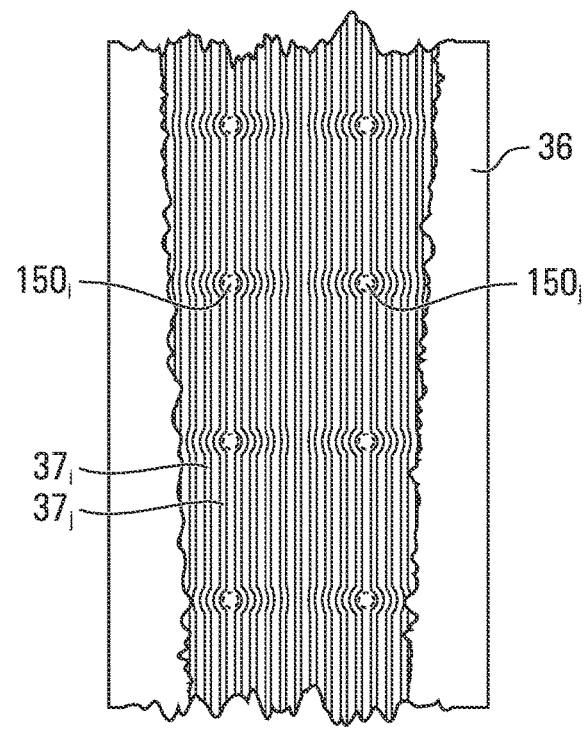
Figure 40C:
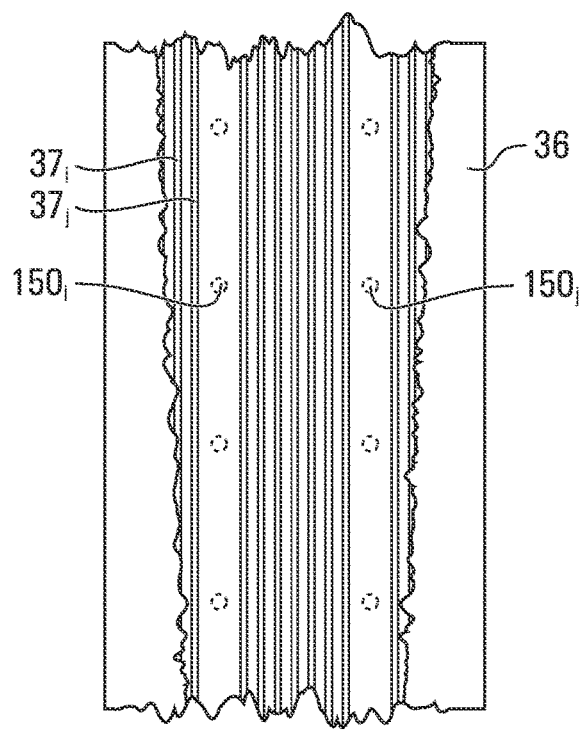

The fastener-receiving areas $150_1$-$150_H$ may be located such that, when inserted in the carcass 36, the fasteners fastening the replacement drive/guide lugs $34_1$*-$34_N$* to the carcass 36 do not disrupt structural integrity or interrupt continuity of one or more of the reinforcements 42, 43 embedded in the rubber 38 of the carcass 36. For example, in this embodiment, the fastener-receiving areas $150_1$-$150_H$ are located where the fasteners do not interfere and/or damage the reinforcing cables $37_1$-$37_M$. In some cases, as shown in FIG. 40A, this may be achieved by arranging the reinforcing cables $37_1$-$37_M$ in a generally parallel fashion such that there is a certain distance between cables that makes it possible to locate the fastener-receiving areas $150_1$-$150_H$ between adjacent ones these cables. In other cases, as shown in FIG. 40B, the reinforcing cables $37_1$-$37_M$ may be arranged such that the spacing of adjacent reinforcing cables next to a fastener-receiving area $150_i$ increases as they approach the location of the fastener-receiving area $150_i$ and then decreases once this location has been passed. In yet other cases, as shown in FIG. 40C, the reinforcing cables $37_1$-$37_M$ may be arranged such that they have a varying pitch in the widthwise direction of the endless track 22, for instance, to have one or more reinforcing cables that would otherwise intersect the locations of the fastener-receiving areas $150_1$-$150_H$ being omitted, i.e., "skipped".

In this embodiment, the marks $112_1$-$112_H$ are drilling marks which identify locations where the carcass 36 should be drilled to create holes for accommodating fasteners to fasten the replacement drive/guide lugs $34_1$*-$34_N$* to the carcass 36. This identification of precise locations where holes should be drilled allows (1) avoiding damage to the internal structure (e.g., the reinforcing cables $37_1$-$37_M$) of the carcass 36 and (2) proper positioning of the holes such that the replacement drive/guide lugs $34_1$*-$34_N$* are properly located on the track 22, in particular in terms of their pitch and their widthwise positioning. Once the drive/guide lugs $34_1$-$34_N$ are ready to be replaced with the replacement drive/guide lugs $34_1$*-$34_N$*, holes may then be drilled into the fastener-receiving areas $150_1$-$150_H$ to remove the rubber 38 of these areas. Once these areas have been drilled, a set of fasteners can be installed in the drilled areas $150_1$-$150_M$ in order that the replacement drive/guide lugs $34_1$*-$34_N$* be attached to the carcass 36.

In addition to providing a location identifying function, the marks $112_1$-$112_H$ may also convey other information. For example, in this embodiment where the marks $112_1$-$112_H$ are drilling marks, each mark $112_i$ may convey the size of the hole to drill such that the resulting hole is sufficiently large (i.e., not too tight) to receive a fastener but not too large to damage the internal structure of the carcass 36 (e.g., the reinforcing cables $37_1$-$37_M$). For instance, in some cases, the hole size dimension may be conveyed by a shape of the mark $112_i$ (e.g., a diameter of a circular mark) and/or by text (e.g., a numerical dimension).

The marks $112_1$-$112_H$ may be implemented in various ways in various embodiments.

For example, in some embodiments, the marks $112_1$-$112_H$ may be molded marks that are molded into rubber and/or other elastomeric material of the endless track 22. A molded mark $112_i$ may comprise a molded projection, a molded recess, a molded texture, or any other marking element which can be molded in rubber and/or other elastomeric material of the endless track 22.

In cases where a molded mark $112_i$ comprises a molded projection or recess, the molded projection or recess may have any suitable shape. For example, in some examples, the molded projection or recess may be a circular dimple or recess at the location of the fastener-receiving area $150_i$. The diameter of the dimple or recess may correspond to the largest hole to be drilled, and can thus indicate to a user the largest drill bit that may be reliably used. In this way, a user is provided with an indication of both where to drill, as well as the size of drill bit required in order that the resulting hole is sufficiently large to receive a fastener, and yet is not so large that it will damage the internal structure of the carcass 36, such as the reinforcing cables $37_1$-$37_M$. The molded projection or recess may have various other shapes in other examples (e.g., a polygonal shape, a "target" shape such as an "X" or a cross, etc.) and may have another dimension (e.g., a width) that can serve to convey the maximal size of a hole/drill bit to be created/used at the fastener-receiving area $150_i$.

As another example, in some embodiments, the marks $112_1$-$112_H$ may be machined marks that are machined into rubber and/or other elastomeric material of the endless track 22 after the endless track 22 has been molded.

As yet another example, in some embodiments, the marks $112_1$-$112_H$ may be colored marks. A colored mark $112_i$ may comprise a printed mark, a painted mark, or any other colored element which can be applied to the endless track 22. By "colored", it is meant that the colored mark $112_i$ exhibits one or more colors (e.g., white, yellow, red, gray, etc.) which are visually distinguishable from that of the rubber and/or other elastomeric material of the endless track 22.

For instance, in some cases, a colored mark $112_i$ identifying the location of a fastener-receiving area $150_i$ may comprise a drawing such as a geometrical shape (e.g., a circle, a polygon, etc.) or symbol (e.g., an "X", a cross, a bull's eye, etc.), alphanumeric text, and/or any other visual indication of the location of the fastener-receiving area $150_i$. A colored mark $112_i$ may also convey the maximal size of a hole/drill bit to be created/used at the fastener-receiving area $150_i$ so that the resulting hole is sufficiently large to receive a fastener, and yet is not so large that it will damage the internal structures of the carcass 36, such as the reinforcing cables $37_1$-$37_M$.

The marks $112_1$-$112_H$ identifying the locations of the fastener-receiving areas $150_1$-$150_H$ may be provided at various places on the endless track 22.

For example, in some embodiments, the marks $112_1$-$112_H$ may be provided on the ground-engaging outer side 27 of the endless track 22. Depending on the size and distribution of the traction lugs $58_1$-$58_T$, a mark $112_i$ may be provided on an area which is free of any of the traction lugs $58_1$-$58_T$ or on an area which is part of one of the traction lugs $58_1$-$58_T$. For instance, in some cases, the pattern of traction lugs $58_1$-$58$ may be designed such that all of the marks $112_1$-$112_H$ are provided on areas which are free of any of the traction lugs $58_1$-$58_T$. In cases where a mark $112_i$ is provided on one of the traction lugs $58_1$-$58_T$, a user may drill a hole through that traction lug and into the carcass 36.

As another example, in some embodiments, the marks $112_1$-$112_H$ may be provided on the inner side 25 of the endless track 22 and specifically on the original drive/guide lugs $34_1$-$34_N$ themselves. For instance, in some cases, the marks $112_1$-$112_H$ may be provided on the top surface 72 of the drive/guide lugs $34_1$-$34_N$. Based on these marks $112_1$-$112_H$, a user may drill holes through the original drive/guide lugs $34_1$-$34_N$ and into the carcass 36. Once the holes have been drilled into the carcass 36, the original drive/guide lugs $34_1$-$34_N$ may then be removed from the track 22.

As another example, in some embodiments, the marks $112_1$-$112_H$ may be provided on the inner side 25 of the endless track 22 but beneath the original drive/guide lugs $34_1$-$34_N$. For instance, in some cases, the marks $112_1$-$112_H$ may be provided on a layer of the rubber 38 of the carcass 36 immediately beneath the rubber 67 of the original drive/guide lugs $34_1$-$34_N$ such that, upon removal of the original drive/guide lugs $34_1$-$34_N$ from the track 22 after they have worn out, the marks $112_1$-$112_H$ become visible (e.g., if the marks $112_1$-$112_H$ comprise recesses or colored regions in that layer of the rubber 38 of the carcass 36, the recesses or colored regions become visible once the rubber 67 of the original drive/guide lugs $34_1$-$34_N$ is removed).

Although in the embodiments considered above, the marks $112_1$-$112_H$ are drilling marks for locating where to drill holes, the marks $112_1$-$112_H$ may be used for other purposes in other embodiments. For example, in embodiments such as those discussed above in respect of FIGS. 7F and 7G where there is a hole $35_i$ containing a filler 63, a mark $112_i$ may be on the filler 63 to mark its location.

In embodiments considered above, each designated lug-fastening part $17_i$ indicates the predetermined position of a fastener to fasten a drive/guide lug $34_i$ to the carcass 36 when installing the drive/guide lug $34_i$. For instance, in the various embodiments considered, a fastener-receiving hole 56 indicates where the fastener is to be positioned, a fastening element of the fastener which projects from the carcass 36 self-indicates the predetermined position of the fastener, and a mark marking the predetermined position of the fastener indicates where the fastener is to be positioned.

In that sense, in some embodiments, each designated lug-fastening part $17_i$ can be a "lug-fastening indicator" indicating where to fasten a drive/guide lug $34_i$ to the carcass 36.

In addition to indicating where to fasten a drive/guide lug $34_i$ to the carcass 36, each designated lug-fastening part $17_i$ may facilitate alignment of the drive/guide lug $34_i$ on the carcass 36. The issue of alignment of a drive/guide lug $34_i$ is looked at separately from the issue of fastening of the drive/guide lug $34_i$ to the carcass 36. Generally, by "alignment" of a drive/guide lug $34_i$ is meant proper location of the drive/guide lug $34_i$ relative to other ones of the drive/guide lugs $34_1$-$34_N$ such that a correct drive/guide lug pitch is preserved. The alignment of the drive/guide lug $34_i$ may also refer to a position of the drive/guide lug $34_i$ along the widthwise direction of the endless track 22. For instance, if the drive/guide lug $34_i$ is to be centered transversally, the alignment of the drive/guide lug $34_i$ would locate the drive/guide lug $34_i$ in a center of the endless track 22 and not closer to any one of the track's side edges. The alignment of the drive/guide lug $34_i$ may also refer to a proper orientation of the drive/guide lug $34_i$ on the carcass 36.

For example, the pitch and the transverse alignment of a drive/guide lug $34_i$ is dependent on the spacing and alignment of the fasteners $39_i$, $39_j$. In particular, if fasteners $39_i$, $39_j$ are aligned, then installation of the drive/guide lugs $34_1$-$34_N$ will produce drive/guide lugs that are aligned along the carcass 36. For example, if fasteners $39_i$, $39_j$ for a drive/guide lug $34_i$ are aligned with fasteners $39_k$, $39_l$ for drive/guide lug $34_j$, it is likely that lugs $34_i$ and $34_j$ will be substantially inline with each other.

Similarly, the spacing and alignment of the fasteners $39_i$, $39_j$ may help to ensure that the drive/guide lug pitch remains correct for all drive/guide lugs along the track 22. Specifically, if the fasteners $39_i$, $39_j$ are spaced in a such way with other fasteners along the carcass 36 to ensure correct drive/guide lug pitch, then installation of the drive/guide lugs $34_1$-$34_N$ will result in drive/guide lugs with the correct pitch along the carcass 36 as well. For example, if the fasteners $39_k$, $39_l$ for the drive/guide lug $34_j$ are spaced apart from fasteners $39_i$, $39_j$ for the drive/guide lug $34_i$ and from fasteners $39_m$, $39_n$ for the drive/guide lug $34_k$ to produce an identical drive/guide lug pitch, it is likely that when the drive/guide lugs $34_i$, $34_j$ and $34_k$ are installed, the drive/guide lug pitch between them will be the same.

Also, in embodiments in which at least two fasteners at predetermined positions are used to fasten a drive/guide lug $34_i$ to the carcass 36, the orientation of the drive/guide lug $34_i$ will be proper.

Figure 23A:
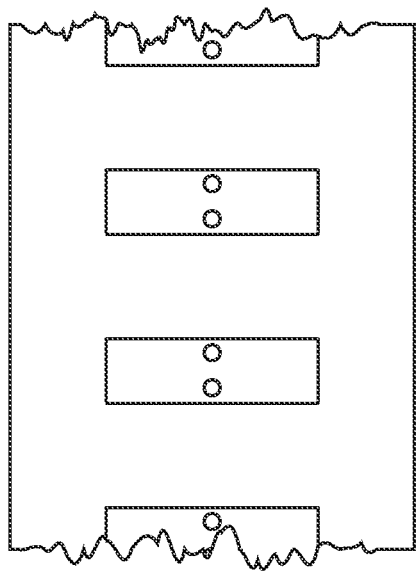
Figure 23B:
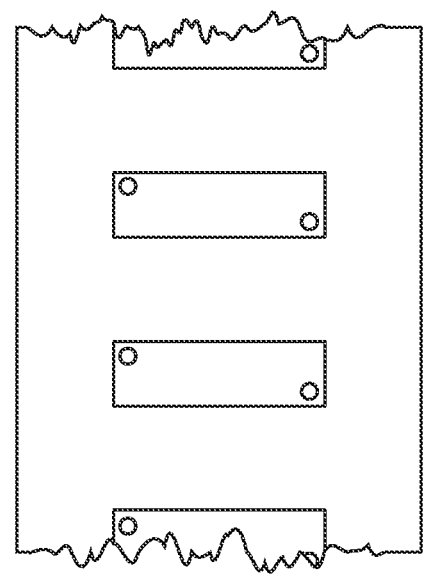
Figure 23C:
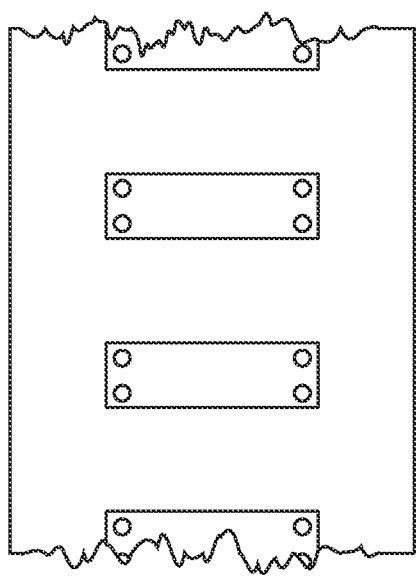

While in the embodiments considered above a certain number of fasteners are used to fasten a drive/guide lug $34_i$ to the carcass 36, any suitable number of fasteners (e.g., a single fastener, two fasteners, or more than two fasteners) may be used and/or any suitable arrangement of fasteners relative to one another may be used in other embodiments. For example, FIGS. 23A to 23C show alternate embodiments that have different arrangements of two or more fasteners, including: an embodiment where two fasteners are arranged such that they form a line that is substantially parallel to the longitudinal axis 45; an embodiment where two fasteners are arranged such that they occupy diagonally-opposed corners of the drive/guide lug $34_i$; and an embodiment where fasteners are arranged such that they occupy all corners of the drive/guide lug $34_i$.

1.4 Lug-Interlocking Portion

In some embodiments, a designated lug-fastening part $17_i$ may include an interlocking portion of the carcass 36 configured to interlock with an interlocking portion of a drive/guide lug $34_i$ when installing the drive/guide lug $34_i$ on the carcass 36. When the interlocking portions of the drive/guide lug $34_i$ and the carcass 36 are interlocked, a given one of the drive/guide lug $34_i$ and the carcass 36 extends into the other one of the drive/guide lug $34_i$ and the carcass 36. More specifically, the interlocking portion of one of the drive/guide lug $34_i$ and the carcass 36 is an interlocking space (i.e., a hole, recess, or other hollow) into which extends the interlocking portion of the other one of the drive/guide lug $34_i$ and the carcass 36. This mechanical interlock relationship restrains movement of the drive/guide lug $34_i$ relative to the carcass 36. The mechanical interlock relationship may facilitate alignment of a drive/guide lug $34_i$ on the carcass 36.

The interlocking portions of drive/guide lugs $34_1$-$34_N$ and the carcass 36 may comprise male parts and females parts distributed among the drive/guide lugs $34_1$-$34_N$ and the carcass 36. The male parts and female parts may create a single point of interlock or a plurality of spaced apart points of interlock between a drive/guide lug $34_i$ and the carcass 36.

For example, in some embodiments, the interlocking portions of drive/guide lugs $34_1$-$34_N$ and the carcass 36 may include one or more recesses and/or one or more projections provided on the inner side 25 of the carcass 36 and/or on the periphery 70 of the drive/guide lugs $34_1$-$34_N$ to align the drive/guide lugs $34_1$-$34_N$ on the carcass 36.

Figure 24:
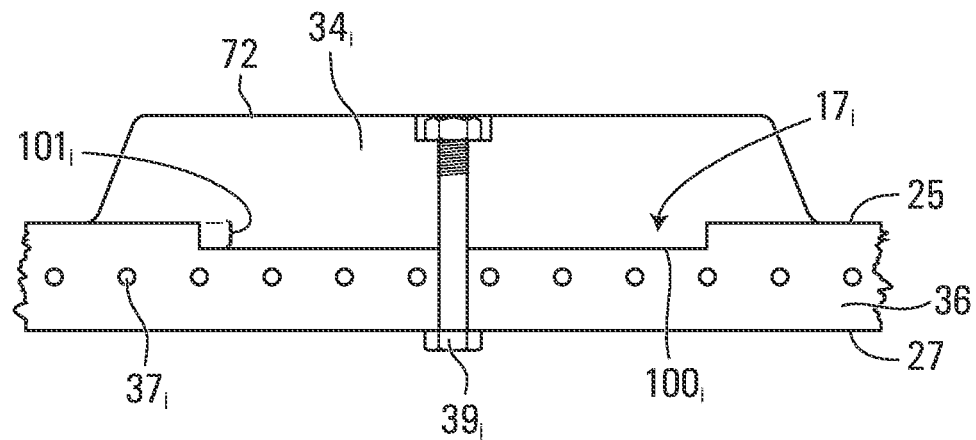

FIG. 24 shows an embodiment in which the interlocking portions of the drive/guide lugs $34_1$-$34_N$ and the carcass 36 include a set of recesses $100_1$-$100_H$ on the carcass 36 and a corresponding set of projections $101_1$-$101_H$ on the drive/guide lugs $34_1$-$34_N$. Each recess $100_i$ of the carcass 36 is located on the inner side 25 of the endless track 22 and may have any suitable shape (e.g., a recessed square, triangle, circle or rectangle). These recesses may be generally located in the vicinity of the fasteners used to attach the drive/guide lugs $34_1$-$34_H$ to the carcass.

The set of recesses $100_1$-$100_H$ may be formed within in the rubber 38 during fabrication of the carcass 36. For example, the recesses $100_1$-$100_H$ may be formed during molding of the rubber 38 of the carcass 36 by using a suitable shaped mold or may formed by shearing or gouging out their shapes after molding of the rubber 38 of the carcass 36.

The set of projections $101_1$-$101_H$ on the drive/guide lugs $34_1$-$34_H$ are formed during fabrication of these lugs. The shape and dimensions of these projections may generally correspond to that of the recesses $100_1$-$100_H$. For example, if a recess $100_i$ is square with sides that are about 2" long respectively, the corresponding projection $101_i$ on the drive/guide lug may also be square in shape with sides that are about 2" long.

More particularly, in this embodiment, the dimensions of each recess in the set of recesses $100_1$-$100_H$ of the carcass 36 (and therefore the dimensions of each corresponding projection in the set of projections $101_1$-$101_H$ of the drive/guide lugs) is somewhat less than the widthwise dimension of the drive/guide lug $34_i$. Each drive/guide lug $34_i$ comprises a single projection $101_i$ that fits into a single recess $100_i$ on the carcass 36. In cases where the drive/guide lug $34_i$ is attached to the carcass 36 via a single fastener $39_i$, each of the recess $100_i$ and the projection $101_i$ may be non-circular (e.g., polygonal such as square or rectangular) in order to reduce the possibility that the drive/guide lug $34_i$ will be able to turn about an axis of this fastener. Although a single fastener is shown in this embodiment, two or more fasteners may be used for fastening the drive/guide lug $34_i$ to the carcass 36 in other embodiments.

Figure 25A:
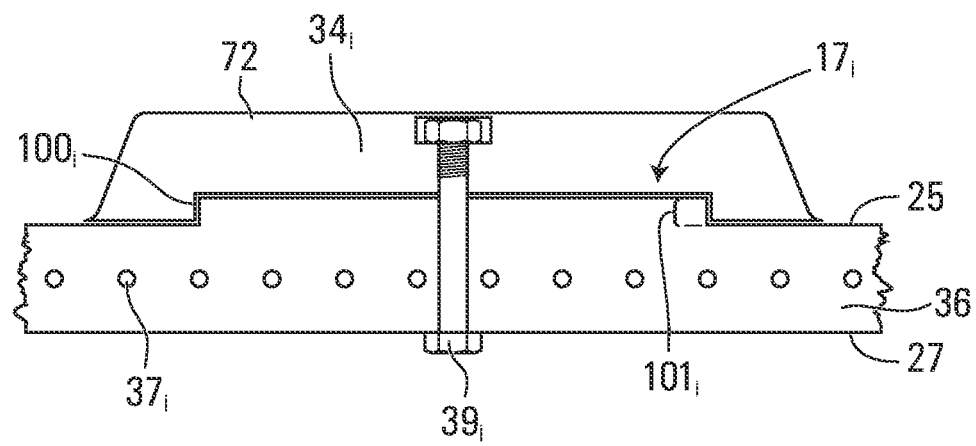

FIG. 25A shows an alternative embodiment in which the locations of the set of recesses $100_1$-$100_H$ and the set of projections $101_1$-$101_H$ are reversed, such that the projection $101_i$ is located on the carcass 36 while the recess $100_i$ is located on the drive/guide lug $34_i$.

Figure 26:
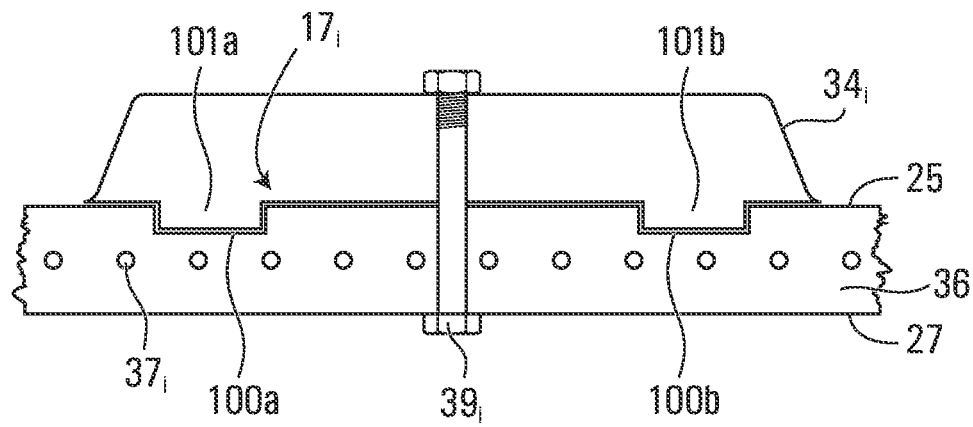
Figure 27:
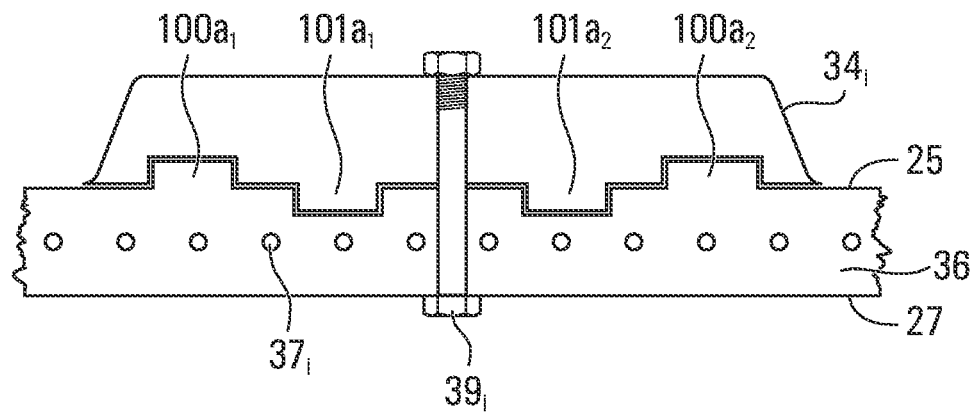

FIGS. 26 and 27 show other embodiments in which the carcass 36 and drive/guide lug $34_i$ can comprise more than one combination of recess and/or projection per lug.

For example, FIG. 26 shows an embodiment where the set of recesses $100_1$-$100_H$ and the set of projections $101_1$-$101_H$ distributed among the carcass 36 and the drive/guide lugs $34_1$-$34_N$ provides more than one recess/projection combination for each of the drive/guide lugs. In this case, the set of projections $101_1$-$101_H$ distributed along the carcass 36 comprises two (2) recesses $100_a$ and $100_b$ per drive/guide lug $34_i$, while the drive/guide lug $34_i$ comprises two (2) projections $101_a$ and $101_b$, located along its surface to be received in recesses $100_a$ and $100_b$ of the carcass 36.

FIG. 27 shows an embodiment that also provides more than one recess/projection combination for each of the drive/guide lugs $34_1$-$34_N$. In this case, however, the drive/guide lug $34_i$ has at least one recess and at least one projection, which correspond to a set of at least one recess and at least one projection on the carcass 36 where the drive/guide lug $34_i$ is mated.

The provision of more than one projection/recess per drive/guide lug $34_i$ in the alignment system may provide better results during installation of the set of drive/guide lugs $34_1$-$34_H$ along the carcass 36. For example, in some embodiments, the set of recesses $100_1$-$100_H$ and the set of projections $101_1$-$101_H$ may be divided into two subsets of recesses/projections, where each subset of recess/projections uses a different shape. For instance, a first subset of recesses/projections (e.g., which may be located on a left or right side of the carcass 36) may be square in shape, while a second subset of recesses/projections (e.g., which may be located on the right or left side of the carcass 36) may be circular in shape. The different shapes of the recesses/projections may allow a user to more easily identify, orient and install the drive/guide lug $34_i$ along the carcass to optimize alignment and drive/guide lug pitch.

Similarly, it may be possible to adjust the number and/or position of the recess/projection combinations in the alignment system so as to simplify installation of the drive/guide lugs and optimize their position. For example, in some embodiments, a left or right side of the carcass 36 and therefore a left or right side of the drive/guide lug $34_i$ may include three (3) recess/projection combinations, while the right or left side of the carcass 36 and the right or left side of the drive/guide lug $34_i$ may only include two (2) recess/projection combinations. In this case, the number of recess/projection combinations on the drive/guide lug $34_i$ and/or on the carcass 36 may help to indicate the correct orientation of the drive/guide lug $34_i$ in order to optimize lug alignment.

Figure 25B:
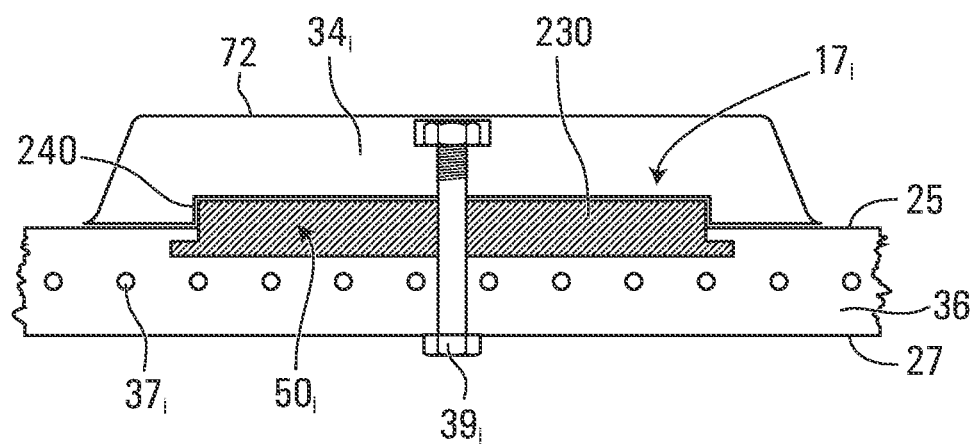
Figure 25C:
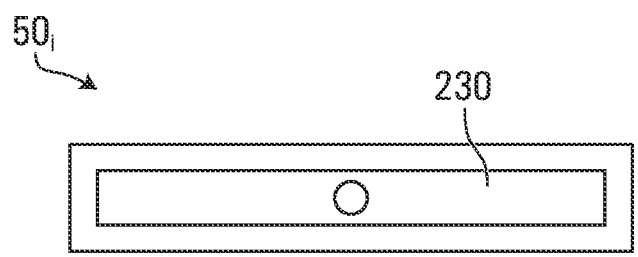

FIGS. 25B and 25C show an embodiment in which an insert $50_i$ embedded in the carcass 36 includes an interlocking portion 230. In this embodiment, the interlocking portion 230 is an interlocking projection projecting from the inner side of the carcass 36 to interlock with an interlocking recess 240 of the drive/guide lug $34_i$. In this case, the interlocking projection 230 is shaped as an elongated member extending in the widthwise direction of the endless track 22 and the interlocking recess 240 of the drive/guide lug $34_i$ is shaped as a complementary slot. The interlocking portion 230 may have various other configurations in other cases.

Although the above embodiments illustrate examples of one or more recesses and/or one or more projections that may be provided on the ground-engaging outer side 27 of the carcass 36 and/or on the periphery 70 of the drive/guide lugs $34_1$-$34_N$ to align the drive/guide lugs $34_1$-$34_N$ on the carcass 36, various other arrangements of recesses/projections are possible in other embodiments.

Also, although in embodiments considered above there is at least one recess or projection on a drive/guide lug $34_i$, in other embodiments, the drive/guide lug $34_i$ may have no such recess or projection but still be capable of being interlocked with the carcass 35. For example, in some embodiments, the carcass 36 may comprise a recess having a size and shape corresponding to that of a contour of a base of the drive/guide lug $34_i$ such that the contour of the base of the drive/guide lug $34_i$ matingly fits in the recess of the carcass 36.

While in embodiments considered above there is a designated lug-fastening part $17_i$ at every single one of the drive/guide lug $34_1$-$34_N$, in other embodiments, there may not be a designated lug-fastening part $17_i$ at every drive/guide lug $34_i$. For example, in some embodiments, there may be a designated lug-fastening part $17_i$ at a given drive/guide lug $34_i$ but no designated lug-fastening part one or more of the drive/guide lug $34_1$-$34_N$ succeeding the given drive/guide lug $34_i$.

2. Replaceable Drive/Guide Lugs

The drive/guide lugs $34_1$-$34_N$ may be replaceable such that they can be replaced (e.g., when worn out, damaged or otherwise needing to be replaced).

For example, in some embodiments, the drive/guide lugs $34_1$-$34_N$ may be provided on the inner side 25 by being cured with the carcass 36. In such embodiments, the drive/guide lugs $34_1$-$34_N$ are replaceable by being grinded, stripped, cut, ripped or otherwise removed from the inner side 25 of the carcass 36. Once removed, a drive/guide lug $34_i$ may be replaced by a replacement drive/guide lug that is connected to the carcass 36 in its place.

In other embodiments, the drive/guide lugs $34_1$-$34_N$ may be provided on the inner side 25 by being secured to the carcass 36 with fasteners (e.g., bolts) and/or an adhesive. For example, in some cases, a drive/guide lug $34_i$ fastened to the carcass 36 with one or more fasteners may be a replacement drive/guide lug which has been installed on the carcass 36 to replace a previous drive/guide lug $34_i'$. The previous drive/guide lug $34_i'$ may have been molded with the carcass 36 during original manufacturing of the endless track 22. Alternatively, the previous drive/guide lug $34_i'$ may have been fastened to the carcass 36 with one or more fasteners. In other cases, a drive/guide lug $34_i$ fastened to the carcass 36 with one or more fasteners may have been installed on the carcass 36 during original manufacturing of the endless track 22.

A drive/guide lug $34_i$ may be mounted to the carcass 36 in various ways in various embodiments.

2.1 Designated Lug-Fastening Part

In some embodiments, a drive/guide lug $34_i$ may comprise a designated lug-fastening part 117 provisioned during original manufacturing of the drive/guide lug $34_i$ to facilitate fastening of the drive/guide lug $34_i$ to the carcass 36 when installing the drive/guide lug $34_i$ on the carcass 36. The designated lug-fastening part 117 defines a predetermined position of a fastener to fasten the drive/guide lug $34_i$ to the carcass 36.

For example, in some embodiments, the designated lug-fastening part 117 of the drive/guide lug $34_i$ may include a premolded or otherwise preformed hole $56_i$ to receive a fastener $39_i$ fastening the drive/guide lug $34_i$ to the carcass 36. Examples of such embodiments have been discussed and shown above in respect of FIGS. 8 to 11, 14 and 18 to 28.

The embodiments shown in FIGS. 8, 10, 11, 14 and 19 to 27 illustrate that the hole $56_i$ may be a through hole that allows the fastener $39_i$ to pass through the body 55 of the drive/guide lug $34_i$ in order to engage an internally threaded fastening element (e.g., a nut) on the drive/guide lug $34_i$ or on the ground-engaging side 27 of the track 22. In contrast, FIGS. 9, 18 and 28 show embodiments whereby an internally threaded fastening element is embedded within the rubber 67 of the drive/guide lug $34_i$, in which case the hole $56_i$ of the drive/guide lug $34_i$ is a blind hole that does not reach the top surface 72 of the drive/guide lug $34_i$.

In some cases, as shown in the embodiments of FIGS. 8, 10, 11 and 19 to 27, a hole $56_i$ receiving a fastener $39_i$ may be formed directly in the rubber 67 of the drive/guide lug $34_i$ such that the fastener $39_i$ interfaces with the rubber 67 of the drive/guide lug $34_i$.

Alternatively, in some cases, a hole $56_i$ receiving a fastener $39_i$ may be defined by an insert embedded in the rubber 67 of the drive/guide lug $34_i$ such that the fastener $39_i$ interfaces with the insert rather than directly with the rubber 67 of the drive/guide lug $34_i$. Such an insert may be retained in the rubber 67 of the drive/guide lug $34_i$ in various ways, such as by the rubber 67 molded around it, by an adhesive, by being mechanically connected to a reinforcement embedded in the rubber 67, and/or in any other suitable way.

Figure 28:
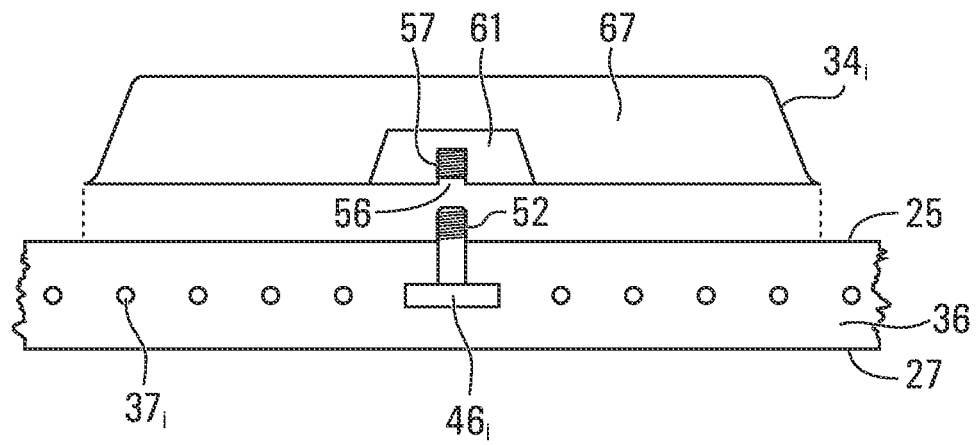

For example, FIG. 28 shows an embodiment in which a drive/guide lug $34_i$ comprises an insert 61 embedded in its rubber 67. In this embodiment, the insert 61 comprise a hole $56_i$ to receive a fastening element 52 of an insert $46_i$ embedded in the carcass 36 that can be used to attach the drive/guide lug $34_i$ to the carcass 36. In this case, the hole $56_i$ is a blind bore that extends from the surface of the insert 61 that is closest to the carcass 36 to the area where the attachment portion of the fastener $39_i$ is located. Also, in this embodiment, the hole $56_i$ of the insert 61 is internally threaded to engage the externally threaded portion of the fastening element 52.

A hole $56_i$ of a drive/guide lug $34_i$ may be disposed such that a fastener $39_i$ received therein does not disrupt structural integrity or interrupt continuity of one or more of the reinforcements 42, 43 embedded in the rubber 38 of the carcass 36.

For example, in the embodiments discussed above, each hole $56_i$ of the drive/guide lug $34_i$ is located such that a fastener $39_i$ received therein to fasten the drive/guide lug $34_i$ to the carcass 36 extends in the carcass 36 where there is no reinforcing cable, i.e., the fastener $39_i$ extends in the carcass 36 without intersecting any reinforcing cable. For instance, in the embodiments discussed above, each hole $56_i$ of the drive/guide lug $34_i$ is located such that a fastener $39_i$ received therein extends between adjacent ones of the reinforcing cables $37_1$-$37_M$ of the carcass 36.

In some embodiments, a designated lug-fastening part 117 of a drive/guide lug $34_i$ may include a fastening element which is secured to and projects from the drive/guide lug $34_i$ for fastening the drive/guide lug $34_i$ to the carcass 36.

Figure 29:
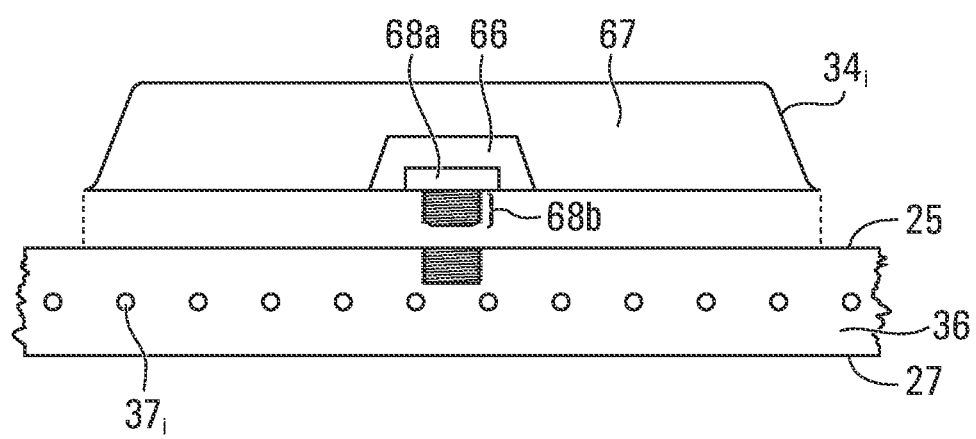

For example, FIG. 29 shows an embodiment in which a drive/guide lug $34_i$ comprises an insert 66 embedded in its rubber 67. In this case, the insert 66 comprises an anchor $68_a$ which is embedded in the rubber 67 of the drive/guide lug $34_i$, and a fastening element $68_b$ which projects from the drive/guide lug $34_i$ towards the carcass 36.

Figure 30A:
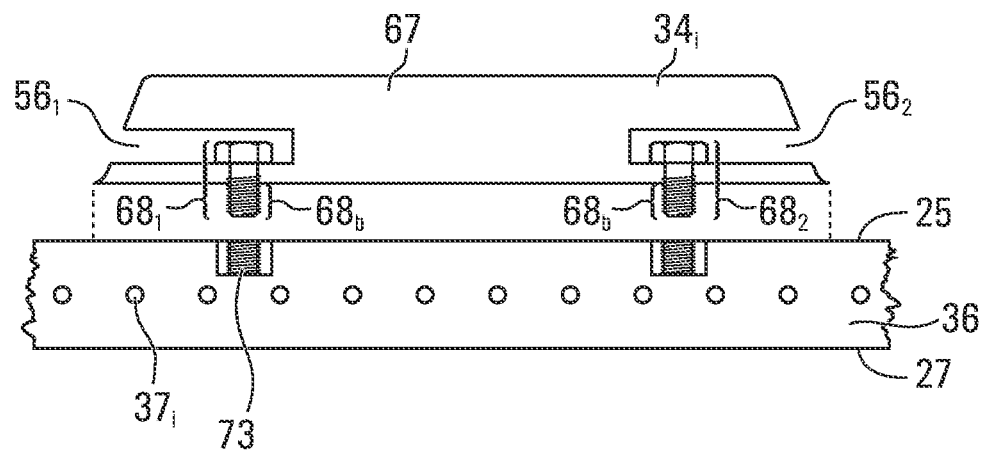
Figure 30B:
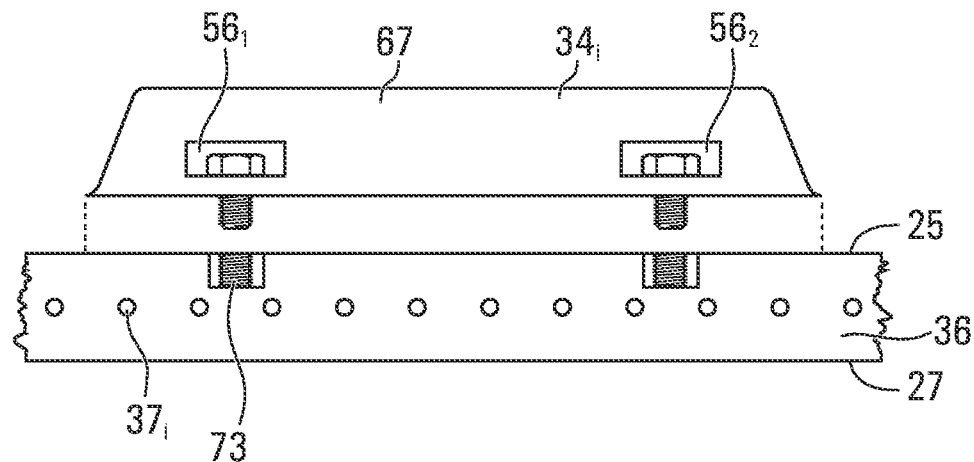

FIG. 30A shows another embodiment in which a drive/guide lug $34_i$ comprises an insert 66 embedded in its rubber 67. In this embodiment, the insert 66 interacts with two (2)

fasteners $68_1$ and $68_2$ and two (2) openings $56_1$, $56_2$ extending from the periphery 70 of the drive/guide lug $34_i$ for attaching the drive/guide lug $34_i$ to the carcass 36. In this case, the openings $56_1$, $56_2$ extend from the side surfaces $69_2$, $69_4$ of the drive/guide lug $34_i$. Each fastener $68_i$ has a threaded portion that is designed to engage with an opposite threaded fastening element 73 that is embedded within the carcass 36. Each fastener $68_i$ has a portion that is accessible by a tool (e.g., a bolt head with hexagonal sides that can be manipulated by a wrench). The openings $56_1$, $56_2$ allow a tool (e.g., a wrench) to be inserted through the opening and engage the part of the fastener that is made available through its corresponding aperture. A wrench or other tool that is engaged with the fastener $68_i$ can be used to rotate the entire fastener $68_i$. FIG. 30B shows a variant in which the openings $56_1$, $56_2$ extend from the front surface $69_1$ and/or the rear surface $69_3$ of the drive/guide lug $34_i$. In some examples of implementation, an internally threaded fastening element (e.g., a nut) of the fastener $68_i$ may first be inserted in each opening $56_i$ and a threaded rod of the fastener $68_i$ may then be screwed into this internally threaded fastening element and the threaded fastening element 73 embedded in the carcass 36.

In some embodiments, the designated lug-fastening part 117 of a drive/guide lug $34_i$ may include a mark marking the predetermined position of a fastener to be placed to fasten the drive/guide lug $34_i$ to the carcass 36. For instance, a mark may be a molded mark, a machined mark, a colored mark or any other suitable mark similar to the marks $112_1$-$112_H$ discussed above, but provided on the drive/guide lug $34_i$. As an example, in some cases, a mark may be a drilling mark on the top surface 72 of the drive/guide lug $34_i$ indicating where to drill a hole in the drive/guide lug $34_i$ when the drive/guide lug $34_i$ is placed on the carcass 36 so that a fastener can subsequently be placed in the drilled hole to fasten the drive/guide lug $34_i$ to the carcass 36.

In some embodiments, the lug-fastening part 117 of a drive/guide lug $34_i$ may include an interlocking portion configured to interlock with an interlocking portion of the carcass 36 when installing the drive/guide lug $34_i$ on the carcass 36. For example, in some embodiments, the interlocking portion of the drive/guide lug $34_i$ may include a recess or projection on the periphery 70 of the drive/guide lug $34_i$ to align the drive/guide lug $34_i$ on the carcass 36. Examples of such a recess or projection were discussed above in respect of FIGS. 24 to 27.

2.2 Drive/Guide Lug with a Load-Distributing Member

In some embodiments, a drive/guide lug $34_i$ may comprise a load-distributing member for distributing a load fastening the drive/guide lug $34_i$ to the carcass 36 on the body 55 of the drive/guide lug $34_i$ without a fastener head or nut contacting the body 55 of the drive/guide lug $34_i$. The load-distributing member is thus not a fastener head or nut. This can enhance performance and/or extend a useful life of drive/guide lug $34_i$, for instance by generating a lower stress level in the drive/guide lug $34_i$ than if a bolt or other threaded fastener was in contact with the body 55 of the drive/guide lug $34_i$.

For example, FIGS. 44A to 44F show an embodiment in which a drive/guide lug $34_i$ comprises a load-distributing member 108 including a bearing surface 120 for bearing against the body 55 of the drive/guide lug $34_i$ and distributing a load fastening the drive/guide lug $34_i$ to the carcass 36 on the body 55 of the drive/guide lug $34_i$.

In this embodiment, the load-distributing member 108 is an elongated member, which will be referred to as a "retaining bar". In addition to its bearing surface 120, the retaining bar 108 includes a top surface 122 opposite the bearing surface 120 and end surfaces $124_1$, $124_2$ opposite one another. The load-distributing member 108 may have various other shapes in other embodiments.

A material making up at least part of the retaining bar 108, which will be referred to as a "retaining bar material", may be different from a material making up at least part of the body 55 of the drive/guide lug $34_i$, which will be referred to as a "lug body material". For example, in some embodiments, the retaining bar material may be more rigid (i.e., have a higher modulus of elasticity), be harder, have a higher abrasion resistance, and/or a lower coefficient of friction with one or more of the wheels 24, 26, $28_1$-$28_8$ than the lug body material. The retaining bar material and the lug body material may differ in terms of various other material properties. In some cases, the retaining bar material and the lug body material may belong to different material classes (e.g., metals, polymers, ceramics, or composites). In other cases, the retaining bar material and the lug body material may belong to a common material class.

In this embodiment, the retaining bar material is a metal (e.g., stainless steel or other types of steel) and the lug body material is rubber. The retaining bar 108 and the body 55 of the drive/guide lug $34_i$ may be made of various other materials in other embodiments.

The bearing surface 120 of the retaining bar 108 bears against a bearing surface 140 of the body 55 of the drive/guide lug $34_i$. More particularly, in this embodiment, the retainer bar 108 is located in a recess 130 of the body 55 of the drive/guide lug $34_i$. The recess 130 defines the bearing surface 140 of the body 55 of the drive/guide lug $34_i$. In this example, the recess 130 is a groove elongated in the front-to-rear direction of the drive/guide lug $34_i$. The recess 130 may have various other shapes in other examples.

In this embodiment, the bearing surface 120 of the retaining bar 108 and the bearing surface 140 of the body 55 of the drive/guide lug $34_i$ are curved. In this case, the bearing surfaces 120, 140 are generally semi-cylindrical. Other curved shapes may be used in other cases. The curvature of the bearing surfaces 120, 140 of the retaining bar 108 and the body 55 of the drive/guide lug $34_i$ can promote a better load distribution, for instance by providing a larger load-bearing area. Also, the curvature of the bearing surfaces 120, 140 of the retaining bar 108 and the body 55 also avoids sharp edges in contact with the body 55 of the drive/guide lug $34_i$, which may avoid stress concentrations and thus protect against crack formation and propagation in the body 55 of the drive/guide lug $34_i$. The bearing surfaces 120, 140 of the retaining bar 108 and the body 55 of the drive/guide lug $34_i$ may have various other shapes in other embodiments (e.g., flat, or partly flat and partly curved).

The bearing surface 120 of the retaining bar 108 distributes the load fastening the drive/guide lug $34_i$ to the carcass 36 over at least a major part of one or more of the side-to-side dimension $L_W$ of the drive/guide lug $34_i$ and the front-to-rear dimension $L_L$ of the drive/guide lug $34_i$. For example, in some embodiments, the bearing surface 120 of the retaining bar 108 may occupy at least 20%, in some cases at least 30%, in some cases at least 40%, in some cases at least 50%, in some cases at least 60%, in some cases at least 70%, in some cases at least 80%, in some cases at least 90%, and in some cases all (i.e., 100%) of the front-to-rear dimension $L_L$ of the drive/guide lug $34_i$, and/or may occupy at least 20%, in some cases at least 30%, in some cases at least 40%, in some cases at least 50%, in some cases at least 60%, in some cases at least 70%, in some cases at least 80%, in some cases at least 90%, and in some cases all (i.e., 100%)

of the side-to-side dimension $L_w$ of the drive/guide lug $34_i$. In this example of implementation, the bearing surface 120 of the retaining bar 108 occupies almost all of the front-to-rear dimension $L_L$ of the drive/guide lug $34_i$ and about one-third of the side-to-side dimension $L_w$ of the drive/guide lug $34_i$.

The retaining bar 108 cooperates with at least one fastener to fasten the drive/guide lug $34_i$ to the carcass 36. More particularly, in this embodiment, the retaining bar 108 cooperates with two (2) fasteners $39_1$, $39_2$ to fasten the drive/guide lug $34_i$ to the carcass 36. In this example, the retaining bar 108 comprises two (2) holes $131_1$, $131_2$ extending therethrough from its top surface 122 to its bearing surface 120. The body 55 of the drive/guide lug $34_i$ comprises two (2) holes $132_1$, $132_2$ extending from its bearing surface 140 to its bottom surface 149. The fasteners $39_1$, $39_2$ extend through the holes $131_1$, $131_2$ and through holes $141_1$, $141_2$ in the carcass 36 so as to emerge and be captured on the ground-engaging outer side 27 of the track 22. For instance, in this case, the fasteners $39_1$, $39_2$ are bolts whose heads engage the retaining bar 108 with nuts and washers on the ground-engaging outer side 27 of the track 22.

The retaining bar 108 may cooperate with one or more fasteners to fasten the drive/guide lug $34_i$ to the carcass 36 in other ways in other embodiments.

Figure 45A:
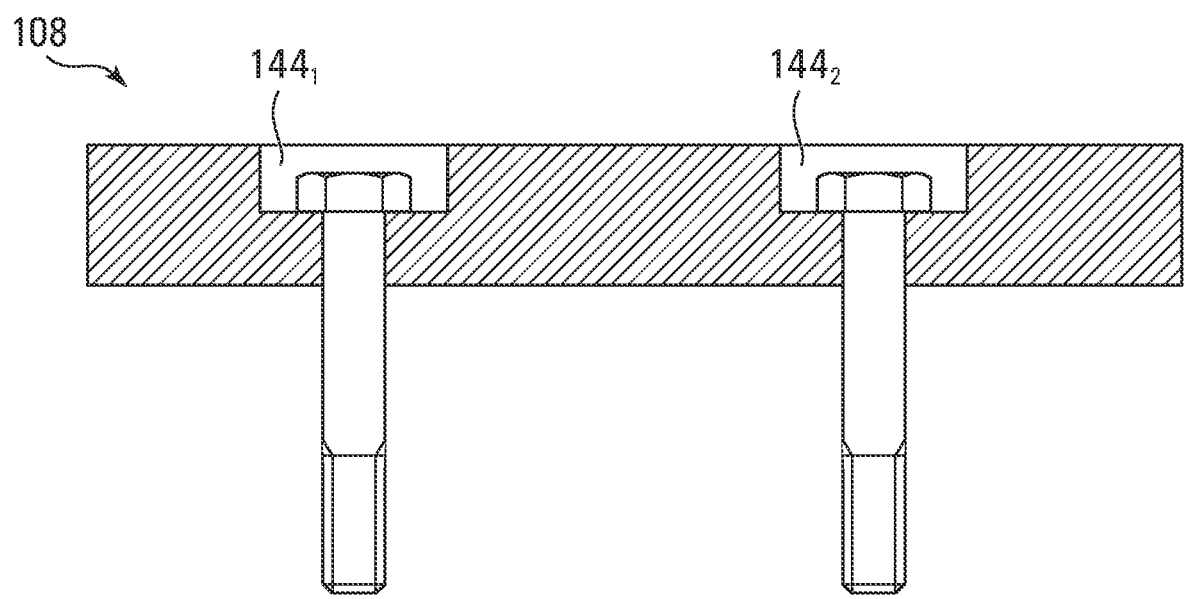

For example, in some embodiments, as shown in FIG. 45A, the retaining bar 108 may comprise recesses $144_1$, $144_2$ (e.g., countersink or counterbore holes) to receive end portions (e.g., heads or nuts) of fasteners $39_1$, $39_2$. In some cases, as shown in this example, the recesses $144_1$, $144_2$ may be sized such that the end portions of the fasteners $39_1$, $39_2$ do not extend beyond the top surface 122 of the retaining bar 102. For instance, this may prevent contact between the fasteners $39_1$, $39_2$ and one of the wheels (e.g., the drive wheel 24) of the track assembly $16_i$.

Figure 45B:
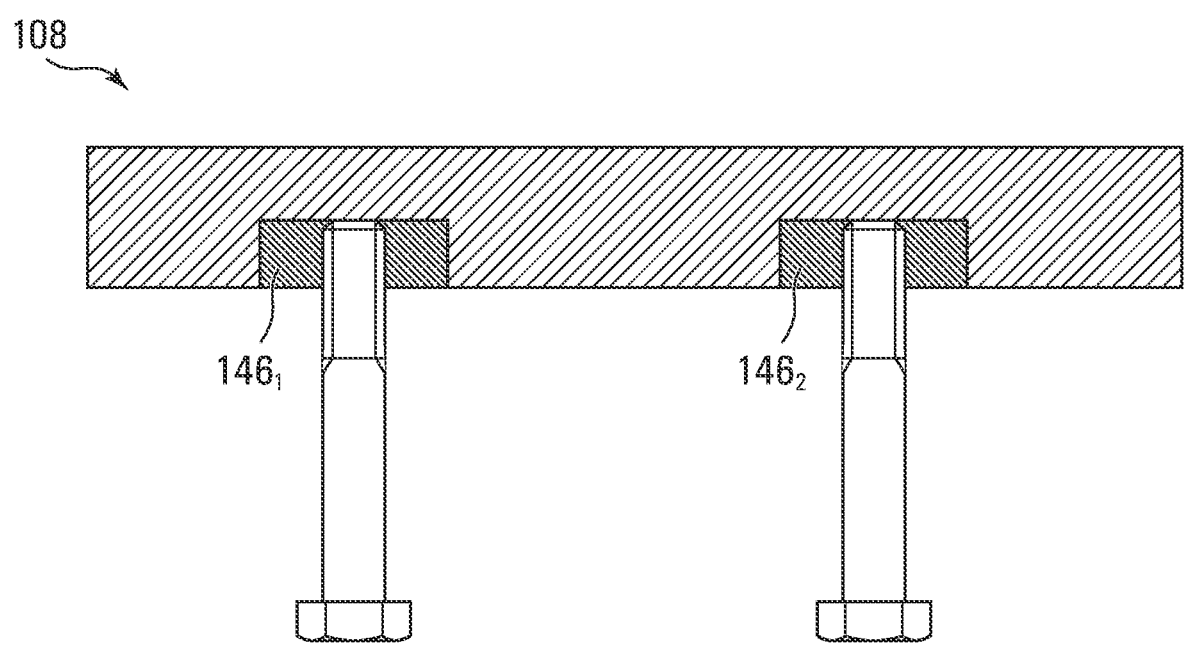

As another example, in some embodiments, as shown in FIG. 45B, the retaining bar 108 may comprise internally threaded sockets $146_1$, $146_2$ into which fasteners $39_1$, $39_2$ are secured. For instance, in some cases, the internally threaded sockets $146_1$, $146_2$ may be internally threaded holes formed (e.g., machined) into the material of the retaining bar 108. In other cases, the internally threaded sockets $146_1$, $146_2$ may be nuts or other internally threaded elements fixed into holes formed into the material of the retaining bar 108 (e.g., by press-fit, an adhesive, a weld, etc.).

Figure 45C:
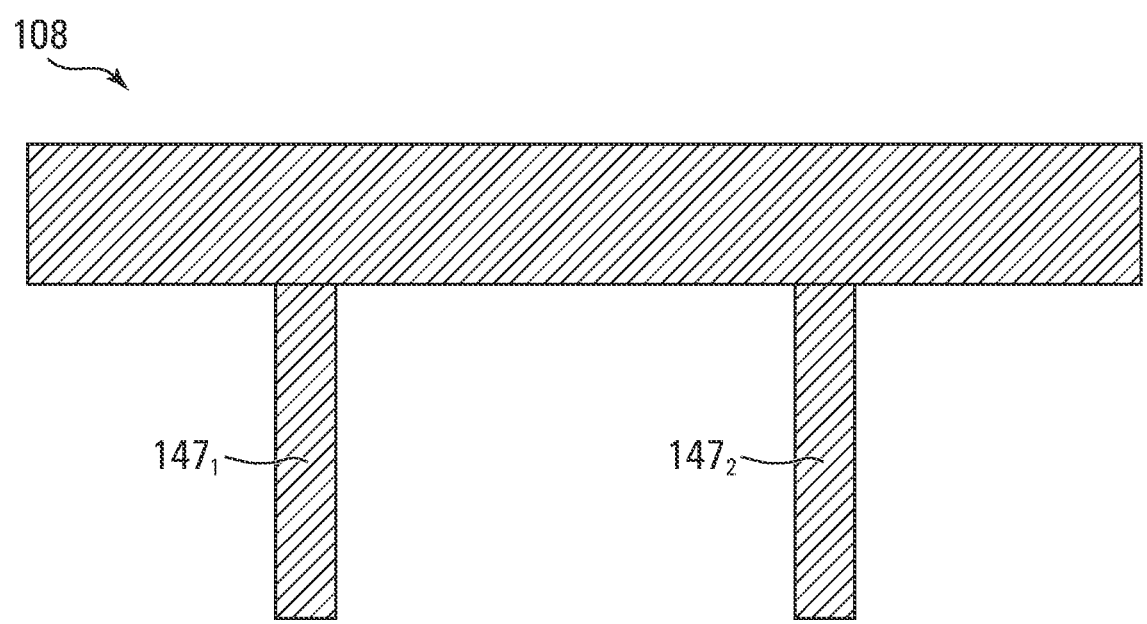

As yet another example, in some embodiments, as shown in FIG. 45C, the retaining bar 108 may comprise integral fasteners $39_1$, $39_2$ formed during manufacturing of the retaining bar 108 (e.g., by casting, machining or welding) which cooperate with fastening elements $147_1$, $147_2$. For instance, in some cases, the integral fasteners $39_1$, $39_2$ may be externally threaded rods and the fastening elements $147_1$, $147_2$ may be internally threaded nuts secured onto these rods.

In some embodiments, the retaining bar 108 may not extend to the periphery 70 the body 55 of the drive/guide lug $34_i$. For example, in this embodiment, the end surfaces $124_1$, $124_2$ of the retaining bar 108 do not extend to the front and rear surfaces $69_1$, $69_4$ of the body 55 of the drive/guide lug $34_i$. Also, in this embodiment, the top surface 122 of the retaining bar 108 does not extend to the top surface 72 of the body 55 of the drive/guide lug $34_i$. The top surface 122 of the retaining bar 108 is vertically spaced apart from the top surface 72 of the body 55 of the drive/guide lug $34_i$ in order to provide a space 143 over the retaining bar 108 to accommodate the heads of the fasteners $39_1$, $39_2$. The space 143 may be sufficiently large that the fasteners $39_1$, $39_2$ do not extend beyond the top surface 72 of the body 55 of the drive/guide lug $34_i$. For instance, this may prevent contact between the fasteners $39_1$, $39_2$ and one of the wheels (e.g., the drive wheel 24) of the track assembly $16_i$.

In other embodiments, the retaining bar 108 may extend to the periphery 70 the body 55 of the drive/guide lug $34_i$. For example, in some embodiments, the end surfaces $124_1$, $124_2$ of the retaining bar 108 may extend to the front and rear surfaces $69_1$, $69_4$ of the body 55 of the drive/guide lug $34_i$, and/or the top surface 122 of the retaining bar 108 may extend to the top surface 72 of the body 55 of the drive/guide lug $34_i$.

Although the retaining bar 108 considered in this embodiment illustrates one example of a configuration of a load-distributing member, a drive/guide lug $34_i$ may comprise a load-distributing member having various other configurations in other embodiments.

Figure 31A:
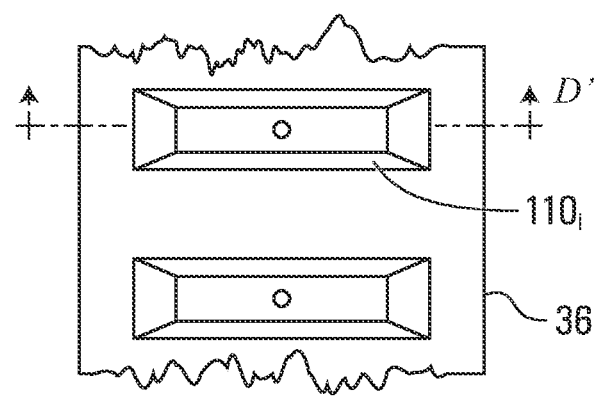
FIGS. 31A to 32B and 44A to 45C show various examples of embodiments in which a drive/guide lug connected to the carcass of the endless track comprises a load-distributing member for distributing a fastening load on a body of the drive/guide lug.
Figure 31B:
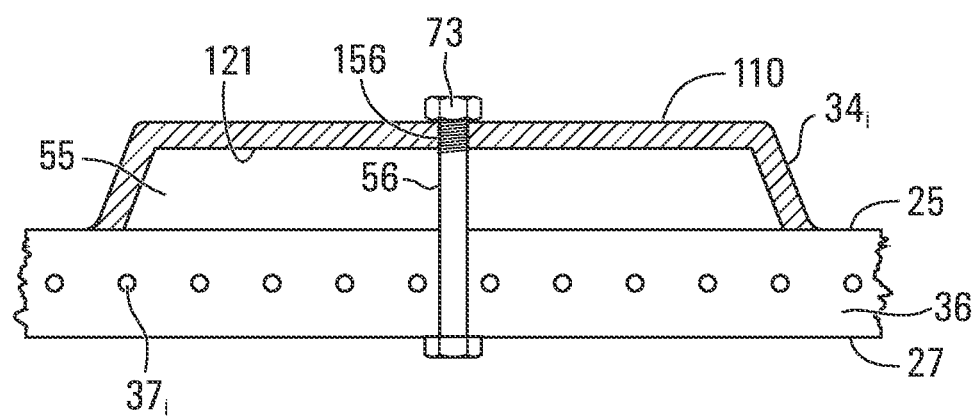

For example, FIGS. 31A and 31B show another embodiment in which a drive/guide lug $34_i$ comprises a load-distributing member 110 including a bearing surface 121 for bearing against the body 55 of the drive/guide lug $34_i$ and distributing a load fastening the drive/guide lug $34_i$ to the carcass 36 over the body 55 of the drive/guide lug $34_i$.

In this embodiment, the load-distributing member 110 is a protective cover which is placed on the body 55 of the drive/guide lug $34_i$. The protective cover 110 may be made from any suitable material (e.g., metal, polymer, ceramic, or composite).

The protective cover 110 may be designed to mate with the body 55 of the drive/guide lug $34_i$ and thus enclose all surfaces of the periphery 70 of the body 55 of the drive/guide lug $34_i$. The body 55 of the drive/guide lug $34_i$ may be mated to the cover 110 before its installation on the carcass 36 or a system for mating the cover 110 to the body 55 of the drive/guide lug $34_i$ after the lug's installation on the carcass may be provided. For example, the periphery 70 of the body 55 of the lug $34_i$ may be provided with recesses that engage internal projections provided in the cover 110.

The protective cover 110 interacts with a fastener $39_i$ to attach the drive/guide lug $34_i$ to the carcass 36. More particularly, in this example, the protective cover 100 comprises a hole 156 that is designed to align with a preformed hole 56 in the body 55 of the drive/guide lug $34_i$. The holes 56 and 156 allow passage of the fastener $39_i$ through both the top surfaces of the protective cover 100 and the body 55 of the drive/guide lug $34_i$ in order to substantially engage with an internally threaded element 73 (e.g., an internally threaded nut).

When the fastener $39_i$ is received through the holes 56 and 156 and fastened in place, the resulting force presses the protective cover 100 upon the top surface 72 of the body 55 of the drive/guide lug $34_i$. As a result, the drive/guide lug $34_i$ is attached to the carcass 36 and the protective cover 100 is attached more securely to the periphery 70 of the body 55 of the drive/guide lug $34_i$.

The above arrangement allows for the independent replacement of the protective cover 100 and/or the body 55 of the drive/guide lug $34_i$. For example, assume that portions of the protective cover 100 have become perforated and/or have been worn away due to use over time, yet the body 55 of the drive/guide lug $34_i$ itself is still usable. In this case, the protective cover 100 may be replaced by simply rotating the fastener $39_i$ in a manner to terminate its threaded engagement with the internally threaded nut. The fastener $39_i$ can then be removed via the holes 56 and 156 and the worn protective cover 100 replaced with a new protective cover 100 to continue protecting the drive/guide lug $34_i$.

In some embodiments, instead of using an internally threaded element (e.g., a nut) such as the internally threaded element 73, the hole 156 of the protective cover 100 may be internally threaded to engage the externally threaded portion of the fastener $39_i$.

Figure 32A:
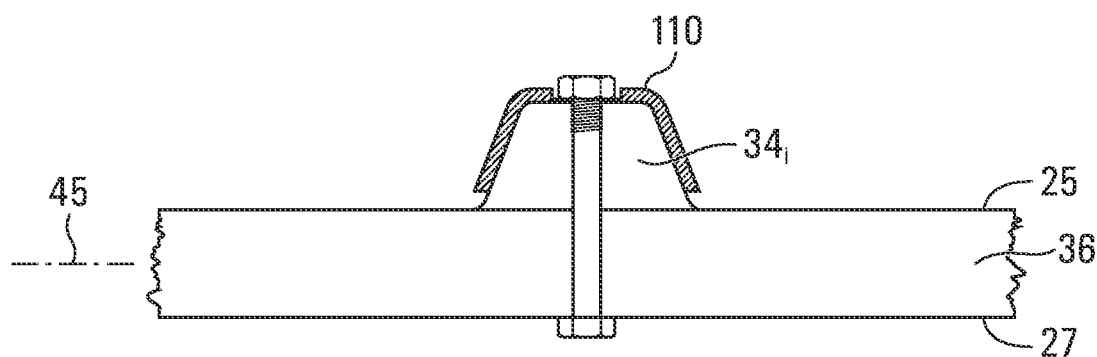
Figure 32B:
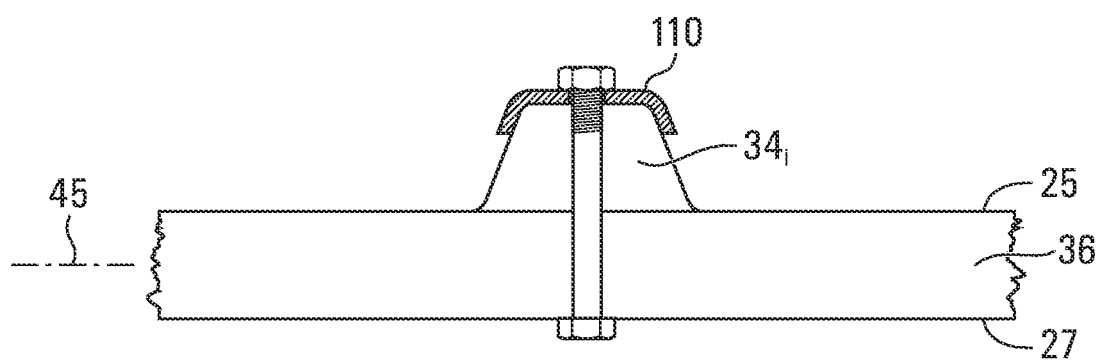

In this embodiment, the protective cover 100 covers all of the periphery 70 of the body 55 of the drive/guide $34_i$. The bearing surface 120 of the protective cover 100 thus extends over substantially all of the periphery 50 of the body 55 of the drive/guide lug $34_i$. The protective cover 100 may cover less than all of the periphery 70 of the body 55 of the drive/guide lug $34_i$ in other embodiments. For example, FIG. 32 shows embodiments in which the protective cover 100 covers less than all of the periphery 70 of the body 55 of the drive/guide lug $34_i$. For instance, in some cases, the cover 100 may cover less than all but at least 30%, in some cases at least 40%, in some cases at least 50%, in some cases at least 60%, in some cases at least 70%, and in some cases at least 80%, and in some cases even more of the periphery 70 of the body 55 of the drive/guide lug $34_i$.

3. Drive/Guide Lug Comprising One or More Replaceable Portions

Instead of or in addition to being entirely replaceable, in some embodiments, a drive/guide lug $34_i$ may comprise one or more replaceable portions that can be removed and replaced by a replacement portion when worn out. In other words, a drive/guide lug $34_i$ may comprise one or more portions that can be replaced while a remainder of the drive/guide lug $34_i$ remains in place and continues to be used.

Figure 33:
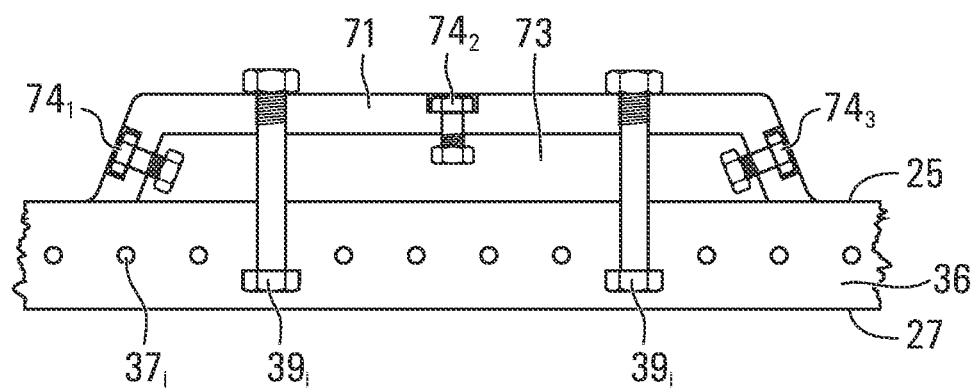
FIG. 33 shows an example of an embodiment in which a drive/guide lug has a replaceable portion.

For example, FIG. 33 shows an embodiment in which a drive/guide lug $34_i$ comprises a core 73 and a replaceable outer layer 71 that forms at least part of the periphery 70 of the drive/guide lug $34_i$. In this embodiment, the replaceable outer layer 71 is a one-piece layer that forms an entirety of the periphery 70 of the drive/guide lug $34_i$. The replaceable outer layer 71 comprises a portion of the rubber 67 of the drive/guide lug $34_i$.

The replaceable outer layer 71 is removably mounted to the core 73. More particularly, in this embodiment, the replaceable outer layer 71 is mounted to the core 73 via at least one fastener, in this case three (3) fasteners $74_1$-$74_3$. The core 73 comprises premolded or otherwise preformed holes in which the fasteners $74_1$-$74_3$ are received. The core 73 may be provided with internally threaded fastening elements (e.g., nuts) engaged by the fasteners $74_1$-$74_3$.

The replaceable outer layer 71 may be configured in various other ways in other embodiments. For example, in some embodiments, the replaceable outer layer 71 may be a multi-piece layer, may form less than all of the periphery 70 of the drive/guide lug $34_i$, and/or may comprise rubber or other elastomeric material different from that of the core 73. For instance, in some cases, the replaceable outer layer 71 may comprise a plurality of separate pieces of rubber harder than that of the core 73 that form portions of the periphery 70 of the drive/guide lug $34_i$ which are more susceptible to wear (e.g., the front and rear surfaces $69_1$, $69_3$).

Also, the replaceable outer layer 71 may be removably mounted to the core 73 in various other ways in other embodiments.

For example, in some embodiments, the replaceable outer layer 71 may be removably mounted to the core 73 using a set of projections and recesses on respective "mating surfaces", which are those surfaces of the outer layer 71 and core 73 that are intended to remain in substantial contact with each other. For instance, the mating surface of the replaceable outer layer 71 may be provided with a set of projections that are designed to fit into and engage a set of recesses provided in the mating surface of the core 73. The set of projections and recesses may be designed such that the initial installation of the replaceable outer layer 71 (specifically, the projections therein) requires considerable force to mate it with the core 73, and more specifically, mounting the outer layer's projections within the core's recesses. Over time, use of the endless track 22 may cause the contact between mating surfaces to degrade somewhat, allowing less force to be used to remove the outer layer 71 from the core 73 than was needed to install it. It will be appreciated that a similar embodiment may switch the locations of the projections and recesses, such that there are projections on the core 73 and recesses on the outer layer 71.

As another example, in some embodiments, the replaceable outer layer 71 may be removably mounted to the core 73 using an adhesive, such as a glue, an epoxy or any other suitable substance with adhesive properties. In this embodiment, the mating surfaces of the outer layer 71 and the core 73 may be coated with such an adhesive so that contact between them causes a chemical reaction that adheres the mating surfaces together.

In some case, over time, wear on the outer layer 71 may cause it to gradually degrade, revealing the mating surface of the core 73 beneath. At this point, any remaining portion of the outer layer 71 can be removed (e.g., by shearing or sanding it off) in order that a new replaceable outer layer 71 may be installed.

In other cases, the adhesive applied to the mating surfaces of the replaceable outer layer 71 and/or the core 73 may be of a temporary type. For example, the temporary adhesive may use a first treatment, which may be chemical or non-chemical in nature, to cause the adhesive on the mating surfaces of the outer layer 71 and the core 73 to be bonded together. Non-chemical treatments that may be used to bond these mating surfaces may include, for instance, the application of pressure, heat, radiation (e.g., infrared or ultraviolet), among others.

In such cases, when the replaceable outer layer 71 is worn and is ready to be removed, a second treatment may be applied to it in order to remove the bonding characteristics of the temporary adhesive from the mating surfaces. The second treatment that is used to remove the temporary adhesive may be identical to the first treatment or may be different than the first treatment, and may be chemical or non-chemical in nature. For instance, the first treatment applied to bond the replaceable outer layer 71 and the core 73 may be chemical in nature and involve the use of a catalyst to cause the bonding properties of the adhesive to occur. The second treatment may involve the application of radiation to the mating surfaces that degrades the temporary adhesive along the mating surfaces and cause its bonding properties to degrade. Once these bonding properties have sufficiently degraded, the worn outer layer 71 may be removed from the core 73 and a new outer layer 71 may be installed using the temporary adhesive.

As yet another example, in some embodiments, the mating surfaces of the replaceable outer layer 71 and the core 73 may be bonded using magnetism. For example, in some cases, the mating surface of the replaceable outer layer 71 and the core 73 may be provided with a magnetic substance, such as a magnetic oxide or similar compound. The mating surface of the outer layer 71 may have a magnetic field charge that is opposite the magnetic field charge of the mating surface of the core 73. Because opposite magnetic fields are generally attracted to each other, the mating surfaces of the outer layer 71 and the core 73 will bond through this attraction.

When it is time to replace the replaceable outer layer 71, the magnetic field charge applied to the mating surface of this layer may be reversed, such that the magnetic field charges of the mating surfaces of the outer layer 71 and the core 73 are identical. Since similar magnetic field charges repel each other, the mating surfaces of the outer layer 71 and the core 73 will be repelled from each other, allowing replacement of the worn outer layer. Upon installation of a new outer layer 71, the magnetic field charge of its mating surface may be reversed so that the mating surfaces of the outer layer 71 and the core 73 may be attracted once again.

4. Replaceable Set of Drive/Guide Lugs Linked to One Another

Rather than being individually replaceable, in some embodiments, the drive/guide lugs $34_1$-$34_N$ may be arranged into one or more replaceable sets of drive/guide lugs, where each replaceable set of drive/guide lugs is connected to the carcass 36 and comprises two (2) or more of the drive/guide lugs $34_1$-$34_N$ that are interconnected by a link.

Figure 34:
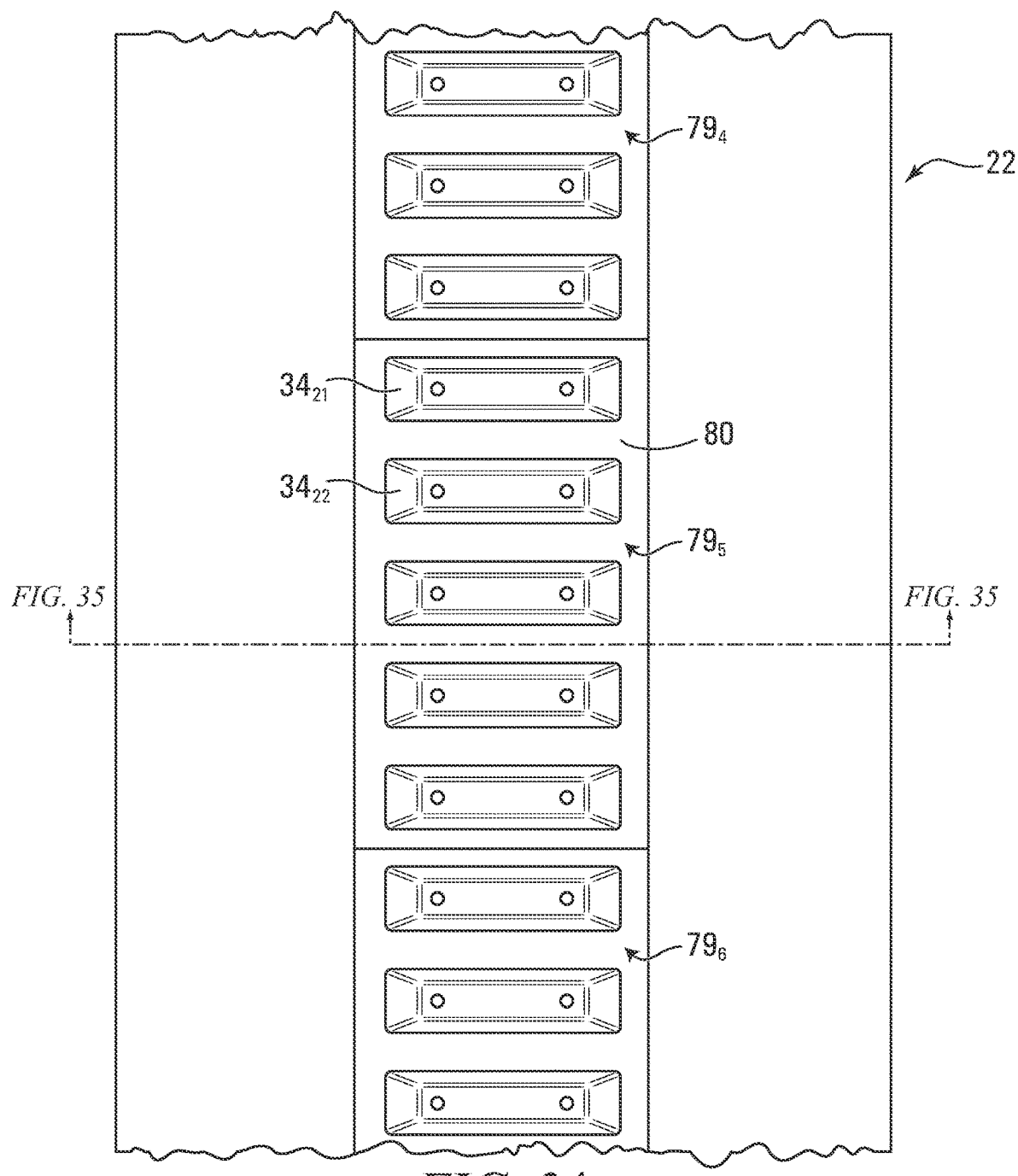
FIGS. 34 to 38 show various examples of embodiments in which the endless track includes a replaceable set of drive/guide lugs linked to one another.
Figure 35:
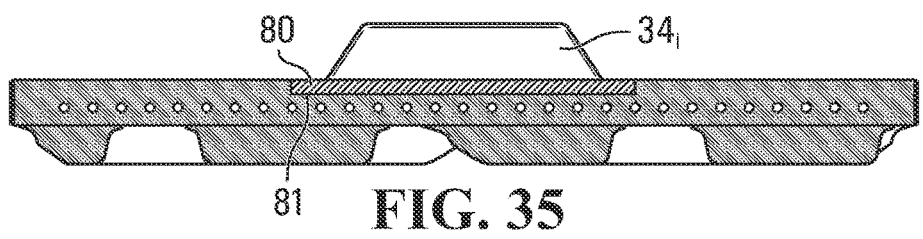
Figure 36:
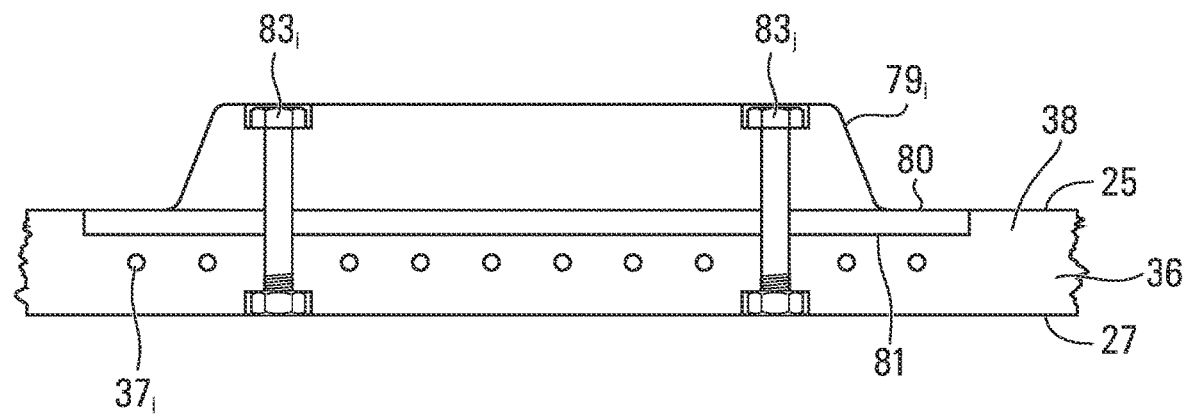

For example, FIGS. 34 to 36 show an embodiment in which the drive/guide lugs $34_1$-$34_N$ are arranged into a plurality of replaceable sets of drive/guide lugs $79_1$-$79_S$. Each replaceable set of drive/guide lugs $79_i$ is connected to the carcass 36 and comprises five (5) of the drive/guide lugs $34_1$-$34_N$ that are interconnected by a link 80 which rests against the carcass 36.

The link 80 of a replaceable set of drive/guide lugs $79_i$ may be constructed in various ways. For example, in this embodiment, the link 80 comprises a band of rubber and/or other elastomeric material molded with the rubber 67 of each drive/guide lug of the replaceable set of drive/guide lugs $79_i$.

Each replaceable set of drive/guide lugs $79_i$ is fastened to the carcass 36 by a plurality of fasteners $83_1$-$83_F$. More particularly, in this embodiment, the fasteners $83_1$-$83_F$ extend through those drive/guide lugs of the replaceable set of drive/guide lugs $79_i$. In this way, each drive/guide lug of replaceable set of drive/guide lugs $79_i$ is independently fastened to the carcass 36.

The endless track 22 may comprise an alignment system to properly align a replaceable set of drive/guide lugs $79_i$ on the carcass 36. For example, in this embodiment, the carcass 36 comprises a recess 81 in which the link 80 of the replaceable set of drive/guide lugs $79_i$ fits. As another example, in other embodiments, the alignment system may comprise various arrangements of one or more recesses and one or more projections distributed among the carcass 36 and the link 80 such that these one or more projections fit into these one or more recesses for alignment of the replaceable set of drive/guide lugs $79_i$ on the carcass 36

More particularly, in this embodiment, the set of drive/guide lugs $79_i$ comprises holes $56_i$, $56_j$ extending through each of its drive/guide lugs to allow fasteners $83_i$, $83_j$ to pass through the body of the lug and through the link 80. The carcass 36 comprises corresponding holes which terminate at embedded attachment elements (e.g., internally threaded nuts) designed to receive and engage the fasteners $83_i$ and $83_j$. These holes in the carcass 36 at least partially extend in such a way as to not disrupt the reinforcements 42, 43, and more specifically, the reinforcing cables $37_1$-$37_M$. When the link 80 is properly installed in the recess 81, the holes in the set of drive/guide lugs $79_i$ and the carcass 36 become substantially aligned with each other such that the fasteners can be inserted into these holes and tightened.

Figure 37:
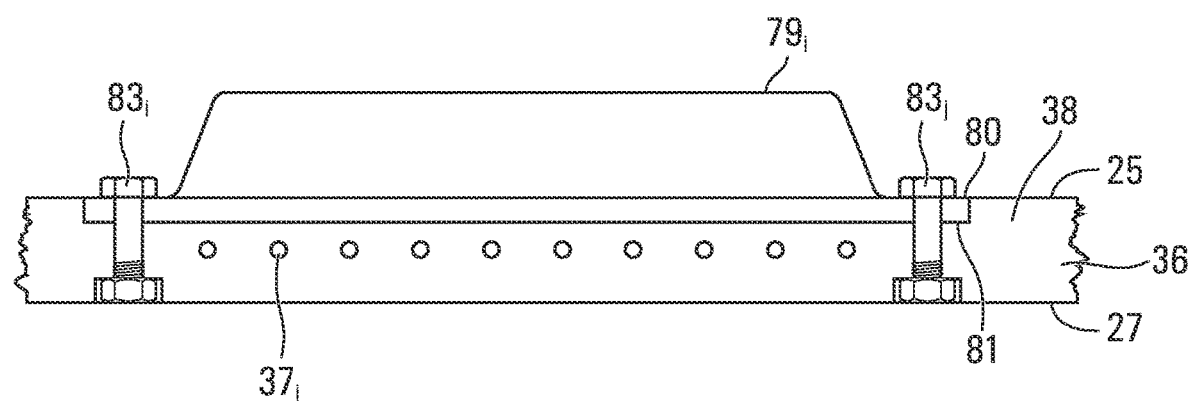

FIG. 37 shows an alternative embodiment in which the fasteners $83_i$, $83_j$ extend through located the link 80 but not through the drive/guide lugs of the set of drive/guide lugs $79_i$.

Figure 38:
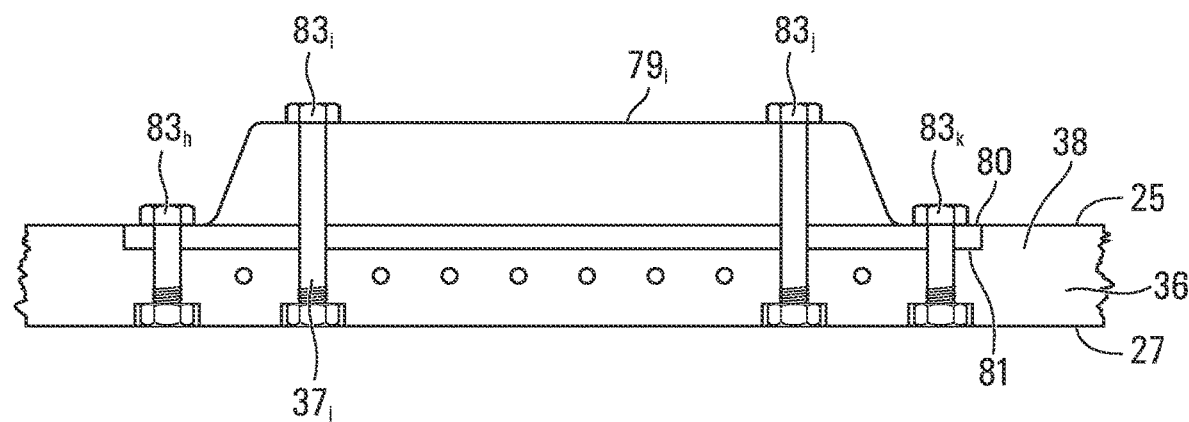

FIG. 38 represents another alternative embodiment in which some of the fasteners $83_1$-$83_F$ fastening the replaceable set of drive/guide lugs $79_i$ to the carcass 36 extend through the drive/guide lugs of the set of set of drive/guide lugs $79_i$ and others of fasteners $83_1$-$83_F$ do not extend the drive/guide lugs of the set of set of drive/guide lugs $79_i$. More particularly, in this embodiment, the link 80 and the carcass 36 are provided with four (4) holes for receiving some of the fasteners $83_1$-$83_F$. Two (2) of these holes are provided in a drive/guide lug of the set of drive/guide lugs $79_i$, while the remaining two (2) holes are provided in the link 80 adjacent to any drive/guide lug of the set of drive/guide lugs $79_i$.

5. Replacement Lug Shaped Differently from Lug it Replaces

In some embodiments, a shape of the periphery 70 of the body 55 of a replacement drive/guide lug $34_n$* intended to replace a to-be-replaced drive/guide lug $34_n$ may be different from a shape of the periphery 70 of the body 55 of the to-be-replaced drive/guide lug $34_n$. The to-be-replaced drive/guide lug $34_n$ is a lug which is worn, damaged or otherwise to be replaced. In some cases, the to-be-replaced drive/guide lug $34_n$ may be an original lug provided during manufacturing of the endless track 22. In other cases, the to-be-replaced drive/guide lug $34_n$ may be a replacement lug which was mounted to the carcass 36 of the endless track 22 after manufacturing of the endless track 22 and needs to be replaced.

The difference in shape between the replacement drive/guide lug $34_n$* and the to-be-replaced drive/guide lug $34_n$ may take into account wear or other deterioration of the endless track 22 and/or of other components of the track assembly $16_i$.

Figure 47:
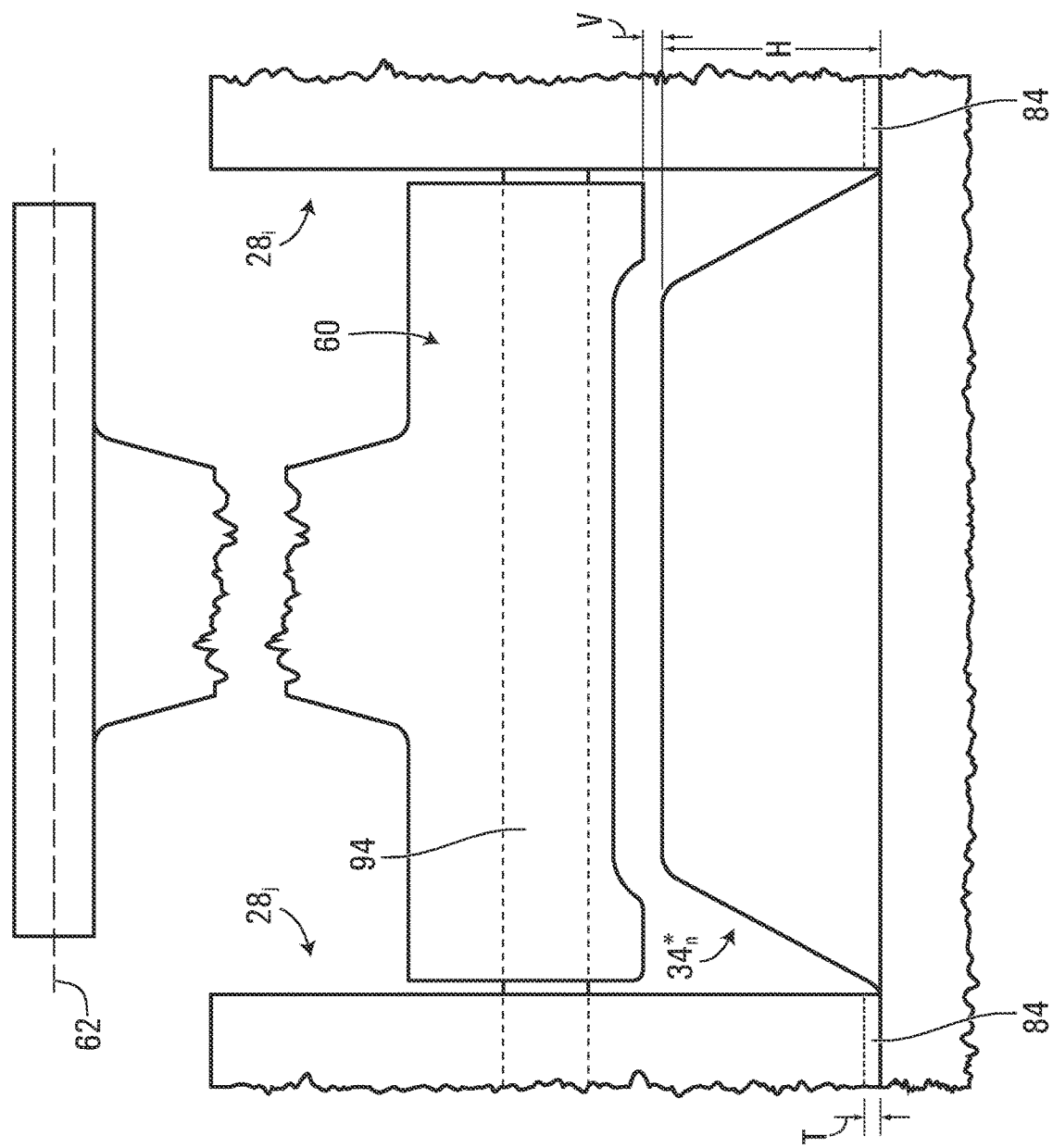
FIG. 47 shows an example of an embodiment in which a replacement drive/guide lug is shaped differently than a drive/guide lug it replaces.

For instance, in some embodiments in which the to-be-replaced drive/guide lug $34_n$ is used to guide the endless track 22 by passing between laterally adjacent ones of the mid-rollers $28_1$-$28_8$, the drive/guide lug $34_n$ may have interfered with a mid-roller support 60 which carries one or more of the mid-rollers $28_1$-$28_8$, includes an axle 94 of each of these one or more carried mid-rollers, and is located above the drive/guide lug $34_n$, as shown in FIG. 47. In this example, the mid-roller support 60 includes the axle 94 which is a common axle of the mid-rollers $28_i$, $28_j$. Also, in this example, the mid-roller support 60 is pivotable relative to the frame 13 of the track assembly $16_i$ about a pivot axis 62 to allow the mid-rollers $28_i$, $28_j$ to move up and down relative to the frame 13 of the track assembly $16_i$. The mid-roller support 60 may be configured in various other ways in other examples. For instance, in other examples, a mid-roller carried by the mid-roller support 60 may have its own dedicated axle 94 and/or the mid-roller support 60 may not be pivotable relative to the frame 13 of the track assembly $16_i$.

Interference between the to-be-replaced drive/guide lug $34_n$ and the mid-roller support 60 may have occurred due to various factors. For example, in some cases:

The mid-rollers $28_i$, $28_j$ may reduce in diameter as they wear out. For instance, in some embodiments, each of the mid-rollers $28_i$, $28_j$ may comprise a rubber or other elastomeric covering 84 on its circumference to enhance friction with the rolling path 33 of the inner side 45 of the endless track 22. Such a covering 84 is represented in dotted line in FIG. 47. As this rubber or other elastomeric covering 84 wears off during use, the diameter of each of the mid-rollers 28$_i$, 28$_j$ is reduced, bringing the mid-roller support 60 down closer to the drive/guide lug 34$_n$. In other embodiments, no such covering 84 may be provided but the mid-rollers 28$_i$, 28$_j$ may nevertheless reduce in diameter as they material wears off.

The tread pattern 40 and its traction lugs 58$_1$-58$_T$ may wear unevenly in the widthwise direction of the endless track 22 such that the tread pattern 40 is thinner on one half of the width of the endless track 22. This causes the drive/guide lug 34$_n$ to be inclined relative to the horizontal and thus the mid-roller support 60 to be closer to a top corner region of the drive/guide lug 34$_n$.

The endless track 22 may be misaligned in the widthwise direction of the track assembly 16$_i$.

The tension in the endless track 22 may be low (e.g, causing deformation or deflection in the center of the track 22).

One or more of these factors may result in the to-be-replaced drive/guide lug 34$_n$ interfering with the mid-roller support 60 during use. This interference may cause wear or other deterioration of the drive/guide lug 34$_n$.

Thus, in some embodiments, the replacement drive/guide lug 34$_n$\* may be shaped differently than the to-be-replaced drive/guide lug 34$_n$ in order to avoid interfering with the mid-roller support 60 during use.

For example, in some embodiments, the replacement drive/guide lug 34$_n$\* may be smaller than the to-be-replaced drive/guide lug 34$_n$. That is, at least one given dimension of the replacement drive/guide lug 34$_n$\* may be smaller than a corresponding dimension of the to-be-replaced drive/guide lug 34$_n$. For instance, the height H of the replacement drive/guide lug 34$_n$\* may be less than the height H of the to-be-replaced drive/guide lug 34$_n$, the side-to-side dimension $L_W$ of the replacement drive/guide lug 34$_n$\* may be less than the side-to-side dimension $L_W$ of the to-be-replaced drive/guide lug 34$_n$, and/or the front-to-rear dimension $L_L$ of the replacement drive/guide lug 34$_n$\* may be less than the front-to-rear dimension $L_L$ of the to-be-replaced drive/guide lug 34$_n$.

Various degrees of difference between a given dimension of the replacement drive/guide lug 34$_n$\* and a corresponding dimension of the to-be-replaced drive/guide lug 34$_n$ are possible in various embodiments. For example, in some embodiments: the height H of the replacement drive/guide lug 34$_n$\* may be no more than 97.5%, in some cases no more than 95%, in some cases no more than 92.5%, in some cases no more than 90%, in some cases no more than 87.5%, and in some cases no more than 85% of the height H of the to-be-replaced drive/guide lug 34$_n$; the side-to-side dimension $L_W$ of the replacement drive/guide lug 34$_n$\* may be no more than 97.5%, in some cases no more than 95%, in some cases no more than 92.5%, in some cases no more than 90%, in some cases no more than 87.5%, and in some cases no more than 85% of the side-to-side dimension $L_W$ of the to-be-replaced drive/guide lug 34$_n$, and/or the front-to-rear dimension $L_L$ of the replacement drive/guide lug 34$_n$\* may be no more than 97.5%, in some cases no more than 95%, in some cases no more than 92.5%, in some cases no more than 90%, in some cases no more than 87.5%, and in some cases no more than 85% of the front-to-rear dimension $L_L$ of the to-be-replaced drive/guide lug 34$_n$.

For instance, in one example of implementation, the height H of replacement drive/guide lug 34$_n$\* may be 108 mm while the height H of the to-be-replaced drive/guide lug 34$_n$ may be 124 mm, and the side-to-side dimension $L_W$ of the replacement drive/guide lug 34$_n$\* may be 108 mm while the side-to-side dimension $L_W$ of the to-be-replaced drive/guide lug 34$_n$ may be 116 mm. Various other values are possible in other examples of implementation.

As another example, in some embodiments, the replacement drive/guide lug 34$_n$\* may be shaped differently than the to-be-replaced drive/guide lug 34$_n$ such that, when the diameter of each of the mid-rollers 28$_i$, 28$_j$ has reduced to its minimum during normal use, the to-be-replaced drive/guide lug 34$_n$ does not clear the mid-roller support 60 without interference but the replacement drive/guide lug 34$_n$\* clears the mid-roller support 60 without interference. For instance, in embodiments in which each of the mid-rollers 28$_i$, 28$_j$ comprises a rubber or other elastomeric covering 84 on its circumference, the height H of the replacement drive/guide lug 34$_n$\* may be sufficiently small that, when the covering 84 has worn off, i.e., the diameter of each of the mid-rollers 28$_i$, 28$_{6j}$ has reduced by an amount corresponding to an original thickness T of the covering 84, the replacement drive/guide lug 34$_n$\* clears the mid-roller support 60 without interference. Basically, the replacement drive/guide lug 34$_n$\* may be configured such that a vertical clearance V between the replacement drive/guide lug 34$_n$\* and the mid-roller support 70 is sufficient to avoid interference between the drive/guide lug 34$_n$\* and the mid-roller support 70 as the track assembly 16$_i$ is used.

Although in embodiments considered above the shape of the periphery 70 of the body 55 of the replacement drive/guide lug 34$_n$\* differs from the shape of the periphery 70 of the body 55 of the to-be-replaced drive/guide lug 34$_n$ by virtue of the replacement drive/guide lug 34$_n$\* and the to-be-replaced drive/guide lug 34$_n$ having different overall dimensions (e.g., a different height and a different width), other differences in shape between the replacement drive/guide lug 34$_n$\* and the to-be-replaced drive/guide lug 34$_n$ may be used in other embodiments to achieve similar advantages. For example, in some embodiments, the top surface 72, the front surface 69$_1$, the rear surface 69$_3$, the side surface 69$_2$, and/or the side surface 69$_4$ of the replacement drive/guide lug 34$_n$\* may be shaped differently than the corresponding surface(s) of the to-be-replaced drive/guide lug 34$_n$, without the replacement drive/guide lug 34$_n$\* and the to-be-replaced drive/guide lug 34$_n$ necessarily having different overall dimensions.

Embodiments discussed above thus provide solutions facilitating replacement of at least part of each of the drive/guide lugs 34$_1$-34$_N$. While these solutions were discussed separately, any suitable combination of two of more of these solutions may be used in some embodiments.

While in embodiments considered above the lug replacement capability of the endless track 22 pertained to the drive/guide lugs 34$_1$-34$_N$, in some embodiments, the lug replacement capability of the endless track 22 may also or instead pertain to the traction lugs 58$_1$-58$_T$. Accordingly, in some embodiments, at least part of each of the traction lugs 58$_1$-58$_T$ is replaceable, (i.e., each of the traction lugs 58$_1$-58$_T$ is entirely replaceable or comprises one or more replaceable portions). Such replacement capability can be implemented in various ways in various embodiments. In particular, solutions described above for replacement of the drive/guide lugs 34$_1$-34$_N$ or portions thereof, including solutions for fastening and/or alignment of the drive/guide lugs 34$_1$-34$_N$ on the carcass 36, may be similarly applied for replacement of the traction lugs 58$_1$-58$_T$ or portions thereof.

Figure 42A:
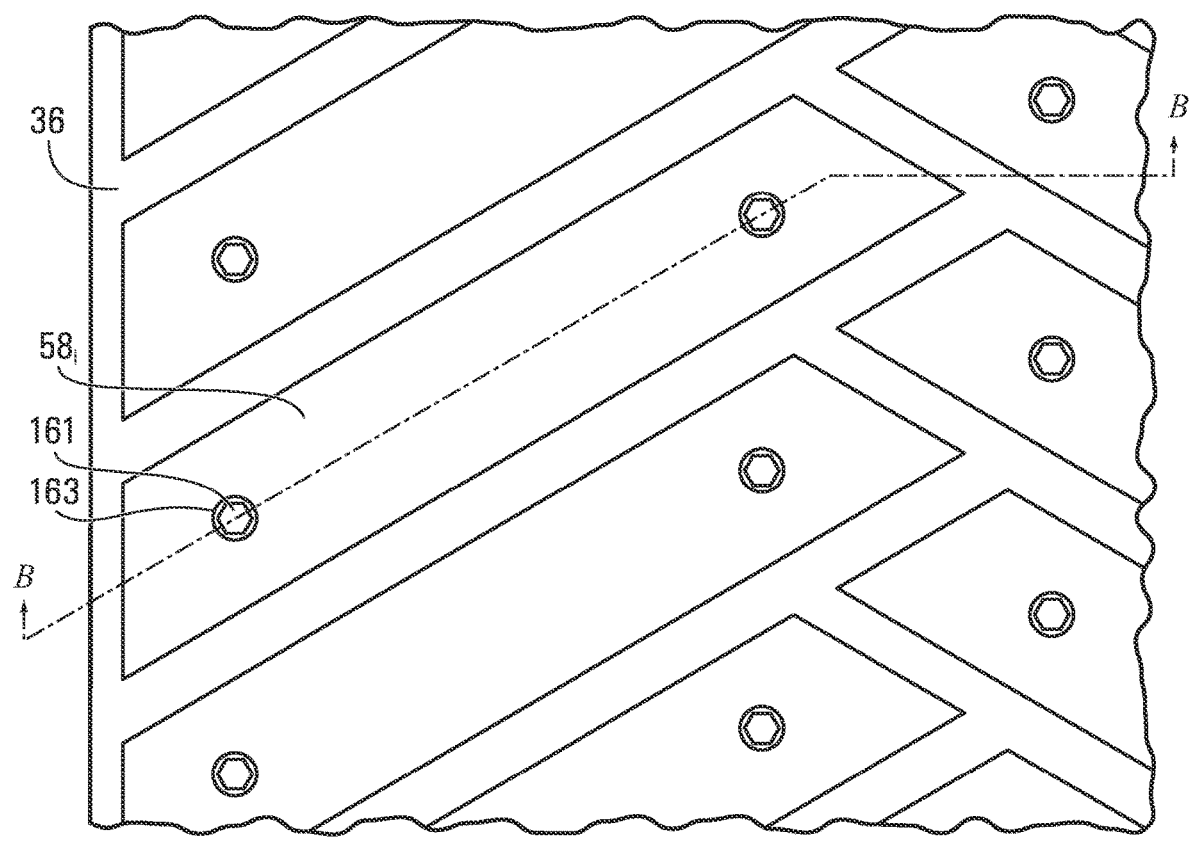
FIGS. 42A and 42B show an example of an embodiment in which traction lugs are connectable to the carcass of the endless track with fasteners.
Figure 42B:
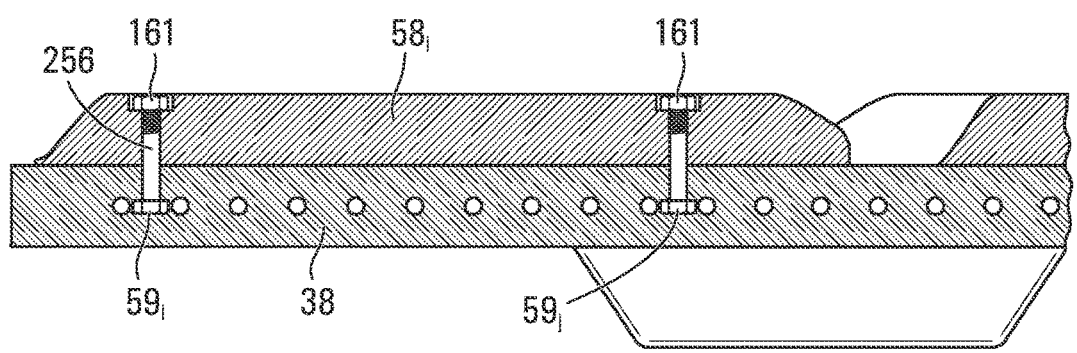

For example, FIGS. 42A and 42B show an embodiment of traction lugs 58$_1$-58$_T$ that are replaceable, where one of the solutions described above in relation to the replacement of the drive/guide lugs $34_1$-$34_N$ is implemented for the traction lugs $58_1$-$58_T$.

More particularly, in this embodiment, a plurality of inserts $59_1$-$59_S$ are embedded within the rubber 38 of the carcass 36. In this case, the inserts $59_1$-$59_S$ are implemented as fasteners embedded perpendicularly to the longitudinal axis 45 in a manner such that a portion of each fastener $59_i$ extends beyond the surface of the carcass 36 in the direction of the ground-engaging side 27. Each fastener $59_i$ is provided with external threads that are designed to engage an internally threaded attachment element 161 (e.g., a nut).

Each traction lug $58_i$ comprises a plurality of, in this case two (2), holes $256_1$, $256_2$ that are premolded or otherwise preformed with the traction lug $58_i$ in a manner similar to that discussed above in connection with the holes $35_1$-$35_N$ of the drive/guide lugs $34_1$-$34_N$. Each hole $256_i$ allows a fastener $59_i$ to enter and/or pass through the body of the traction lug $58_i$ in order that its externally threaded portion may contact and engage an attachment element 161. In this case, the traction lug $58_i$ is provided with a recess 163 to accommodate the attachment element 161.

In some embodiments, both the traction lugs $58_1$-$58_T$ and the drive/guide lugs $34_1$-$34_N$ may be replaceable using the solutions discussed previously herein.

In some cases, the traction lugs $58_1$-$58_T$ and the drive/guide lugs $34_1$-$34_N$ may be fastened to the carcass 36 via common fasteners. That is, at least some of the fasteners that are used to attach the drive/guide lugs $34_1$-$34_N$ to the carcass 36 may also be used to attach some of the traction lugs $58_1$-$58_T$ to the carcass 36. For example, one end of such a fastener (e.g., a bolt head) may be located within the vicinity of a drive/guide lug $34_i$, the other end of the fastener (e.g., its externally threaded portion and/or an internally threaded nut) may be located within the vicinity of a traction lug $58_i$, and the portion of the fastener between these two ends passes through the carcass 36.

Figure 43A:
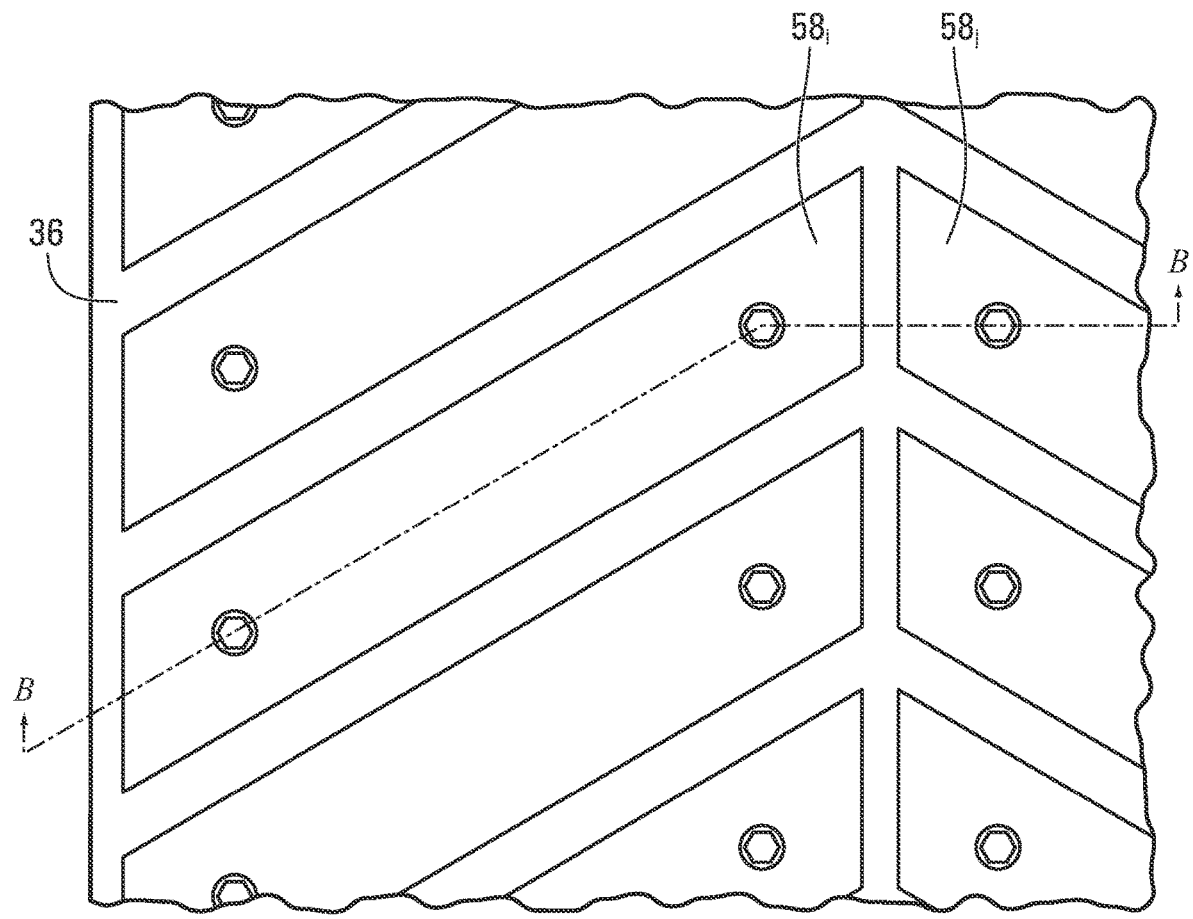
FIGS. 43A and 43B show an example of an embodiment in which traction lugs and drive/guide lugs are connectable to the carcass of the endless track with common fasteners.
Figure 43B:
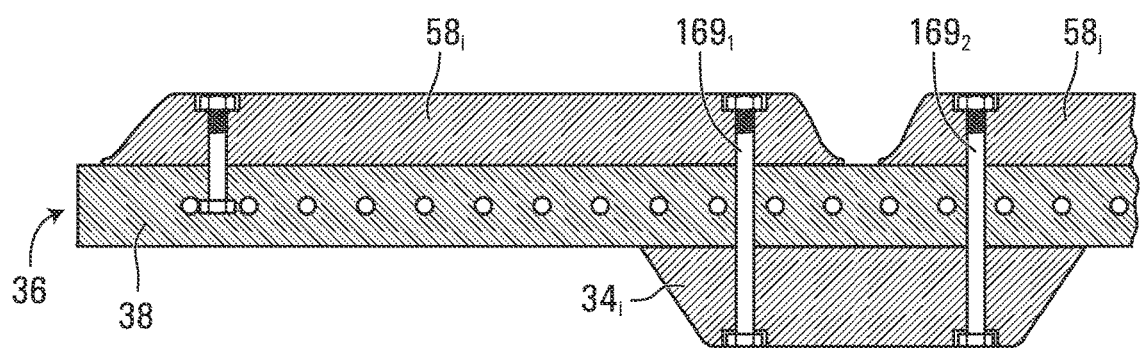
Figure 44A:
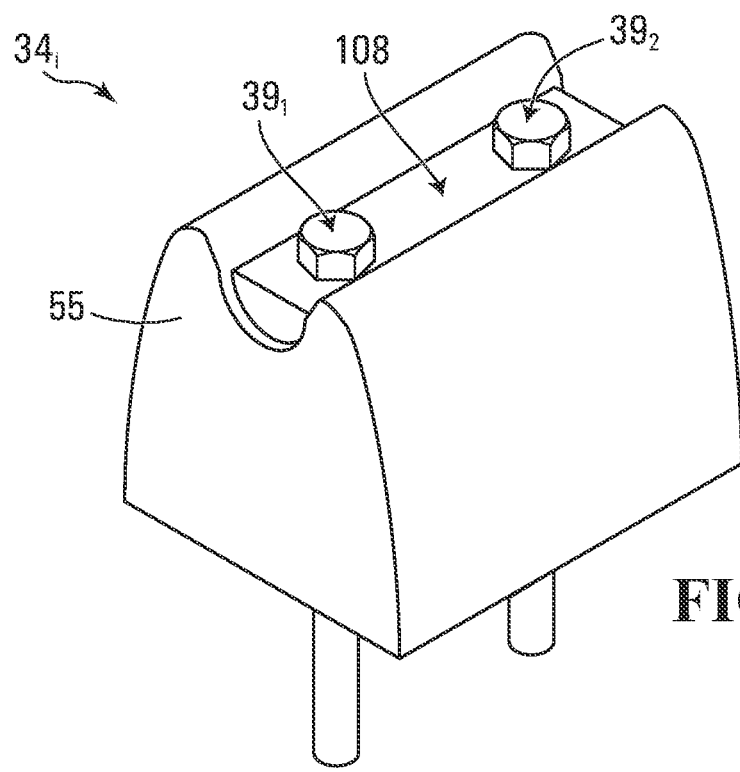
Figure 44B:
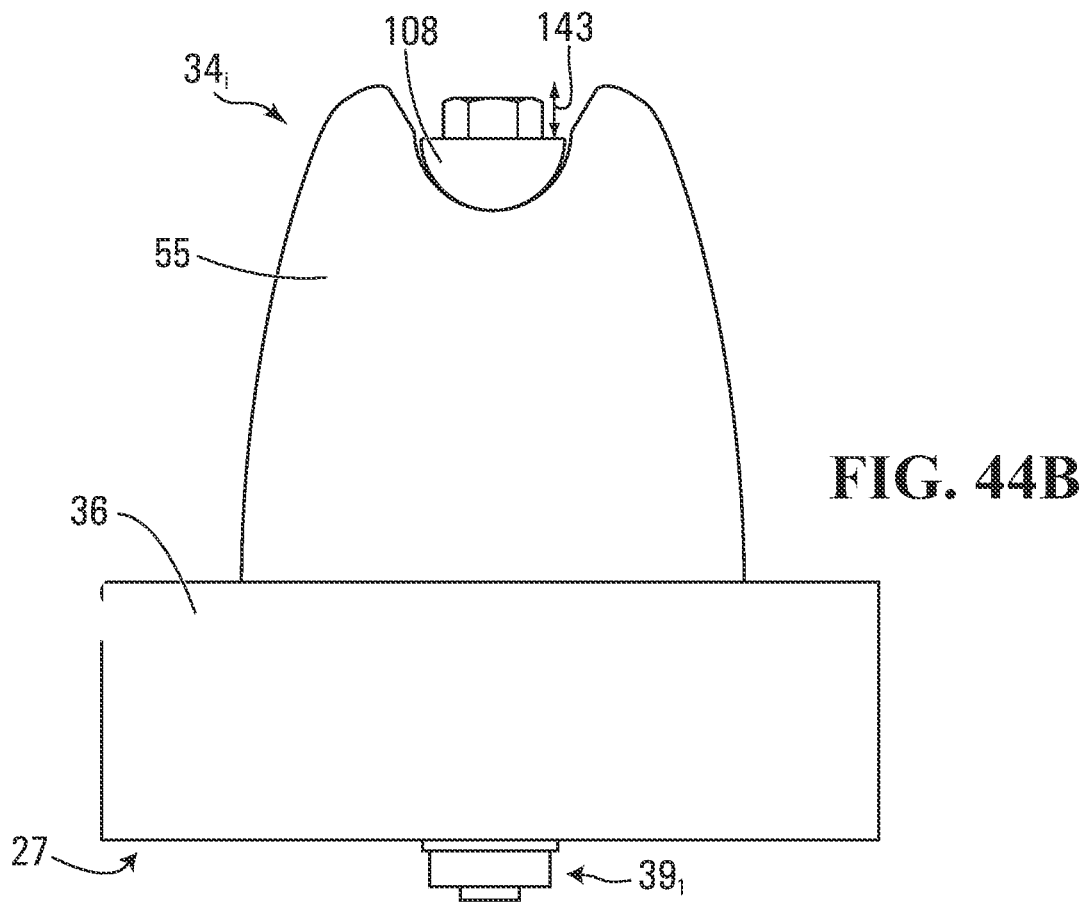
Figure 44C:
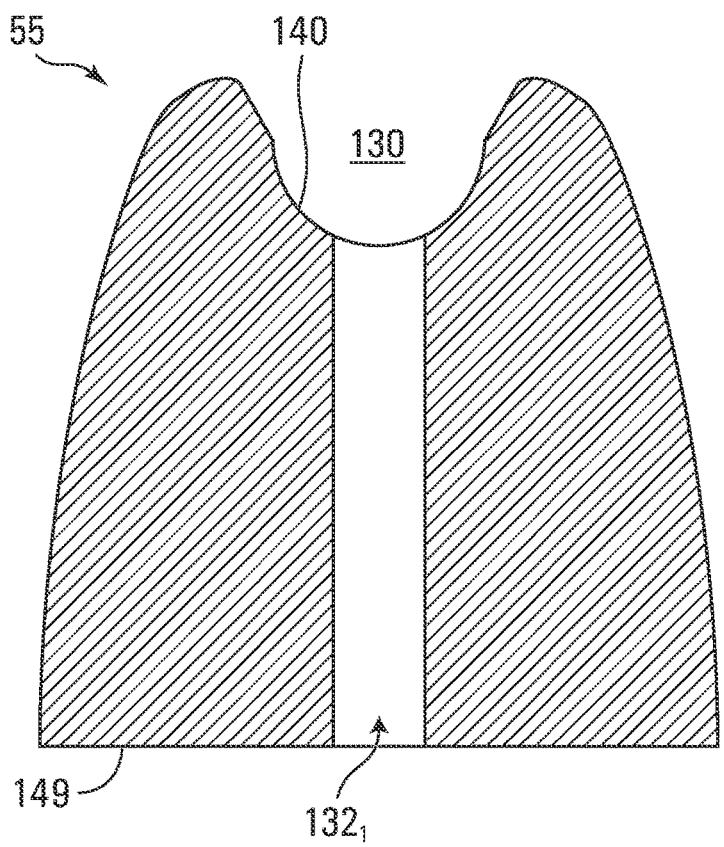
Figure 44D:
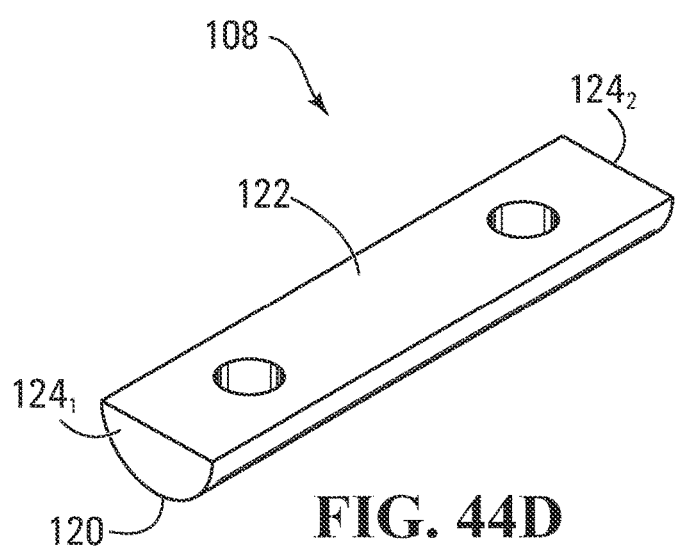
Figure 44E:
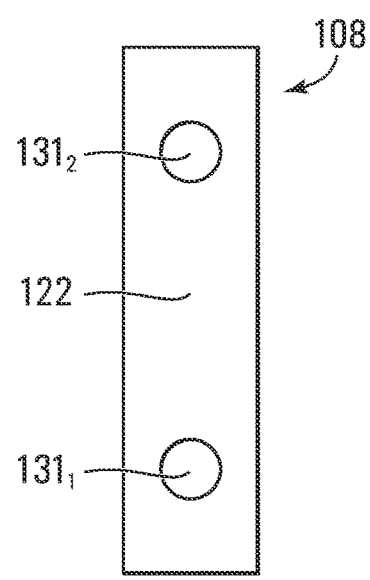
Figure 44F:
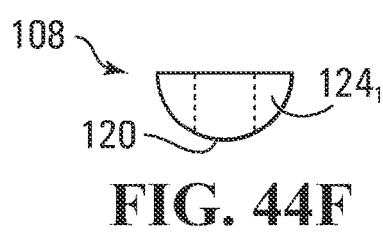

FIGS. 43A and 43B show an embodiment in which the traction lugs $58_1$-$58_T$ and the drive/guide lugs $34_1$-$34_N$ are fastened to the carcass 36 via common fasteners. In this embodiment, a drive/guide lug $34_i$ is fastened to the carcass 36 via two (2) fasteners $169_1$, $169_2$ that are also used to fasten at least one (1), in this case two (2), traction lugs $58_i$, $58_j$, to the carcass 36.

Each track assembly $16_i$ of the construction vehicle 10, including its endless track 22, may be configured in various other ways in other embodiments.

For example, although in embodiments considered above, the wheel-contacting projections $34_1$-$34_N$ of the endless track 22 are drive/guide lugs, in other embodiments, the wheel-contacting projections $34_1$-$34_N$ may be guide lugs which cooperate with the wheels 24, 26, $28_1$-$28_R$ to guide the endless track 22 as it moves around these wheels, without themselves being responsible for imparting motion of the endless track 22, in order to help prevent undesired lateral movement or detracking of the track 22. In such embodiments, the endless track 22 may be designed to facilitate replacement of the guide lugs $34_1$-$34_N$ or portions of the guide lugs $34_1$-$34_N$ in ways similar to those discussed previously herein.

Each track assembly $16_i$ may comprise different and/or additional components in other embodiments. For example, in some embodiments, the track assembly $16_i$ may comprise a front drive wheel (e.g., the idler wheel 26 may be replaced by a drive wheel) instead of or in addition to the drive wheel 24. As another example, in some embodiments, the track assembly $16_i$ may comprise more or less roller wheels such as the roller wheels $28_1$-$28_R$. As yet another example, rather than have a generally linear configuration as in this embodiment, in other embodiments, the track assembly $16_i$ may have various other configurations (e.g., a generally triangular configuration).

While in embodiments considered above the work vehicle 10 is a construction vehicle for performing construction work, in other embodiments, the work vehicle 10 may be an agricultural vehicle (e.g., a tractor, a combine harvester, another type of harvester, etc.) for performing agricultural work, a forestry vehicle (e.g., a feller-buncher, a tree chipper, a knuckleboom loader, etc.) for performing forestry work, a military vehicle (e.g., a combat engineering vehicle (CEV), etc.) for performing work in a military application, a transporter vehicle (e.g., a heavy hauler, a flatbed truck, a trailer, a carrier, etc.) for transporting equipment, materials, cargo or other objects, or any other vehicle operable off paved roads. Although operable off paved roads, a work vehicle may also be operable on paved roads in some cases. Also, while in embodiments considered above the vehicle 10 is driven by a human operator in the vehicle 10, in other embodiments, the vehicle 10 may be an unmanned ground vehicle (e.g., a tele-operated or autonomous unmanned ground vehicle).

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track for traction of a vehicle, the track being mountable around a plurality of wheels that includes a drive wheel for driving the track, the track comprising:
   an elastomeric carcass comprising a ground-engaging outer surface and an inner surface opposite to the ground-engaging outer surface; and
   a plurality of elastomeric projections projecting from the elastomeric carcass; wherein the elastomeric carcass comprises a replacement-facilitating portion having predetermined dimensions provisioned during original manufacturing of the track to facilitate replacement of a peripheral layer of the elastomeric carcass and respective ones of the elastomeric projections molded with and projecting from the peripheral layer of the elastomeric carcass by a new peripheral layer of the elastomeric carcass and new elastomeric projections molded with and projecting from the new peripheral layer of the elastomeric carcass.

2. The track of claim 1, wherein: the elastomeric projections include wheel-contacting projections projecting from the inner surface of the elastomeric carcass; the peripheral layer of the elastomeric carcass includes at least part of the inner surface of the elastomeric carcass; the respective ones of the elastomeric projections include respective ones of the wheel-contacting projections; the new peripheral layer of the elastomeric carcass includes at least part of the inner surface of the elastomeric carcass; and the new elastomeric projections include new wheel-contacting projections.

3. The track of claim 2, wherein: the elastomeric projections include traction projections projecting from the ground-engaging outer surface of the elastomeric carcass; the peripheral layer of the elastomeric carcass includes at least part of the ground-engaging outer surface of the elastomeric carcass; the respective ones of the elastomeric projections include respective ones of the traction projections; the new peripheral layer of the elastomeric carcass includes at least part of the ground-engaging outer surface of the elastomeric carcass; and the new elastomeric projections include new traction projections.

4. The track of claim 1, wherein: the elastomeric projections include traction projections projecting from the ground-engaging outer surface of the elastomeric carcass; the peripheral layer of the elastomeric carcass includes at least part of the ground-engaging outer surface of the elastomeric carcass; the respective ones of the elastomeric projections include respective ones of the traction projections; the new peripheral layer of the elastomeric carcass includes at least part of the ground-engaging outer surface of the elastomeric carcass; and the new elastomeric projections include new traction projections.

5. The track of claim 1, wherein the respective ones of the elastomeric projections comprises at least five elastomeric projections.

6. The track of claim 1, wherein the peripheral layer of the elastomeric carcass is a band of elastomeric material narrower than a width of the track.

7. The track of claim 6, wherein the elastomeric carcass comprises a recess receiving the peripheral layer of the elastomeric carcass.

8. The track of claim 1, wherein the elastomeric carcass comprises a recess receiving the peripheral layer of the elastomeric carcass.

9. The track of claim 1, wherein a dimension of the peripheral layer of the elastomeric carcass in a widthwise direction of the track is greater than a dimension of each of the elastomeric projections in the widthwise direction of the track.

10. The track of claim 1, wherein the replacement-facilitating portion of the elastomeric carcass comprises a recess.

11. The track of claim 1, wherein the replacement-facilitating portion of the elastomeric carcass comprises a hole.

12. The track of claim 1, wherein the replacement-facilitating portion of the elastomeric carcass comprises an element embedded in the elastomeric carcass.

13. The track of claim 12, wherein the element embedded in the elastomeric carcass is a threaded element.

14. The track of claim 1, wherein the replacement-facilitating portion of the elastomeric carcass comprises an aligner configured to align at least one of the new peripheral layer of the elastomeric layer and the new elastomeric projections when the new peripheral layer of the elastomeric carcass and the new elastomeric projections are provided on the elastomeric carcass to replace the peripheral layer of the elastomeric layer and the respective ones of the elastomeric projections.

15. The track of claim 1, wherein the replacement-facilitating portion of the elastomeric carcass is configured such that a thickness of the elastomeric carcass before replacement of the peripheral layer of the elastomeric layer and the respective ones of the elastomeric projections by the new peripheral layer of the elastomeric carcass and the new elastomeric projections corresponds to a thickness of the elastomeric carcass after replacement of the peripheral layer of the elastomeric layer and the respective ones of the elastomeric projections by the new peripheral layer of the elastomeric carcass and the new elastomeric projections.

16. The track of claim 1, wherein the new peripheral layer of the elastomeric carcass and the new elastomeric projections are fastened to the elastomeric carcass using a fastener.

17. The track of claim 16, wherein the fastener comprises a threaded fastener.

18. The track of claim 16, wherein the fastener intersects a given one of the new elastomeric projections.

19. The track of claim 16, wherein the fastener intersects the new peripheral layer of the elastomeric carcass.

20. A vehicle comprising the track of claim 1.

21. A method of providing a track for traction of a vehicle, the track being mountable around a plurality of wheels that includes a drive wheel for driving the track, the method comprising:
 performing original manufacturing of the track such that the track comprises:
  an elastomeric carcass comprising a ground-engaging outer surface and an inner surface opposite to the ground-engaging outer surface; and
  a plurality of elastomeric projections projecting from the elastomeric carcass; and
 provisioning a replacement-facilitating portion of the elastomeric carcass during the original manufacturing of the track to facilitate replacement of a peripheral layer of the elastomeric carcass and respective ones of the elastomeric projections molded with and projecting from the peripheral layer of the elastomeric carcass by a new peripheral layer of the elastomeric carcass and new elastomeric projections molded with and projecting from the new peripheral layer of the elastomeric carcass, wherein the replacement-facilitating portion has predetermined dimensions.

22. A method of providing a track for traction of a vehicle, the track being mountable around a plurality of wheels that includes a drive wheel for driving the track, the track comprising: an elastomeric carcass comprising a ground-engaging outer surface and an inner surface opposite to the ground-engaging outer surface; and a plurality of elastomeric projections projecting from the elastomeric carcass, the method comprising:
 removing a peripheral layer of the elastomeric carcass and respective ones of the elastomeric projections molded with and projecting from the peripheral layer of the elastomeric carcass; and
 replacing the peripheral layer of the elastomeric carcass and the respective ones of the elastomeric projections by a new peripheral layer of the elastomeric carcass and new elastomeric projections molded with and projecting from the new peripheral layer of the elastomeric carcass;
wherein the replacing comprises using a replacement-facilitating portion of the elastomeric carcass provisioned during original manufacturing of the track to facilitate replacement of the peripheral layer of the elastomeric carcass and the respective ones of the elastomeric projections by the new peripheral layer of the elastomeric carcass and the new elastomeric projections, wherein the replacement-facilitating portion has predetermined dimensions.

23. The method of claim 22, wherein: the elastomeric projections include wheel-contacting projections projecting from the inner surface of the elastomeric carcass; the peripheral layer of the elastomeric carcass includes at least part of the inner surface of the elastomeric carcass; the respective ones of the elastomeric projections include respective ones of the wheel-contacting projections; the new peripheral layer of the elastomeric carcass includes at least part of the inner surface of the elastomeric carcass; and the new elastomeric projections include new wheel-contacting projections.

24. The method of claim 23, wherein: the elastomeric projections include traction projections projecting from the ground-engaging outer surface of the elastomeric carcass; the peripheral layer of the elastomeric carcass includes at least part of the ground-engaging outer surface of the elastomeric carcass; the respective ones of the elastomeric projections include respective ones of the traction projections; the new peripheral layer of the elastomeric carcass includes at least part of the ground-engaging outer surface of the elastomeric carcass; and the new elastomeric projections include new traction projections.

25. The method of claim 22, wherein: the elastomeric projections include traction projections projecting from the ground-engaging outer surface of the elastomeric carcass; the peripheral layer of the elastomeric carcass includes at least part of the ground-engaging outer surface of the elastomeric carcass; the respective ones of the elastomeric projections include respective ones of the traction projections; the new peripheral layer of the elastomeric carcass includes at least part of the ground-engaging outer surface of the elastomeric carcass; and the new elastomeric projections include new traction projections.

26. The method of claim 22, wherein the respective ones of the elastomeric projections comprises at least five elastomeric projections.

27. The method of claim 22, wherein the peripheral layer of the elastomeric carcass is a band of elastomeric material narrower than a width of the track.

28. The method of claim 27, wherein the elastomeric carcass comprises a recess receiving the peripheral layer of the elastomeric carcass.

29. The method of claim 22, wherein the elastomeric carcass comprises a recess receiving the peripheral layer of the elastomeric carcass.

30. The method of claim 22, wherein a dimension of the peripheral layer of the elastomeric carcass in a widthwise direction of the track is greater than a dimension of each of the elastomeric projections in the widthwise direction of the track.

31. The method of claim 22, wherein the replacement-facilitating portion of the elastomeric carcass comprises a recess.

32. The method of claim 22, wherein the replacement-facilitating portion of the elastomeric carcass comprises a hole.

33. The method of claim 22, wherein the replacement-facilitating portion of the elastomeric carcass comprises an element embedded in the elastomeric carcass.

34. The method of claim 33, wherein the element embedded in the elastomeric carcass is a threaded element.

35. The method of claim 22, wherein the replacement-facilitating portion of the elastomeric carcass comprises an aligner configured to align at least one of the new peripheral layer of the elastomeric layer and the new elastomeric projections when the new peripheral layer of the elastomeric carcass and the new elastomeric projections are provided on the elastomeric carcass to replace the peripheral layer of the elastomeric layer and the respective ones of the elastomeric projections.

36. The method of claim 22, wherein the replacement-facilitating portion of the elastomeric carcass is configured such that a thickness of the elastomeric carcass before replacement of the peripheral layer of the elastomeric layer and the respective ones of the elastomeric projections by the new peripheral layer of the elastomeric carcass and the new elastomeric projections corresponds to a thickness of the elastomeric carcass after replacement of the peripheral layer of the elastomeric layer and the respective ones of the elastomeric projections by the new peripheral layer of the elastomeric carcass and the new elastomeric projections.

37. The method of claim 22, wherein the new peripheral layer of the elastomeric carcass and the new elastomeric projections are fastened to the elastomeric carcass using a fastener.

38. The method of claim 37, wherein the fastener comprises a threaded fastener.

39. The method of claim 37, wherein the fastener intersects a given one of the new elastomeric projections.

40. The method of claim 37, wherein the fastener intersects the new peripheral layer of the elastomeric carcass.

\* \* \* \* \*